(12) United States Patent
Dinan

(10) Patent No.: US 12,108,355 B2
(45) Date of Patent: *Oct. 1, 2024

(54) CARRIER GROUPING IN MULTICARRIER COMMUNICATIONS

(71) Applicant: Comcast Cable Communications, LLC, Philadelphia, PA (US)

(72) Inventor: Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,907

(22) Filed: Jul. 6, 2023

(65) Prior Publication Data

US 2023/0413206 A1 Dec. 21, 2023

Related U.S. Application Data

(63) Continuation of application No. 17/468,176, filed on Sep. 7, 2021, now Pat. No. 11,743,853, which is a
(Continued)

(51) Int. Cl.
*H04L 5/00* (2006.01)
*H04L 27/26* (2006.01)
(Continued)

(52) U.S. Cl.
CPC ....... *H04W 56/0045* (2013.01); *H04L 5/0085* (2013.01); *H04L 5/0098* (2013.01);
(Continued)

(58) Field of Classification Search
CPC . H04L 5/0085; H04L 5/0098; H04L 27/2613; H04L 27/2657; H04L 27/2666;
(Continued)

(56) References Cited

U.S. PATENT DOCUMENTS

| 4,954,892 A | 9/1990 | Asai et al. |
| 5,740,167 A | 4/1998 | Taketsugu et al. |

(Continued)

FOREIGN PATENT DOCUMENTS

| EP | 2378820 A2 | 10/2011 |
| EP | 2640138 A1 | 9/2013 |

(Continued)

OTHER PUBLICATIONS

Jul. 29, 2020—European Office Action—EP 17153540.4.
(Continued)

*Primary Examiner* — Alpus Hsu
(74) *Attorney, Agent, or Firm* — Banner & Witcoff, Ltd.

(57) ABSTRACT

Methods, apparatuses, and systems for wireless communications are described. Uplink signals may be time aligned based on different synchronization signals as a timing reference for different carrier groups. A base station may send, to a wireless device, a time alignment command comprising: an indication of a carrier group index, and a time adjustment value. Based on the time alignment command, the wireless device may send second uplink signals.

54 Claims, 11 Drawing Sheets

Related U.S. Application Data continuation of application No. 16/695,476, filed on Nov. 26, 2019, now Pat. No. 11,147,034, which is a continuation of application No. 15/201,544, filed on Jul. 4, 2016, now Pat. No. 10,524,222, which is a continuation of application No. 14/202,102, filed on Mar. 10, 2014, now Pat. No. 9,397,875, which is a continuation of application No. 14/016,946, filed on Sep. 3, 2013, now Pat. No. 8,717,866, which is a continuation of application No. 13/887,347, filed on May 5, 2013, now Pat. No. 8,625,404, which is a continuation of application No. 13/759,766, filed on Feb. 5, 2013, now Pat. No. 8,462,610, which is a continuation of application No. 13/556,165, filed on Jul. 23, 2012, now Pat. No. 8,395,985.

(60) Provisional application No. 61/556,045, filed on Nov. 4, 2011, provisional application No. 61/528,226, filed on Aug. 27, 2011, provisional application No. 61/511,544, filed on Jul. 25, 2011.

(51) Int. Cl.

| | | |
|---|---|---|
| *H04W 56/00* | (2009.01) | |
| *H04W 72/04* | (2023.01) | |
| *H04W 72/0453* | (2023.01) | |
| *H04W 72/20* | (2023.01) | |
| *H04W 72/21* | (2023.01) | |
| *H04W 72/23* | (2023.01) | |
| *H04W 74/08* | (2024.01) | |
| *H04W 74/0833* | (2024.01) | |
| *H04W 74/00* | (2009.01) | |

(52) U.S. Cl.
CPC ...... *H04L 27/2613* (2013.01); *H04L 27/2657* (2013.01); *H04L 27/2666* (2013.01); *H04L 27/2692* (2013.01); *H04W 56/0005* (2013.01); *H04W 72/0453* (2013.01); *H04W 72/20* (2023.01); *H04W 72/21* (2023.01); *H04W 72/23* (2023.01); *H04W 74/0833* (2013.01); *H04W 74/006* (2013.01); *H04W 74/008* (2013.01)

(58) Field of Classification Search
CPC .......... H04L 27/2692; H04W 56/0005; H04W 56/0045; H04W 72/0406; H04W 72/0413; H04W 72/042; H04W 72/0453; H04W 74/008; H04W 74/0833
See application file for complete search history.

(56) References Cited

U.S. PATENT DOCUMENTS

| | | | |
|---|---|---|---|
| 6,201,803 B1 | 3/2001 | Munday et al. | |
| 6,714,784 B1 | 3/2004 | Forssell et al. | |
| 6,804,212 B1 | 10/2004 | Vallstrom et al. | |
| 7,352,714 B2 | 4/2008 | Balachandran et al. | |
| 7,843,895 B2 * | 11/2010 | Park | H04W 56/0045 370/328 |
| 7,881,236 B2 | 2/2011 | Park et al. | |
| 7,912,485 B2 | 3/2011 | Sinnarajah et al. | |
| 8,031,662 B2 | 10/2011 | Lee et al. | |
| 8,077,670 B2 | 12/2011 | Fan et al. | |
| 8,131,295 B2 | 3/2012 | Wang et al. | |
| 8,270,424 B2 | 9/2012 | Rao | |
| 8,274,936 B2 * | 9/2012 | Yoo | H04L 5/0078 455/552.1 |
| 8,280,391 B2 | 10/2012 | Kim et al. | |
| 8,289,922 B2 | 10/2012 | Ewe et al. | |
| 8,315,641 B2 | 11/2012 | Chun et al. | |
| 8,341,485 B2 | 12/2012 | Riess et al. | |
| 8,395,985 B2 | 3/2013 | Dinan | |
| 8,396,475 B1 | 3/2013 | Bonner | |
| 8,422,410 B2 | 4/2013 | Park et al. | |
| 8,432,811 B2 | 4/2013 | Park et al. | |
| 8,462,610 B1 | 6/2013 | Dinan | |
| 8,462,688 B1 | 6/2013 | Dinan | |
| 8,472,471 B2 | 6/2013 | Yang et al. | |
| 8,493,917 B2 | 7/2013 | Meyer et al. | |
| 8,503,322 B2 | 8/2013 | Krishnamurthy et al. | |
| 8,520,497 B1 | 8/2013 | Dinan | |
| 8,526,310 B2 | 9/2013 | Dinan | |
| 8,526,389 B2 | 9/2013 | Dinan | |
| 8,531,966 B1 | 9/2013 | Dinan | |
| 8,537,739 B1 | 9/2013 | Dinan | |
| 8,542,654 B1 | 9/2013 | Dinan | |
| 8,547,929 B1 | 10/2013 | Dinan | |
| 8,553,558 B1 | 10/2013 | Dinan | |
| 8,553,574 B2 | 10/2013 | Hsu | |
| 8,553,655 B1 | 10/2013 | Dinan | |
| 8,553,671 B2 | 10/2013 | Kim et al. | |
| 8,559,405 B2 | 10/2013 | Dinan | |
| 8,565,142 B1 | 10/2013 | Dinan | |
| 8,565,212 B2 * | 10/2013 | Zhang | H04W 72/21 370/344 |
| 8,571,467 B2 | 10/2013 | Uusitalo et al. | |
| 8,576,780 B2 | 11/2013 | Vujcic | |
| 8,588,169 B2 | 11/2013 | Dinan | |
| 8,599,785 B1 | 12/2013 | Dinan | |
| 8,619,727 B1 | 12/2013 | Dinan | |
| 8,625,404 B2 | 1/2014 | Dinan | |
| 8,625,405 B2 | 1/2014 | Dinan | |
| 8,625,524 B2 | 1/2014 | Dinan | |
| 8,644,129 B2 | 2/2014 | Dinan | |
| 8,665,838 B2 * | 3/2014 | Chun | H04W 72/0446 370/336 |
| 8,687,541 B2 | 4/2014 | Lohr et al. | |
| 8,699,317 B2 | 4/2014 | Dinan | |
| 8,717,866 B2 | 5/2014 | Dinan | |
| 8,761,047 B2 | 6/2014 | Kim et al. | |
| 8,767,585 B2 | 7/2014 | Pelletier et al. | |
| 8,774,819 B2 | 7/2014 | Zhang et al. | |
| 8,780,784 B2 | 7/2014 | Chung et al. | |
| 8,804,630 B2 | 8/2014 | Ito et al. | |
| 8,804,668 B2 | 8/2014 | Dinan | |
| 8,811,433 B2 | 8/2014 | Zhao et al. | |
| 8,824,968 B2 | 9/2014 | Kim et al. | |
| 8,831,615 B2 | 9/2014 | Wei | |
| 8,837,304 B2 | 9/2014 | Yamada | |
| 8,867,666 B2 | 10/2014 | Kim et al. | |
| 8,873,443 B2 | 10/2014 | Haim et al. | |
| 8,885,589 B2 | 11/2014 | Kim et al. | |
| 8,897,248 B2 | 11/2014 | Dinan | |
| 8,917,593 B2 | 12/2014 | Damnjanovic et al. | |
| 8,917,605 B2 | 12/2014 | Pelletier et al. | |
| 8,934,438 B2 | 1/2015 | Dinan | |
| 8,934,459 B2 | 1/2015 | Marinier et al. | |
| 8,958,342 B2 | 2/2015 | Dinan | |
| 8,964,590 B2 | 2/2015 | Dinan | |
| 8,964,593 B2 | 2/2015 | Dinan | |
| 8,964,659 B2 | 2/2015 | Vujcic | |
| 8,964,683 B2 | 2/2015 | Dinan | |
| 8,964,780 B2 | 2/2015 | Dinan | |
| 8,964,793 B2 | 2/2015 | Jang et al. | |
| 8,971,280 B2 | 3/2015 | Dinan | |
| 8,971,298 B2 | 3/2015 | Dinan | |
| 8,976,765 B2 | 3/2015 | Dinan | |
| 8,982,852 B2 | 3/2015 | Dinan | |
| 8,989,128 B2 | 3/2015 | Dinan | |
| 8,995,372 B2 | 3/2015 | Kwon et al. | |
| 8,995,381 B2 | 3/2015 | Dinan | |
| 8,995,405 B2 | 3/2015 | Dinan | |
| 8,995,462 B2 | 3/2015 | Kim et al. | |
| 9,001,780 B2 | 4/2015 | Chen et al. | |
| 9,008,050 B2 | 4/2015 | Feuersanger et al. | |
| 9,042,925 B2 | 5/2015 | Seo et al. | |
| 9,054,835 B2 | 6/2015 | Kwon et al. | |
| 9,054,841 B2 | 6/2015 | Ouchi et al. | |
| 9,084,228 B2 | 7/2015 | Dinan | |
| 9,084,270 B2 | 7/2015 | Dinan | |

(56) References Cited

U.S. PATENT DOCUMENTS

| | | |
|---|---|---|
| 9,107,206 B2 | 8/2015 | Dinan |
| 9,113,387 B2 | 8/2015 | Dinan |
| 9,118,452 B2 | 8/2015 | Park et al. |
| 9,137,762 B2 | 9/2015 | Ahn et al. |
| 9,143,297 B2 | 9/2015 | Liang et al. |
| 9,154,215 B2 | 10/2015 | Noh et al. |
| 9,155,092 B2 | 10/2015 | Park et al. |
| 9,161,322 B2 | 10/2015 | Dinan |
| 9,161,323 B2 | 10/2015 | Dinan |
| 9,179,420 B2 | 11/2015 | Dinan |
| 9,179,425 B2 | 11/2015 | Dinan |
| 9,179,454 B2 | 11/2015 | Dinan |
| 9,179,457 B2 | 11/2015 | Dinan |
| 9,185,611 B2 | 11/2015 | Zeng et al. |
| 9,185,700 B2 | 11/2015 | Seo et al. |
| 9,204,406 B2 | 12/2015 | Dinan |
| 9,204,407 B2 | 12/2015 | Dinan |
| 9,210,619 B2 | 12/2015 | Dinan |
| 9,210,664 B2 | 12/2015 | Dinan |
| 9,210,665 B2 | 12/2015 | Dinan |
| 9,210,667 B2 | 12/2015 | Dinan |
| 9,210,676 B2 | 12/2015 | Dinan |
| 9,215,051 B2 | 12/2015 | Dinan |
| 9,215,678 B2 | 12/2015 | Dinan |
| 9,220,116 B2 | 12/2015 | Dinan |
| 9,237,537 B2 | 1/2016 | Dinan |
| 9,241,326 B2 | 1/2016 | Dinan |
| 9,247,503 B2 | 1/2016 | Ahn et al. |
| 9,247,506 B2 | 1/2016 | Krishnamurthy et al. |
| 9,282,521 B2 | 3/2016 | Lim et al. |
| 9,307,539 B2 | 4/2016 | Krishnamurthy et al. |
| 9,319,194 B2 | 4/2016 | Dinan |
| 9,319,909 B2 | 4/2016 | Yamada |
| 9,326,314 B2 | 4/2016 | Kim et al. |
| 9,337,980 B2 | 5/2016 | Ahn et al. |
| 9,344,242 B2 | 5/2016 | Ahn et al. |
| 9,344,985 B2 | 5/2016 | Loehr et al. |
| 9,363,832 B2 | 6/2016 | Dinan |
| 9,374,211 B2 | 6/2016 | Kim et al. |
| 9,386,490 B2 | 7/2016 | Dinan |
| 9,386,604 B2 | 7/2016 | Dinan |
| 9,391,824 B2 | 7/2016 | Dinan |
| 9,392,623 B2 | 7/2016 | Dinan |
| 9,397,875 B2 | 7/2016 | Dinan |
| 9,402,255 B2 | 7/2016 | Lohr et al. |
| 9,408,162 B2 | 8/2016 | Ho et al. |
| 9,414,332 B2 | 8/2016 | Dinan |
| 9,414,340 B2 | 8/2016 | Dinan |
| 9,439,217 B2 | 9/2016 | Feuersaenger et al. |
| 9,456,424 B2 | 9/2016 | Seo et al. |
| 9,461,793 B2 | 10/2016 | Kim et al. |
| 9,461,797 B2 | 10/2016 | Ahn et al. |
| 9,491,782 B2 | 11/2016 | Kim et al. |
| 9,503,989 B2 | 11/2016 | Haim et al. |
| 9,516,650 B2 | 12/2016 | Ouchi et al. |
| 9,521,632 B2 | 12/2016 | Narasimha et al. |
| 9,521,693 B2 | 12/2016 | Li et al. |
| 9,578,616 B2 | 2/2017 | Etemad et al. |
| 9,585,164 B2 | 2/2017 | Fong et al. |
| 9,642,161 B2 | 5/2017 | Wu et al. |
| 9,667,398 B2 | 5/2017 | Ahn et al. |
| 9,681,405 B2 | 6/2017 | Jang et al. |
| 9,716,575 B2 | 7/2017 | Ahn et al. |
| 9,717,061 B2 | 7/2017 | Dinan |
| 9,717,084 B2 | 7/2017 | Nishikawa et al. |
| 9,742,539 B2 | 8/2017 | Ahn et al. |
| 9,743,431 B2 | 8/2017 | Dinan |
| 9,749,968 B2 | 8/2017 | Stern-Berkowitz et al. |
| 9,756,581 B2 | 9/2017 | Zhang et al. |
| 9,763,203 B2 | 9/2017 | Dinan |
| 9,794,887 B2 | 10/2017 | Ouchi et al. |
| 9,794,900 B2 | 10/2017 | Wu |
| 9,801,145 B2 | 10/2017 | Seo et al. |
| 9,832,732 B2 | 11/2017 | Ouchi et al. |
| 9,838,179 B2 | 12/2017 | Kim et al. |
| 9,838,990 B2 | 12/2017 | Xu et al. |
| 9,854,608 B2 | 12/2017 | Pelletier et al. |
| 9,894,640 B2 | 2/2018 | Dinan |
| 9,913,258 B2 | 3/2018 | Kim et al. |
| 9,949,221 B2 | 4/2018 | Yamada |
| 9,991,999 B2 | 6/2018 | Ahn et al. |
| 10,009,864 B2 | 6/2018 | Etemad et al. |
| 10,033,499 B2 | 7/2018 | Ahn et al. |
| 10,039,131 B2 | 7/2018 | Dinan |
| 10,098,070 B2 | 10/2018 | Haim et al. |
| 10,117,193 B2 | 10/2018 | Feuersaenger et al. |
| 10,206,181 B2 | 2/2019 | Ekpenyong et al. |
| 10,250,368 B2 | 4/2019 | Ahn et al. |
| 10,349,361 B2 | 7/2019 | Feuersaenger et al. |
| 10,375,655 B2 | 8/2019 | Dinan |
| 10,531,495 B2 | 1/2020 | Dinan |
| 10,536,910 B2 | 1/2020 | Gaal et al. |
| 10,568,048 B2 | 2/2020 | Stern-Berkowitz et al. |
| 10,588,154 B2 | 3/2020 | Pelletier et al. |
| 10,805,908 B2 | 10/2020 | Dinan |
| 10,863,551 B2 | 12/2020 | Dinan |
| 10,869,278 B2 | 12/2020 | Haim et al. |
| 10,887,846 B2 | 1/2021 | Zhang et al. |
| 2003/0002482 A1 | 1/2003 | Kubler et al. |
| 2003/0087647 A1 | 5/2003 | Hurst |
| 2004/0001448 A1 | 1/2004 | Preston et al. |
| 2004/0202119 A1 | 10/2004 | Edge |
| 2005/0037786 A1 | 2/2005 | Edge |
| 2005/0063356 A1 | 3/2005 | Larsen et al. |
| 2007/0002890 A1 | 1/2007 | Mangold et al. |
| 2007/0032255 A1 | 2/2007 | Koo et al. |
| 2007/0149196 A1 | 6/2007 | Choi et al. |
| 2007/0189205 A1 | 8/2007 | Terry et al. |
| 2007/0207828 A1 | 9/2007 | Cheng et al. |
| 2007/0248113 A1 | 10/2007 | Ko et al. |
| 2007/0293224 A1 | 12/2007 | Wang et al. |
| 2008/0039087 A1 | 2/2008 | Gallagher et al. |
| 2008/0069053 A1 | 3/2008 | Kim et al. |
| 2008/0084849 A1 | 4/2008 | Wang et al. |
| 2008/0102842 A1 | 5/2008 | Kim |
| 2008/0102896 A1 | 5/2008 | Wang et al. |
| 2008/0123576 A1 | 5/2008 | Son et al. |
| 2008/0130585 A1 | 6/2008 | Park et al. |
| 2008/0137632 A1 | 6/2008 | Choi et al. |
| 2008/0182579 A1 | 7/2008 | Wang et al. |
| 2008/0267127 A1 | 10/2008 | Narasimha et al. |
| 2009/0046629 A1 | 2/2009 | Jiang et al. |
| 2009/0109838 A1 | 4/2009 | Kuo |
| 2009/0111445 A1* | 4/2009 | Ratasuk ............ H04W 56/0005 455/418 |
| 2009/0161599 A1 | 6/2009 | Haartsen et al. |
| 2009/0181687 A1 | 7/2009 | Tiirola et al. |
| 2009/0186613 A1 | 7/2009 | Ahn et al. |
| 2009/0238121 A1 | 9/2009 | Kotecha |
| 2009/0239545 A1 | 9/2009 | Lee et al. |
| 2009/0276675 A1 | 11/2009 | Ojala et al. |
| 2009/0285193 A1 | 11/2009 | Kim et al. |
| 2009/0316637 A1 | 12/2009 | Yi et al. |
| 2009/0316678 A1 | 12/2009 | Yamada et al. |
| 2010/0008333 A1 | 1/2010 | Kim et al. |
| 2010/0020760 A1 | 1/2010 | Grandblaise et al. |
| 2010/0035581 A1 | 2/2010 | Park et al. |
| 2010/0056160 A1 | 3/2010 | Kim et al. |
| 2010/0067470 A1 | 3/2010 | Damnjanovic et al. |
| 2010/0069071 A1 | 3/2010 | Simonsson et al. |
| 2010/0074246 A1* | 3/2010 | Harada ............ H04W 56/0045 370/350 |
| 2010/0091725 A1 | 4/2010 | Ishii |
| 2010/0098011 A1 | 4/2010 | Pelletier et al. |
| 2010/0113082 A1 | 5/2010 | Ishii et al. |
| 2010/0118730 A1 | 5/2010 | Tanaka et al. |
| 2010/0118788 A1 | 5/2010 | Ohta et al. |
| 2010/0128683 A1 | 5/2010 | Zangi et al. |
| 2010/0130137 A1 | 5/2010 | Pelletier et al. |
| 2010/0144353 A1 | 6/2010 | Chong et al. |
| 2010/0184446 A1 | 7/2010 | Moon et al. |
| 2010/0195532 A1 | 8/2010 | Pajukoski et al. |
| 2010/0195566 A1 | 8/2010 | Krishnamurthy et al. |
| 2010/0215004 A1 | 8/2010 | Yoo |

(56) References Cited

U.S. PATENT DOCUMENTS

| | | |
|---|---|---|
| 2010/0227569 A1 | 9/2010 | Bala et al. |
| 2010/0238872 A1 | 9/2010 | Kim et al. |
| 2010/0238908 A1 | 9/2010 | Wu |
| 2010/0246561 A1 | 9/2010 | Shin et al. |
| 2010/0254356 A1 | 10/2010 | Tynderfeldt et al. |
| 2010/0279695 A1 | 11/2010 | Amirijoo et al. |
| 2010/0290427 A1 | 11/2010 | Sebire et al. |
| 2010/0296465 A1 | 11/2010 | Hooli et al. |
| 2010/0302998 A1 | 12/2010 | Bao et al. |
| 2010/0303039 A1 | 12/2010 | Zhang et al. |
| 2010/0309877 A1 | 12/2010 | Damnjanovic et al. |
| 2010/0322115 A1 | 12/2010 | Wei et al. |
| 2011/0039568 A1 | 2/2011 | Zhang et al. |
| 2011/0039593 A1 | 2/2011 | Lee et al. |
| 2011/0044287 A1 | 2/2011 | Park et al. |
| 2011/0059777 A1 | 3/2011 | Rao |
| 2011/0081936 A1 | 4/2011 | Haim et al. |
| 2011/0085491 A1 | 4/2011 | Tynderfeldt et al. |
| 2011/0092219 A1 | 4/2011 | Damnjanovic et al. |
| 2011/0098054 A1 | 4/2011 | Gorokhov et al. |
| 2011/0105107 A1 | 5/2011 | Kwon et al. |
| 2011/0111749 A1 | 5/2011 | Kim et al. |
| 2011/0128935 A1 | 6/2011 | Jang et al. |
| 2011/0134774 A1 | 6/2011 | Pelletier et al. |
| 2011/0158116 A1 | 6/2011 | Tenny et al. |
| 2011/0158117 A1 | 6/2011 | Ho et al. |
| 2011/0170535 A1 | 7/2011 | Wang et al. |
| 2011/0194455 A1 | 8/2011 | Aminaka et al. |
| 2011/0194493 A1 | 8/2011 | Centonza et al. |
| 2011/0199944 A1 | 8/2011 | Chen et al. |
| 2011/0200014 A1 | 8/2011 | Lee et al. |
| 2011/0200032 A1 | 8/2011 | Lindstrom et al. |
| 2011/0201367 A1 | 8/2011 | Aminaka et al. |
| 2011/0218016 A1 | 9/2011 | Hirakawa et al. |
| 2011/0222428 A1 | 9/2011 | Charbit et al. |
| 2011/0222492 A1 | 9/2011 | Borsella et al. |
| 2011/0223932 A1 | 9/2011 | Hole et al. |
| 2011/0243102 A1 | 10/2011 | Sebire et al. |
| 2011/0243106 A1 | 10/2011 | Hsu et al. |
| 2011/0243111 A1 | 10/2011 | Andgart et al. |
| 2011/0249639 A1 | 10/2011 | Jen |
| 2011/0249641 A1 | 10/2011 | Kwon et al. |
| 2011/0250918 A1 | 10/2011 | Jen |
| 2011/0255431 A1 | 10/2011 | Wang et al. |
| 2011/0261776 A1 | 10/2011 | Ahn et al. |
| 2011/0268028 A1 | 11/2011 | Stern-Berkowitz et al. |
| 2011/0268032 A1 | 11/2011 | Kim et al. |
| 2011/0268087 A1 | 11/2011 | Kwon et al. |
| 2011/0269469 A1 | 11/2011 | Xiao et al. |
| 2011/0274063 A1 | 11/2011 | Li |
| 2011/0275335 A1 | 11/2011 | Luo et al. |
| 2011/0281581 A1 | 11/2011 | Brandt et al. |
| 2011/0286409 A1 | 11/2011 | Son et al. |
| 2011/0286411 A1 | 11/2011 | Kim et al. |
| 2011/0292917 A1 | 12/2011 | Fan et al. |
| 2011/0294474 A1 | 12/2011 | Barany et al. |
| 2011/0294508 A1 | 12/2011 | Min et al. |
| 2011/0299489 A1 | 12/2011 | Kim et al. |
| 2011/0300856 A1 | 12/2011 | Aminaka |
| 2011/0310845 A1 | 12/2011 | Jung et al. |
| 2011/0310851 A1 | 12/2011 | Klingenbrunn et al. |
| 2012/0002568 A1 | 1/2012 | Tiirola et al. |
| 2012/0002617 A1 | 1/2012 | Vujcic |
| 2012/0008524 A1 | 1/2012 | Amirijoo et al. |
| 2012/0008600 A1 | 1/2012 | Marinier et al. |
| 2012/0014371 A1 | 1/2012 | Weng et al. |
| 2012/0021693 A1 | 1/2012 | Wintzell et al. |
| 2012/0026972 A1 | 2/2012 | Miao et al. |
| 2012/0026976 A1 | 2/2012 | Chang et al. |
| 2012/0026977 A1 | 2/2012 | Kim et al. |
| 2012/0039273 A1 | 2/2012 | Nam et al. |
| 2012/0039284 A1 | 2/2012 | Barbieri et al. |
| 2012/0044815 A1 | 2/2012 | Geirhofer et al. |
| 2012/0044906 A1 | 2/2012 | Chen et al. |
| 2012/0057456 A1 | 3/2012 | Bogatin et al. |
| 2012/0063425 A1 | 3/2012 | Wang et al. |
| 2012/0076037 A1 | 3/2012 | Noh et al. |
| 2012/0076088 A1 | 3/2012 | Hwang et al. |
| 2012/0076103 A1 | 3/2012 | Dai et al. |
| 2012/0077484 A1 | 3/2012 | Ji |
| 2012/0082152 A1 | 4/2012 | Baldemair et al. |
| 2012/0093128 A1 | 4/2012 | Song et al. |
| 2012/0106471 A1 | 5/2012 | Behravan et al. |
| 2012/0106495 A1 | 5/2012 | Yang et al. |
| 2012/0106510 A1 | 5/2012 | Kuo |
| 2012/0106511 A1 | 5/2012 | Wu |
| 2012/0113883 A1 | 5/2012 | Osterling |
| 2012/0113914 A1 | 5/2012 | Zhao et al. |
| 2012/0113941 A1 | 5/2012 | Chung et al. |
| 2012/0113962 A1 | 5/2012 | Jen |
| 2012/0120944 A1 | 5/2012 | Yang et al. |
| 2012/0127931 A1 | 5/2012 | Gaal et al. |
| 2012/0140743 A1 | 6/2012 | Pelletier et al. |
| 2012/0170497 A1 | 7/2012 | Zhang et al. |
| 2012/0170570 A1 | 7/2012 | Chang et al. |
| 2012/0176967 A1 | 7/2012 | Kim et al. |
| 2012/0178456 A1 | 7/2012 | Peisa et al. |
| 2012/0178482 A1 | 7/2012 | Seo et al. |
| 2012/0184206 A1 | 7/2012 | Kim et al. |
| 2012/0188897 A1 | 7/2012 | Shen |
| 2012/0188961 A1 | 7/2012 | Suzuki et al. |
| 2012/0218987 A1 | 8/2012 | Zhao et al. |
| 2012/0218988 A1 | 8/2012 | Xu et al. |
| 2012/0224552 A1 | 9/2012 | Feuersanger et al. |
| 2012/0243498 A1 | 9/2012 | Kwon et al. |
| 2012/0243514 A1 | 9/2012 | Wu |
| 2012/0250520 A1 | 10/2012 | Chen et al. |
| 2012/0257510 A1 | 10/2012 | Jeong et al. |
| 2012/0257513 A1 | 10/2012 | Yamada |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0275378 A1 | 11/2012 | Lee |
| 2012/0275390 A1 | 11/2012 | Korhonen et al. |
| 2012/0281680 A1 | 11/2012 | Bostrom et al. |
| 2012/0287865 A1 | 11/2012 | Wu et al. |
| 2012/0294163 A1 | 11/2012 | Turtinen et al. |
| 2012/0300715 A1 | 11/2012 | Pelletier et al. |
| 2012/0300720 A1 | 11/2012 | Gou et al. |
| 2012/0300743 A1 | 11/2012 | Kim et al. |
| 2012/0300752 A1 | 11/2012 | Kwon et al. |
| 2012/0302245 A1 | 11/2012 | Huang |
| 2012/0307811 A1 | 12/2012 | Kwon et al. |
| 2012/0314652 A1 | 12/2012 | Ahn et al. |
| 2012/0314675 A1 | 12/2012 | Vujcic |
| 2012/0322453 A1 | 12/2012 | Weng et al. |
| 2012/0327804 A1 | 12/2012 | Park et al. |
| 2013/0010619 A1 | 1/2013 | Fong et al. |
| 2013/0010684 A1 | 1/2013 | Park et al. |
| 2013/0010704 A1 | 1/2013 | Kronquist et al. |
| 2013/0010711 A1 | 1/2013 | Larsson et al. |
| 2013/0010712 A1 | 1/2013 | Kim et al. |
| 2013/0010723 A1 | 1/2013 | Ouchi et al. |
| 2013/0021980 A1 | 1/2013 | Yang et al. |
| 2013/0028069 A1 | 1/2013 | Pelletier et al. |
| 2013/0028185 A1 | 1/2013 | Wu |
| 2013/0028198 A1 | 1/2013 | Yamada |
| 2013/0028236 A1 | 1/2013 | Jung et al. |
| 2013/0034085 A1 | 2/2013 | Bostrom et al. |
| 2013/0039294 A1 | 2/2013 | Wang |
| 2013/0044617 A1 | 2/2013 | Boixadera et al. |
| 2013/0044831 A1 | 2/2013 | Narasimha et al. |
| 2013/0044843 A1 | 2/2013 | Malkamaki et al. |
| 2013/0058309 A1 | 3/2013 | Kuo |
| 2013/0058315 A1 | 3/2013 | Feuersanger et al. |
| 2013/0064165 A1 | 3/2013 | Chen et al. |
| 2013/0064195 A1 | 3/2013 | Chang |
| 2013/0070726 A1 | 3/2013 | Zhang et al. |
| 2013/0072246 A1 | 3/2013 | Nobukiyo et al. |
| 2013/0078913 A1 | 3/2013 | Lee et al. |
| 2013/0083675 A1 | 4/2013 | Yamada |
| 2013/0083683 A1 | 4/2013 | Hwang et al. |
| 2013/0083747 A1 | 4/2013 | Narasimha et al. |
| 2013/0083753 A1 | 4/2013 | Lee et al. |

(56) References Cited

U.S. PATENT DOCUMENTS

| | | |
|---|---|---|
| 2013/0083769 A1 | 4/2013 | Qu et al. |
| 2013/0084913 A1 | 4/2013 | Gaal et al. |
| 2013/0094433 A1 | 4/2013 | Nagata et al. |
| 2013/0094466 A1 | 4/2013 | Kim et al. |
| 2013/0100938 A1 | 4/2013 | Kwon et al. |
| 2013/0114398 A1 | 5/2013 | Wang |
| 2013/0114505 A1 | 5/2013 | Haim et al. |
| 2013/0114574 A1 | 5/2013 | Ng et al. |
| 2013/0115952 A1 | 5/2013 | Wei |
| 2013/0115958 A1 | 5/2013 | Wei |
| 2013/0148535 A1 | 6/2013 | Baghel et al. |
| 2013/0148592 A1 | 6/2013 | Noh et al. |
| 2013/0155898 A1 | 6/2013 | Mn et al. |
| 2013/0156014 A1 | 6/2013 | Kim et al. |
| 2013/0157669 A1 | 6/2013 | Turtinen et al. |
| 2013/0163550 A1 | 6/2013 | Marinier et al. |
| 2013/0165124 A1 | 6/2013 | Liang et al. |
| 2013/0165126 A1 | 6/2013 | Wei |
| 2013/0176988 A1 | 7/2013 | Wang et al. |
| 2013/0183979 A1 | 7/2013 | Chen et al. |
| 2013/0188473 A1 | 7/2013 | Dinan |
| 2013/0188580 A1 | 7/2013 | Dinan |
| 2013/0188617 A1 | 7/2013 | Dinan |
| 2013/0188619 A1 | 7/2013 | Dinan |
| 2013/0188620 A1 | 7/2013 | Dinan |
| 2013/0189930 A1 | 7/2013 | Kinnunen et al. |
| 2013/0194908 A1 | 8/2013 | Gao et al. |
| 2013/0195048 A1 | 8/2013 | Ekpenyong et al. |
| 2013/0195084 A1 | 8/2013 | Chen et al. |
| 2013/0195086 A1 | 8/2013 | Xu et al. |
| 2013/0208601 A1 | 8/2013 | Cui et al. |
| 2013/0235807 A1 | 9/2013 | Lee et al. |
| 2013/0242892 A1 | 9/2013 | Ye |
| 2013/0242911 A1 | 9/2013 | Heo et al. |
| 2013/0250925 A1 | 9/2013 | Lohr et al. |
| 2013/0258957 A1 | 10/2013 | Dinan |
| 2013/0258958 A1 | 10/2013 | Dinan |
| 2013/0260741 A1 | 10/2013 | Yamada |
| 2013/0260821 A1 | 10/2013 | Deparis et al. |
| 2013/0272229 A1 | 10/2013 | Dinan |
| 2013/0279434 A1 | 10/2013 | Dinan |
| 2013/0279435 A1 | 10/2013 | Dinan |
| 2013/0279486 A1 | 10/2013 | Kato et al. |
| 2013/0315094 A1 | 11/2013 | Vannithamby et al. |
| 2013/0315214 A1 | 11/2013 | Bai et al. |
| 2013/0322397 A1 | 12/2013 | Lee et al. |
| 2013/0322409 A1 | 12/2013 | Takahashi et al. |
| 2013/0329675 A1 | 12/2013 | Dinan |
| 2013/0329711 A1 | 12/2013 | Seo et al. |
| 2013/0343358 A1 | 12/2013 | Kato et al. |
| 2014/0016559 A1 | 1/2014 | Jang et al. |
| 2014/0016593 A1 | 1/2014 | Park et al. |
| 2014/0023043 A1 | 1/2014 | Yang et al. |
| 2014/0029575 A1 | 1/2014 | Zeng et al. |
| 2014/0029586 A1 | 1/2014 | Loehr et al. |
| 2014/0050205 A1 | 2/2014 | Ahn et al. |
| 2014/0056244 A1 | 2/2014 | Frenne et al. |
| 2014/0056251 A1 | 2/2014 | Ahn et al. |
| 2014/0056271 A1 | 2/2014 | Ahn et al. |
| 2014/0064233 A1 | 3/2014 | Oizumi et al. |
| 2014/0079032 A1 | 3/2014 | Bergstrom et al. |
| 2014/0086182 A1 | 3/2014 | Shin et al. |
| 2014/0086213 A1 | 3/2014 | Kwon et al. |
| 2014/0086224 A1 | 3/2014 | Kwon et al. |
| 2014/0092812 A1 | 4/2014 | Jang et al. |
| 2014/0105192 A1 | 4/2014 | Park et al. |
| 2014/0112276 A1 | 4/2014 | Ahn et al. |
| 2014/0112308 A1 | 4/2014 | Kwon et al. |
| 2014/0126475 A1 | 5/2014 | Ahn et al. |
| 2014/0161089 A1 | 6/2014 | Ahn et al. |
| 2014/0185595 A1 | 7/2014 | Wu et al. |
| 2014/0192798 A1 | 7/2014 | Yang et al. |
| 2014/0198748 A1 | 7/2014 | Lee et al. |
| 2014/0213244 A1 | 7/2014 | Oh et al. |
| 2014/0219185 A1 | 8/2014 | Etemad et al. |
| 2014/0233542 A1 | 8/2014 | Bergstrom et al. |
| 2014/0293947 A1 | 10/2014 | Nishikawa et al. |
| 2014/0307670 A1 | 10/2014 | Kim et al. |
| 2014/0308956 A1 | 10/2014 | Zhang et al. |
| 2014/0321406 A1 | 10/2014 | Marinier et al. |
| 2014/0321442 A1 | 10/2014 | Kim et al. |
| 2014/0328326 A1 | 11/2014 | Gunnarsson et al. |
| 2014/0334448 A1 | 11/2014 | Langereis et al. |
| 2014/0341109 A1 | 11/2014 | Cartmell et al. |
| 2014/0348078 A1 | 11/2014 | Kim et al. |
| 2014/0349713 A1 | 11/2014 | Yamada |
| 2014/0369317 A1 | 12/2014 | Ye |
| 2014/0369322 A1 | 12/2014 | Fwu et al. |
| 2015/0031409 A1 | 1/2015 | Ahn et al. |
| 2015/0031410 A1 | 1/2015 | Lim et al. |
| 2015/0036601 A1 | 2/2015 | Kim et al. |
| 2015/0043524 A1 | 2/2015 | Kim et al. |
| 2015/0063245 A1 | 3/2015 | Gao et al. |
| 2015/0063262 A1 | 3/2015 | Ji et al. |
| 2015/0071236 A1 | 3/2015 | Baldemair et al. |
| 2015/0110086 A1 | 4/2015 | Li et al. |
| 2015/0208358 A1 | 7/2015 | Ahn et al. |
| 2015/0249527 A1 | 9/2015 | Hwang et al. |
| 2015/0296542 A1 | 10/2015 | Heo et al. |
| 2015/0327249 A1 | 11/2015 | Kitazoe et al. |
| 2016/0021629 A1 | 1/2016 | Jang et al. |
| 2016/0080126 A1 | 3/2016 | Dinan |
| 2016/0100372 A1 | 4/2016 | Dinan |
| 2016/0249299 A1 | 8/2016 | Ahn et al. |
| 2017/0099658 A1 | 4/2017 | Shattil |
| 2017/0208581 A1 | 7/2017 | Yang et al. |
| 2017/0353931 A1 | 12/2017 | Stern-Berkowitz et al. |
| 2020/0245257 A1 | 7/2020 | Pelletier et al. |
| 2021/0099960 A1 | 4/2021 | Haim et al. |

FOREIGN PATENT DOCUMENTS

| | | |
|---|---|---|
| WO | 2011016377 A1 | 2/2011 |
| WO | 2011023057 A1 | 3/2011 |
| WO | 2011050856 A1 | 5/2011 |
| WO | 2011085200 A1 | 7/2011 |
| WO | 2011120716 A1 | 10/2011 |
| WO | 2012036704 A1 | 3/2012 |
| WO | 2013025237 A1 | 2/2013 |
| WO | 2014085967 A1 | 6/2014 |

OTHER PUBLICATIONS

U.S. Appl. No. 61/554,493, Joonkui Ahn, "Method of Multiple Channel Transmission for Multiple Timing-Advance", Nov. 1, 2011 (Section 3.1-3.1.1, pp. 22-25) (Year: 2011).

Jun. 17, 2021—European Search Report—EP 20212147.1.

Y. Zhang and F. Chen, "Interference between Sounding Reference Signal and Random Access Preamble Based on LTE Uplink," 2009 WASE International Conference on Information Engineering, Taiyuan, China, 2009, pp. 286-289 (Year:2009).

3GPP TSG-RAN WG2 Meeting #76, R2-115758 San Francisco, USA, Nov. 14-18, 2011; Source: ZTE, Title: "Pathloss and DL timing reference for MTA".

3GPP TSG-RAN WG2 Meeting #72, R2-106856, Jacksonville, USA; Nov. 15-19, 2010; Source: Rapporteur (Samsung), Title: "Introduction of Carrier Aggregation and UL/ DL MIMO".

3GPP TS 36.321, V10.4.0, Dec. 20, 2011 "3rd Generation Partnership Project; Technical Specification Group Radio Access Network; Evolved Universal Terrestrial Radio Access (E-UTRA); Medium Access Control (MAC) protocol specification (Release 10)",3GPP Standard.

Jan. 11, 2022—European Search Report—EP 21191532.7.

3GPP TSG RAN WG2 Meeting #77 R2-120129, Feb. 6-10, 2012, Dresden, Germany Source: Renesas Mobile Europe Title: Design of TA command for multiple timing advances.

Jul. 4, 2022—EP Search Report—EP App. No. 21193754.5.

Aug. 2, 2022—EP Office Action—EP App. No. 15165499.3.

U.S. Appl. No. 61/532,116, "Method for Handling Random Access Channel Procedure on a SCell When PCell TA Timer Expires", 2011.

(56) References Cited

OTHER PUBLICATIONS

3GPP TSG-RAN WG2 Meeting #75, R2-113784, Athens, Greece, Aug. 22-26, 2011; Title: "Time Alignment for multiple TA".
3GPP TSG-RAN WG2 Meeting #75, R2-113829, Athens, Greece, Aug. 22-26, 2011; Title: "Random Access procedure for multiple TA".
3GPP TSG RAN WG1 #68 R1-110424 Dresden, Germany, Feb. 6-10, 2012 Source: LG Electronics Title: Simultaneous transmissions in multiple TA groups.
3GPP TSG RAN WG1 #68 R1-120462 Dresden, Germany, Feb. 6-10, 2012 Source: Texas Instruments Title: Physical layer aspects of multiple timing advance commands.
3GPP TSG RAN WG1 Meeting #68 R1-120486 Dresden, Germany, Feb. 6-10, 2012 Source: Alcatel-Lucent, Alcatel-Lucent Shanghai Bell Title: Power scaling for simultaneous transmissions of multiple UL channels with multiple TA groups.
3GPP TSG RAN WG1 #68 R1-120539 Feb. 6-10, 2012, Dresden, Germany Source: Qualcomm Incorporated Title: SRS operation in multiple TA offset CA.
3GPP TSG RAN WG1 #68 R1-120540 Feb. 6-10, 2012, Dresden, Germany Source: Qualcomm Incorporated Title: Power control aspects of multiple TA operation.
3GPP TSG RAN WG1 Meeting #68 R1-120915 Dresden, Germany, Feb. 6-10, 2012 Title: [Draft] LS on simultaneous transmission of PUSCH/PUCCH/SRS for multiple TA Source: Panasonic [TSG RAN WG1].
3GPP TSG RAN WG1 #68 R1-120918 Dresden, Germany, Feb. 6-10, 2012 Proposal on PUSCH/PUCCH transmission with multiple TA LG Electronics, Panasonic, Ericsson, ST-Ericsson, Pantech, Texas Instruments.
3GPP TSG RAN WG1 #68 R1-120919 Dresden, Germany, Feb. 6-10, 2012 proposal on SRS transmission with multiple TA LG Electronics, ZTE, Pantech, CATT.
3GPP TSG RAN WG1 Meeting #68 R1-120946 Dresden, Germany, Feb. 6-10, 2012 Title: LS on simultaneous transmission of PUSCH/PUCCH/SRS for multiple TA Source: TSG RAN WG1.
Adaptive Video Coding for Mobile Wireless Networks by Benjamin Belzer, Judy Liao, John D. Villasenor, IEEE Compt. Soc. Press (1994).
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TSG RAN WG1 Meeting #68bis R1-121142 Jeju, Korea, Mar. 26- 30, 2012 Source: Panasonic Title: SCell PRACH transmission timing.
3GPP TSG-RAN2 #73bis meeting Tdoc R2-113102 Barcelona, Spain, May 9-13, 2011 Source: MediaTek Title: Transmission of SCell RACH.
3GPP TSG-RAN WG2 Meeting #77bis R2-121130 Jeju, South Korea, Mar. 26-30, 2012 Agenda item: 7.1.2.3 Source: Qualcomm Incorporated Title: UE indication of UL timing loss for secondary TA group.
3GPP TSG RAN WG2 Meeting #77bis R2-121139 Jeju, Korea, Mar. 26-30, 2012 Source: CATT Title: RACH Configuration in sTAG.
3GPP TSG-RAN WG2 Meeting #77bis R2-121181 Jeju, South Korea, Mar. 26-30, 2012 (Resubmission of R2-120089) Source: Nokia Siemens Networks, Nokia Corporation Title: RLM on SCells.
3GPP TSG RAN WG2 Meeting #77bis R2-121189 Jeju, Korea, Mar. 26-30, 2012 Source: New Postcom Title: Considerations on RACH failure handling on SCell.
3GPP TSG-RAN2#77bis R2-121193 Jeju, South Korea, Mar. 26-30, 2012 Source: NTT DOCOMO, INC. Title: Radio link monitoring for SCell in Rel-11.
3GPP Ts 36.321 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11).

3GPP TSG-RAN WG2 Meeting #77bis R2-121232 Mar. 26-30, 2012, Jeju, Korea, resubmission of R2-120246 Source: Panasonic Title: Issues on exceeding maximum timing difference of aggregated cells.
3GPP Ts 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).
3GPP TSG-RAN WG2 #77bis Tdoc R2-121278 Jeju, South Korea, Mar. 26-30, 2012 Title: Random Access Response in multiple TA Source: Research in Motion, UK Limited.
3GPP TSG-RAN2 #77bis Meeting Tdoc R2-121347 Jeju, Korea, Mar. 26-30, 2012 Source: MediaTek Inc. Title: Discussions on SCell RA procedure when reaching PREAMBLE_TRAN_MAX.
3GPP TSG-RAN2 Meeting #77bis R2-121377 Mar. 26-30, 2012, Jeju, Korea Source: LG Electronics Inc. Title: Handling of SCell RACH Problem.
3GPP TSG-RAN WG2#77bis R2-121384 Jeju, Korea, Mar. 26-30, 2012 Source: Sharp Title: Remaining Issues of TA group handling.
3GPP TSGRAN WG2#77bis R2-121404 Jeju Island, Korea, Mar. 26-30, 2012 Source: Samsung Title: Remaining issue on random access failure for SCell.
3GPP TSG-RAN WG2 #77b R2-121409 Jeju, Korea, Mar. 26-30, 2012 Source: Acer Incorporated Title: Analysis of RA failure Handling.
3GPP TS-RAN WG2 #77 bis R2-121529 Jeju, Korea, Mar. 26-30, 2012 Source: ITRI Title: Discussion on whether to stop RA procedure when RA failure occurs.
3GPP TSG-RAN WG2 Meeting #77bis R2-121711 Jeju, Korea, Mar. 26-30, 2012 Source: Potevio Title: Random Access Failures Handling on SCells.
3GPP TSGRAN WG2 #77bis R2-121721 Mar. 26-30, 2012, Jeju, Korea Source: Intel Corporation Title: Further discussion on the open issues of RACH on SCell.
3GPP TSG-RAN WG2 Meeting #77bis R2-121799 Jeju, Korea, Mar. 26- 30, 2012 Source: Fujitsu Title: Reaching PREAMBLE_TRANS_MAX.
3GPP TSG-RAN2 Meeting #77bis R2-121869 Jeju, Korea, Mar. 26-30, 2012 Source: Ericsson Title: Introduction of CA Enhancements in MAC.
3GPP TSG RAN WG2 Meeting #78, R2-123022 Prague, Czech Republic, May 25, 2011, Title: Introduction of Carrier Aggregation enhancements.
European Final Rejection—EP Appl. 13702187.9—dated Nov. 28, 2016.
"MAC Downlink Signalling for Multiple TA"; Nokia Siemens Network et al: 3GPP Draft; R2-115747 Downlink Signalling for Multiple TA, 3rd Generation Partnership Project (3GPP), Mobile Competence Centre ; 650, Route Des Lucioles ; F-06921 Sophia-Antipolis Cedex; France, vol. RAN WG2, No. San Francisco, USA; Nov. 14, 2011-Nov. 18, 2011, Nov. 7, 2011 (Nov. 7, 2011), XP050564143.
3GPP TS 36.331 V9.10.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 9).
Sep. 19, 2017—European Search Report—EP 17153540.4.
Mar. 28, 2018—European Office Action—EP 13703256.1.
3GPP TSG RAN WG2 Meeting #80 R2-125578 New Orleans, USA, Nov 12-Nov. 16, 2012 Source: CATT Title: Multi-TA Capability.
3GPP TSG RAN WG2 Meeting #77bis R2-124764 Bratislava, Slovakia, Oct. 8-12, 2012 Source: CATT Title: Consideration on Multi-TA Capability.
3GPP TSG-RAN WG2 Meeting #77bis R2-121456 Jeju, Korea, Mar. 26-30, 2012 Source: Huawei, HiSilicon Title: Parallel transmission in the same TAG.
Apr. 20, 2018—European Search Report—EP 17189302.7.
Feb. 8, 2019—European Office Action—EP 15165499.3.
3GPP TSG RAN WG2 #76, R2-115743 San Francisco, USA, Nov. 14-18, 2011, Title: Random Access Response on an SCell.

(56) References Cited

OTHER PUBLICATIONS

3GPP TSG RAN WG1 Meeting #67, R1-113721, Nov. 14-18, 2011, San Francisco, USA Source: CATT Title: Simultaneous transmission of multiple uplink channels in LTE-A Rel-11.
3GPP TSG-RAN WG1 Meeting #66bis, R1-113115, Oct. 10-14, 2011, Zhuhai, China Source: Panasonic Title: Uplink signaling for carrier aggregation enhancement.
3GPP TSG RAN WG1 Meeting #67 R1-114069, Nov. 14-18, 2011, San Francisco, USA Source: NTT DOCOMO Title: Views on CSI Reporting for Rel-11 Carrier Aggregation.
3GPP TSG RAN WG1 Meeting #67 R1-114086, Nov. 14-18, 2011, San Francisco, USA Source: Huawei, HiSilicon Title: Simultaneous transmission of SRS and PUCCH.
Jun. 18, 2020—European Office Action—EP 17189302.7.
Jul. 7, 2020—European Office Action—EP 15165499.3.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG-RAN WG2 #77, R2-120218 Dresden, Germany, Feb. 6-10, 2012 Source: Sharp Title: TA group handling.
3GPP TSG RAN WG2 #69bis R2-102395 Beijing, China, Apr. 12-16, 2010 Source: Qualcomm Incorporated Title: UL and DL Component Carrier Linking.
3GPP TSG-RAN WG2 Meeting #75B R2-114966 Zhuhai, China, Oct. 10-14, 2011 Source: Potevio Title: Consideration on contention based random access.
3GPP TSG-RAN WG2 Meeting #75bis R2-114968 Oct. 10-14, 2011, Zhuhai, China Source: Panasonic Title: Message 2 reception in RA procedure for SCell.
3GPP TSG RAN WG2 #75bis R2-114977 Oct. 10-14, 2011, Zhuhai, China Source: Potevio Title: UE Behaviour on Multi-RA Procedures.
3GPP TSG-RAN WG2 Meeting #75bis R2-115042 Zhuhai China, Oct. 10-14, 2011 Source: Fujitsu Title: Remaining issues on SCell RA procedure.
3GPP TSG-RAN WG2 Meeting #75bis R2-115147 Zhuhai, China, Oct. 10-14, 2011 Source: Renesas Mobile Europe Ltd. Title: Open issues for RACH procedure.
3GPP TSG-RAN WG2 #75bis Tdoc R2-115156 Zhuhai, China, Oct. 10-14, 2011 Title: Random Access Response in multiple TA Source: Research in Motion, UK Limited.
3GPP TSG-RAN WG2#75bis R2-115174 Zhuhai, China, Oct. 10-14, 2011 Source: Sharp Title: A special SCell for CA enhancement.
3GPP TSG-RAN2#75bis R2-115302 Oct. 10-14, 2011, Zhuhai, China Source: New Postcom Title: Open issues of RACH on SCell.
TSG-RAN WG2#75bis R2-115338 Oct. 10-14, 2011, Zhuhai, China Title: RACH on SCell Source: Alcatel-Lucent, Alcatel-Lucent Shanghai Bell.
3GPP TSG-RAN2 Meeting #75bis R2-115399 Oct. 10-14, 2011, Zhuhai, China Source: LG Electronics Inc. Title: RACH applicability and TA group.
3GPP TSG-RAN WG2 #75bis Tdoc R2-115409 Zhuhai, China, Oct. 10-14, 2011 Source: InterDigital Communications Title: Prioritization between RACH Procedures in LTE CA.
3GPP TS 36.213 V10.3.0 (Sep. 2011), 3rd Generation Partnership Project; Technical Specification Group Radio Access Network; Evolved Universal Terrestrial Radio Access (E-UTRA); Physical layer procedures (Release 10).
3GPP TSG-RAN WG2 #77 R2-120229, Dresden, Germany, Feb. 6-10, 2012, Source: Acer Incorporated, Title: Changing of DL Timing Reference.
3GPP TSG RAN WG2 Meeting #77bis R2-121309, Jeju, South Korea, Mar. 26-30, 2012, Source: Pantech, Title: Rar MAC CE with C-RNTI.
3GPP TSG-RAN WG2 Meeting #77bis R2-121368, Jeju, Korea, Mar. 26-30, 2012, Source: LG Electronics Inc., Title: Performing RA procedure on cell other than the timing reference cell.
3GPP TSG-RAN WG2#77bis meeting R2-121712, Jeju, Korea, Mar. 26-30, 2012, Source: Samsung, Title: Timing reference for sTAG.

3GPP TSG RAN WG2 Meeting #77bis R2-121190 Jeju Island, Korea, Mar. 26- 30, 2012 Source: New Postcom Title: Considerations on TAG change procedure.
3GPP TSG RAN WG2 Meeting #75-bis R2-115449 Zhuhai, China, Oct. 10-14, 2011 Source: NTT Docomo, Inc. (Email discussion rapporteur) Title: Summary of email discussion [75#33]—LTE: Carrier Aggregation scenarios and resulting requirements.
3GPP TSG-RAN WG2 #75bis Tdoc R2-115463 Zhuhai, China, Oct. 10-14, 2011 Source: Ericsson, ST Ericsson Title: SCell Random Access Prioritization.
3GPP TSG-RAN WG2 #76 Tdoc R2- 115743 San Francisco, United States, Nov. 14-18, 2011 Source: Ericsson, ST Ericsson Title: Random Access Response on an SCell.
3GPP TSG-RAN WG2 Meeting #76 R2-115754 San Francisco, United States, Nov. 14-18, 2011 Source: ZTE Title: MSG2 Position for MTA RT.
3GPP TSG-RAN WG2 Meeting #76 R2-115782 San Francisco, USA, Nov. 14-18, 2011 Source: Renesas Mobile Europe Ltd. Title: RACH procedure on SCell.
3GPP TSG-RAN WG2 Meeting #76 R2-115890 Nov. 14-18, 2011, San Francisco, USA Source: HT mMobile Inc. Title: Initiating RA procedure on SCell.
3GPP TSG-RAN WG2 #76 Tdoc R2-116111 San Francisco, USA, Nov. 14-18, 2011 Source: InterDigital Communications Title: MSG1 Transmission for RACH Procedure for SCells.
3GPP TSG-RAN2 Meeting #76 R2-116225 Nov. 14-18, 2011, San Francisco, USA Source: LG Electronics Inc. Title: SCell RACH trigger.
3GPP TSG-RAN2 Meeting #76 R2-116228 Nov. 14-18, 2011, San Francisco, USA Source: LG Electronics Inc. Title: RACH applicability and TA group.
3GPP TSG-RAN WG2 Meeting #76 R2-16309 San Francisco, USA, Nov. 14-18, 2011 Source: Fujitsu Title: Trigger of RA procedure on SCell(s).
3GPP TSG-WG2 Meeting #76 R2-116503 San Francisco, USA, Nov. 14-18, 2011 Updates of Carrier Aggregation agreements (WI R2-111115) Rapporteur (Nokia Corporation).
3GPP TSG-RAN WG2 Meeting #73bis R2-111880 Shanghai, China, Apr. 11-15, 2011 Title: Corrections to CA related IE descriptions Source to WG: Potevio.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG-RAN WG1 Meeting #65 R1-111577 Barcelona, Spain, May 9-13, 2011 Source: Panasonic Title: Simultaneous SRS transmission on multiple component carriers.
3GPP TSG-RAN1 Meeting #65 R1-111893 Barcelona, Spain, May 8-13, 2011 Title: Correction to simultaneous transmission of SRS and PUCCH format 2/2a/2b Source: ZTE, Qualcomm Inc.
3GPP TSG-RAN2 Meeting #77bis, R2-121899, Jeju, Korea, Mar. 26-30, 2012 Change Request 36.300.
3GPP TSG RAN WG1 #68bis, R1-121425 Jeju, Korea, Mar. 26-30, 2012 Source: LG Electronics Title: SRS transmissions in multiple TA.
3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TSG RAN WG2 Meeting #76 R2-115738 San Francisco, USA, Nov. 14-18, 2011 Source: New Postcom Title: Considerations on TA group (re)configuration.
3GPP TSG-RAN WG2 Meeting #76 R2-115756 Nov. 4-18, 2011, San Francisco, USA Source: ZTE Title: TA Group management.
3GPP TSG-RAN WG2 Meeting #76 R2-115805 San Francisco, USA, Nov. 14-18, 2011 Source: Nokia Siemens Networks, Nokia Corporation Title: TA group signalling.
3GPP TSG-RAN WG2 Meeting #76 R2-115827 San Francisco, USA, Nov. 14-18, 2011 Source: Huawei, HiSilicon Title: Signalling for the TA Group Management.
3GPP TSG-RAN2#76 meeting Tdoc R2-116340 San Francisco. USA, Nov. 14-18, 2011, Source: HTC Title: TA group configuration and reconfiguration.

(56) References Cited

OTHER PUBLICATIONS

3GPP TSG RAN WG2 Meeting #77 R2-120266 Feb. 6-10, 2012, Dresden, Germany Source: Intel Corporation Title: CA Signaling Enhancements for HetNet Type Deployments.
3GPP TSG RAN WG2 Meeting #77 R2-120731 Dresden, Germany, Feb. 6-10, 2012 Source: Fujitsu Title: Further consideration on the TAG change procedure.
3GPP TSG-RAN2 Meeting #77bis R2-121233 Jeju, Korea, Mar. 26-30, 2012 Source: Panasonic Title: TAG Composition and related aspects.
3GPP TSG RAN WG2 Meeting #77bis R2-121798 Jeju, Korea, Mar. 26-30, 2012 Source: Fujitsu Title: Further consideration on the TAG change procedure.
3GPP TSG RAN WG2 Meeting #78 R2-122173 Prague, Czech Republic, May 21-25, 2012 Source: CATT Title: Detail on TAG Configuration.
3GPP TSG-RAN2#78 meeting Tdoc R2-122240 May 21-25, 2012, Prague, Czech Republic Source: ZTE Corporation Title: UE capability report for MTA.
3GPP TSG RAN WG2 Meeting #78 R2-122264 Prague, Czech Republic, May 21-25, 2012 Source: New Postcom Title: Remaining issued of TAG configuration.
U.S. Pat. No. 8,391,129, Time Alignment in Multicarrier Systems, Mar. 5, 2013.
U.S. Pat. No. 8,395,985, Time Alignment in Multicarrier OFDM Network, Mar. 12, 2013.
U.S. Pat. No. 8,462,610, Carrier Configuration in a Wireless Device, Base Station, and Network, Jun. 11, 2013.
U.S. Pat. No. 8,462,688, Base Station and Wireless Device Radio Resource Control Configuration, Jun. 11, 2013.
U.S. Pat. No. 8,520,497, Time Reference in a Wireless Device, Aug. 27, 2013.
U.S. Pat. No. 8,526,310, Secondary Cell Sounding Transmission, Sep. 3, 2013.
U.S. Pat. No. 8,526,389, Power Scaling in Multicarrier Wireless Device, Sep. 3, 2013.
U.S. Pat. No. 8,531,966, Uplink Sounding Transmission with Carrier Aggregation, Sep. 10, 2013.
U.S. Pat. No. 8,537,739, Random Access Preamble Transmission, Sep. 17, 2013.
U.S. Pat. No. 8,542,654, Primary and Secondary Cell Group Configuration, Sep. 24, 2013.
U.S. Pat. No. 8,547,929, Sounding Reference Signal Transmission, Oct. 1, 2013.
U.S. Pat. No. 8,553,558, Uplink Sounding Transmission with Carrier Aggregation, Oct. 8, 2013.
U.S. Pat. No. 8,553,665, Timing in a Multicarrier Wireless Device, Oct. 8, 2013.
U.S. Pat. No. 8,559,405, Multicarrier Wireless Communications Reference Cell, Oct. 15, 2013.
U.S. Pat. No. 8,565,142, Random Access Preamble Transmission, Oct. 22, 2013.
U.S. Pat. No. 8,588,169, Random Access Failure in a Wireless Device Multiple Timing Advance Groups, Nov. 19, 2013.
U.S. Pat. No. 8,599,785, Transmission Power in a Multicarrier Wireless Device, Dec. 3, 2013.
U.S. Pat. No. 8,619,727, Timing in a Multicarrier Wireless Device, Dec. 31, 2013.
U.S. Pat. No. 8,625,404, Sounding Reference Signal, Jan. 7, 2014.
U.S. Pat. No. 8,625,405, Sounding Reference Signal, Jan. 7, 2014.
U.S. Pat. No. 8,625,524, Sounding Reference Signal Transmission, Jan. 7, 2014.
U.S. Pat. No. 8,644,129, Random Access Preamble Transmission, Feb. 4, 2014.
U.S. Pat. No. 8,699,317, Transmission Timing in a Carrier Group, Apr. 15, 2014.
U.S. Pat. No. 8,717,866, Carrier Grouping in Multicarrier Communications, May 6, 2014.
U.S. Pat. No. 8,804,668, Primary and Secondary Cell Group Configuration, Aug. 12, 2014.
U.S. Pat. No. 8,897,248, Multicarrier Signal Transmission in Wireless Communications, Nov. 25, 2014.
U.S. Pat. No. 8,934,438, Uplink Transmission Timing Advance in a Wireless Device and Base Station, Jan. 13, 2015.
U.S. Pat. No. 8,958,342, Uplink Transmission Power in a Multicarrier Wireless Device, Feb. 17, 2015.
U.S. Pat. No. 8,964,590, Random Access Mechanism for a Wireless Device and Base Station, Feb. 24, 2015.
U.S. Pat. No. 8,964,593, Wireless Device Transmission Power, Feb. 24, 2015.
U.S. Pat. No. 8,964,683, Sounding Signal in a Multicarrier Wireless Device, Feb. 24, 2015.
U.S. Pat. No. 8,964,780, Sounding in a Multicarrier Wireless Communications, Feb. 24, 2015.
U.S. Pat. No. 8,971,280, Uplink Transmissions in a Wireless Device, Mar. 3, 2015.
U.S. Pat. No. 8,971,298, Wireless Device Connection to an Application Server, Mar. 3, 2015.
U.S. Pat. No. 8,976,765, Synhronization in Base Stations and Wireless Network, Mar. 10, 2015.
U.S. Pat. No. 8,982,852, Random Access in Networks with Carrier Aggregation, Mar. 17, 2015.
U.S. Pat. No. 8,989,128, Cell Timing in a Wireless Device and Base Station, Mar. 24, 2015.
U.S. Pat. No. 8,995,381, Power Control in a Wireless Device, Mar. 31, 2015.
U.S. Pat. No. 8,995,405, Pathloss Reference Configuration in a Wireless Device and Base Station, Mar. 31, 2015.
U.S. Pat. No. 9,084,228, Automobile Communication Device, Jul. 14, 2015.
U.S. Pat. No. 9,084,270, Random Access Mechanism for a Wireless Device and Base Station, Jul. 14, 2015.
U.S. Pat. No. 9,107,206, Carrier Grouping in Multicarrier Communications, Aug. 11, 2015.
U.S. Pat. No. 9,113,387, Handover Signaling in a Wireless Network, Aug. 18, 2015.
U.S. Pat. No. 9,161,322, Configuring Base Station and Wireless Device Carrier Groups, Oct. 13, 2015.
U.S. Pat. No. 9,161,323, Synchronization in Base Stations and Wireless Networks, Oct. 23, 2015.
U.S. Pat. No. 9,179,420, Random Access in Networks with Carrier Aggregation, Nov. 3, 2015.
U.S. Pat. No. 9,179,425, Transmit Power Control in Multicarrier Communications, Nov. 3, 2015.
U.S. Pat. No. 9,179,454, Multicarrier Signal Transmission in Wireless Communications, Nov. 3, 2015.
U.S. Pat. No. 9,179,457, Carrier Configuration in Wireless Networks, Nov. 3, 2015.
U.S. Pat. No. 9,204,406, Sounding Signal in a Multicarrier Wireless Device, Dec. 1, 2015.
U.S. Pat. No. 9,204,407, Pathloss Reference Configuration in a Wireless Device and Base Station, Dec. 8, 2015.
U.S. Pat. No. 9,210,619, Signaling Mechanism for Wireless Device Handover, Dec. 8, 2015.
U.S. Pat. No. 9,210,664, Preamble Transmission in a Wireless Device, Dec. 8, 2015.
U.S. Pat. No. 9,210,665, Uplink Transmission Power in a Multicarrier Wireless Device, Dec. 8, 2015.
U.S. Pat. No. 9,210,667, Random Access Failure in a Wireless Device Multipel Timing Advance Groups, Dec. 8, 2015.
U.S. Pat. No. 9,210,675, Time Alignment Timer in Multicarrier Communication, Dec. 8, 2015.
U.S. Pat. No. 9,210,676, Wireless Device for Multicarrier Communications, Dec. 8, 2015.
U.S. Pat. No. 9,215,051, Sounding in Multicarrier Wireless Communications, Jan. 29, 2015.
U.S. Pat. No. 9,215,678, Timing Advance Timer Configuration in a Wireless Device and Base Station, Dec. 15, 2015.
U.S. Pat. No. 9,220,116, Radio Access for a Wireless Device and Base Station, Dec. 22, 2015.
U.S. Pat. No. 9,237,537, Random Access Process in a Multicarrier Base Station and Wireless Device, Jan. 12, 2016.

(56) References Cited

OTHER PUBLICATIONS

U.S. Pat. No. 9,241,326, Wireless Device Transmission Power, Jan. 19, 2016.
U.S. Pat. No. 9,319,194, Synchronization in a Base Stations and Wireless Networks, Apr. 19, 2016.
U.S. Pat. No. 9,363,832, Random Access in Networks Wlth Carrier Aggregation, Jun. 7, 2016.
U.S. Pat. No. 9,386,490, Time Alignment in Multicarrier OFDM Network, Jul. 5, 2016.
U.S. Pat. No. 9,386,604, Random Access Mechanism for a Wireless Device and Base Station, Jul. 5, 2016.
U.S. Pat. No. 9,391,824, Transmission Timing in a Carrier Group, Jul. 12, 2016.
U.S. Pat. No. 9,392,623, Sounding Reference Signal Transmission in a Wireless Network, Jul. 12, 2016.
U.S. Pat. No. 9,397,875, Carrier Grouping in Multicarrier Communications, Jul. 19, 2016.
U.S. Pat. No. 9,414,332, Signal Power Management in a Multicarrier Wireless Device, Aug. 9, 2016.
U.S. Pat. No. 9,414,340, Uplink Transmission Timing Advance in a Wireless Device and Base Station, Aug. 9, 2016.
U.S. Pat. No. 9,615,339, Transmit Power Control in Multicarrier Communications, Apr. 4, 2017.
U.S. Pat. No. 9,642,098, Managing Sounding Signals to Limit Power in a Multicarrier Wireless Device, May 2, 2017.
U.S. Pat. No. 9,648,643, Uplink Transmission Power in a Multicarrier Wireless Device, May 9, 2017.
U.S. Pat. No. 9,661,661, Primary and Secondary Cell Group Configuration, May 23, 2017.
U.S. Pat. No. 9,681,399, Sounding Signal in a Multicarrier Wireless Device, Jun. 13, 2017.
U.S. Pat. No. 9,706,454, Random Access Mechanism for a Wireless Device and Base Station, Jul. 11, 2017.
U.S. Pat. No. 9,717,061, Wireless Device Connection to an Application Server, Jul. 25, 2017.
U.S. Pat. No. 9,736,795, Signal Transmission Power Adjustment in a Wireless Device, Aug. 15, 2017.
U.S. Pat. No. 9,743,431, Multicarrier Signal Transmission in Wireless Communications, Aug. 22, 2017.
U.S. Pat. No. 9,763,203, Cell Timing in a Wireless Device and Base Station, Sep. 12, 2017.
U.S. Pat. No. 9,769,772, Uplink Transmissions in a Wireless Device, Sep. 19, 2017.
U.S. Pat. No. 9,801,211, Random Access Mechanism for a Wireless Device and Base Station, Oct. 24, 2017.
U.S. Pat. No. 9,820,283, Transmit Power Control in Multicarrier Communications, Nov. 14, 2017.
U.S. Pat. No. 9,843,982, Signaling Mechanisms for Wireless Device Handover, Dec. 12, 2017.
U.S. Pat. No. 9,844,006, Wireless Device Transmission Power, Dec. 12, 2017.
U.S. Pat. No. 9,848,445, Multicarrier Communications Employing Time Alignment Timers, Dec. 19, 2017.
U.S. Pat. No. 9,867,137, Uplink Transmission Power in a Multicarrier Wireless Device, Jan. 9, 2018.
U.S. Pat. No. 9,872,280, Automobile Communication Device, Jan. 16, 2018.
U.S. Pat. No. 9,888,499, Signaling Mechanisms for Wireless Device Handover, Feb. 6, 2018.
U.S. Pat. No. 9,894,640, Carrier Grouping in Multicarrier Communications, Feb. 13, 2018.
U.S. Pat. No. 10,039,131, Synchronization in Base Stations and Wireless Networks, Jul. 31, 2018.
U.S. Pat. No. 10,064,191, Transmit Power Control in Multicarrier Communications, Aug. 28, 2018.
U.S. Pat. No. 10,085,288, Multicarrier Signal Transmission in Wireless Communications, Sep. 25, 2018.
U.S. Pat. No. 10,123,288, Sounding Signal in a Multicarrier Wireless Device, Nov. 6, 2018.
U.S. Pat. No. 10,129,798, Carrier Configuration in Wireless Networks, Nov. 13, 2018.
U.S. Pat. No. 10,154,500, Wireless Multicarrier Random Access Process, Dec. 11, 2018.
U.S. Pat. No. 10,278,134, Wireless Device Preamble Transmission Timing, Apr. 30, 2019.
U.S. Pat. No. 10,327,195, Wireless Device Handover Signalling, Jun. 18, 2019.
U.S. Pat. No. 10,368,322, Signal Transmission Power Adjustment in a Wireless Device, Jul. 30, 2019.
U.S. Pat. No. 10,375,655, Wireless Device Transmission Power, Aug. 6, 2019.
U.S. Pat. No. 10,383,068, Wireless Communication System and Method, Aug. 13, 2019.
U.S. Pat. No. 10,397,957, Random Access Mechanism for a Wireless Device and Base Station, Aug. 27, 2019.
U.S. Pat. No. 10,499,300, Handover Signaling in a Wireless Network, Dec. 3, 2019.
U.S. Pat. No. 10,523,389, Cell Timing in a Wireless Device and Base Station, Dec. 31, 2019.
U.S. Pat. No. 10,523,390, Uplink Transmissions in a Wireless Device, Dec. 31, 2019.
U.S. Pat. No. 10,524,222, Time Alignment in Multicarrier OFDM Network, Dec. 31, 2019.
U.S. Pat. No. 10,531,495, Sounding Reference Signal Transmission in a Wireless Network, Jan. 7, 2020.
U.S. Pat. No. 10,555,290, Automobile Communication Device, Feb. 4, 2020.
U.S. Pat. No. 10,575,259, Signal Power Management in a Multicarrier Wireless Device, Feb. 25, 2020.
U.S. Pat. No. 10,588,155, Configuration of Multiple Timing Advance Groups in Wireless Communication Devices, Mar. 10, 2020.
U.S. Pat. No. 10,652,928, Primary and Secondary Cell Group Configuration, May 12, 2020.
U.S. Pat. No. 10,681,701, Transmit Power Control in Multicarrier Communications, Jun. 9, 2020.
U.S. Pat. No. 10,687,364, Multicarrier Communications Employing Time Alignment Timers, Jun. 16, 2020.
U.S. Pat. No. 10,805,908, Carrier Grouping in Multicarrier Wireless Networks, Oct. 13, 2020.
U.S. Pat. No. 10,820,278, Wireless Device Preamble Transmission Timing, Oct. 27, 2020.
U.S. Pat. No. 10,863,551, Sounding Reference Signal Transmission in a Wireless Network, Dec. 8, 2020.
U.S. Pat. No. 10,939,472, Random Access Mechanism for a Wireless Device and Base Station, Mar. 2, 2021.
U.S. Pat. No. 11,031,011, Wireless Multicarrier Random Access Process, May 18, 2021.
U.S. Pat. No. 11,064,494, Transmit Power Control in Multicarrier Communications, Jul. 13, 2021.
U.S. Pat. No. 11,076,392, Automobile Communication Device, Jul. 27, 2021.
U.S. Pat. No. 11,115,937, Signal Transmission Power Adjustment in a Wireless Device, Sep. 7, 2021.
U.S. Pat. No. 11,147,034, Carrier Grouping in Multicarrier Communications, Oct. 12, 2021.
U.S. Pat. No. 11,218,975, Signal Power Management in a Multicarrier Wireless Device, Jan. 4, 2022.
U.S. Pat. No. 11,252,679, Signal Transmission Power Adjustment in a Wireless Device, Feb. 15, 2022.
U.S. Pat. No. 11,252,762, Multicarrier Communications Employment Time Alignment Timers, Feb. 15, 2022.
U.S. Pat. No. 11,277,241, Cell Timing in a Wireless Device and Base Station, Mar. 15, 2022.
U.S. Pat. No. 11,337,161, Wireless Device Preamble Transmission Timing, May 17, 2022.
U.S. Pat. No. 11,395,348, Cell Grouping for Wireless Communications, Jul. 19, 2022.
U.S. Pat. No. 11,516,812, Resource Allocation for Multicarrier Communications, Nov. 29, 2022.
U.S. Pat. No. 11,558,855, Carrier Grouping in Multicarrier Wireless Networks, Jan. 7, 2023.

(56) References Cited

OTHER PUBLICATIONS

U.S. Pat. No. 11,582,704, Signal Transmission Power Adjustment in a Wireless Device, Feb. 14, 2023.
U.S. Pat. No. 11,622,372, Communication Device, Apr. 4, 2023.
U.S. Pat. No. 11,711,769, Signal Transmission Power Adjustment in a Wireless Device, Jul. 25, 2023.
U.S. Pat. No. 11,743,853, Carrier Grouping in Multicarrier Wireless Networks, Aug. 29, 2023.
U.S. Pat. No. 11,792,859, Multicarrier Communications Employing Time Alignment Timers, Oct. 17, 2023.
U.S. Pat. No. 11,800,570, Multicarrier Signal Transmission in Wireless Communications, Oct. 24, 2023.
U.S. Pat. No. 11,825,419, Cell Timing in a Wireless Device and Base Station, Nov. 21, 2023.
U.S. Pat. No. 11,882,560, Cell Grouping for Wireless Communications, Jan. 23, 2024.
U.S. Appl. No. 16/746,568, Configuration of Multiple Timing Advance Groups in Wireless Communication Devices, filed Jan. 17, 2020.
U.S. Appl. No. 17/087,275, Sounding Reference Signal Transmission in a Wireless Network, filed Nov. 2, 2020.
U.S. Appl. No. 17/339,573, Transmit Power Control in Multicarrier Communications, filed Jun. 4, 2021.
U.S. Appl. No. 17/711,463, Wireless Device Transmission Timing, filed Apr. 1, 2022.
U.S. Appl. No. 17/835,544, Cell Grouping for Wireless Communications, filed Jun. 8, 2022.
U.S. Appl. No. 17/975,372, Resource Allocation for Multicarrier Communications, filed Oct. 27, 2022.
U.S. Appl. No. 18/150,631, Signal Transmission Power Adjustment in a Wireless Device, filed Jan. 5, 2023.
U.S. Appl. No. 18/170,922, Transmit Power Control in Multicarrier Communications, filed Feb. 17, 2023.
U.S. Appl. No. 18/135,896, Signal Transmission Power Adjustment in a Wireless Device, filed Apr. 18, 2023.
U.S. Appl. No. 18/454,384, Multicarrier Signal Transmission in Wireless Communications, filed Aug. 23, 2023.
U.S. Appl. No. 18/454,460, Multicarrier Communications Employing Time Alignment Timers, filed Aug. 23, 2023.
U.S. Appl. No. 18/487,402, Cell Timing in a Wireless Device and Base Station, filed Oct. 16, 2023.
U.S. Appl. No. 18/487,321, Cell Grouping for Wireless Communications, filed Oct. 16, 2023.
3GPP TSG RAN WG2 Meeting #76, R2-115791 San Francisco, USA, Nov. 14-18, 2011 Source: CATT Title: Signaling for TAG configuration.
3GPP TSG-RAN WG2 Meeting #74 R2-113014 Barcelona, Spain, May 9-13, 2011 Source: Renesas Mobile Europe Title: Multiple timing advance using multiple RACH.
3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAN WG2 Meeting #72bis, Tdoc R2-110356 Dublin, Ireland, Jan. 17-21, 2011 Source: ITRI Title: RF Receiver Information in UE Capability Signalling.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TSG-RAN WG2 #74 Tdoc R2-113258 Barcelona, Spain, May 9-13, 2011 Source: InterDigital Communications Title: Support for RACH on SCells in LTE CA.
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG RAN WG1 Meeting #67 R1-113727 San Francisco, USA, Nov. 14 - 18, 2011 Source: CATT Title: Support of multiple timing advances in LTE-A Rel-11 with CA.
3GPP TSG-RAN WG1 Meeting #67 R1-113961 San Francisco, USA, Nov. 14-18, 2011 Title: RACH Procedure for Multiple Timing Advances Source: Research In Motion, UK Limited.
3GPP TSG RAN WG1 #67 R1-113975 San Francisco, USA, Nov. 14-18, 2011 Source: LG Electronics Title: RAN1 issues in supporting multiple timing advances.
3GPP TSG RAN WG2 Meeting #76 R2-115789 San Francisco, USA, Nov. 14-18, 2011 Source: CATT Title: CBRA on SCell.
3GPP TSG-RAN WG2 Meeting #76 R2-115804 San Francisco, USA, Nov. 14-18, 2011 Source: Nokia Siemens Networks, Nokia Corporation Title: RA procedure on SCell.
3GPP TSG-RAN WG2 Meeting #76 R2-115817 San Francisco, USA, Nov. 14-18, 2011 Source: Potevio Title: Considerations on CBRA on SCell and Msg2 for SCell RA.
3GPP TSG-RAN WG2 Meeting #76 R2-116310 San Francisco, USA, Nov. 14-18, 2011 Source: Fujitsu Title: Remaining issues on SCell RA procedure.
3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).
3GPP TSG-RAN WG2 Meeting #77 R2-120076 Dresden, Germany, Feb. 6-10, 2012 Source: ASUSTek Title: Further consideration on timing reference for sTAG.
3GPP TSG-RAN WG2 Meeting #77 R2-120086 Dresden, Germany, Feb. 6-10, 2012 Source: Nokia Siemens Networks, Nokia Corporation Title: Timing Reference for sTAG.
3GPP TSG-RAN WG2 Meeting #77 R2-120087 Dresden, Germany, Feb. 6-10, 2012 Source: NSN Title: [Draft] LS on timing reference for sTAG.
3GPP TSG-RAN WG2 Meeting #77 R2-120088 Dresden, Germany, Feb. 6-10, 2012 Source: Nokia Siemens Networks, Nokia Corporation Title: Pathloss Reference for sTAG.
3GPP TSG-RAN WG2 Meeting #77 R2-120127 Dresden, Germany, Feb. 6-10, 2012 Source: Renesas Mobile Europe Title: Further analysis on timing reference for sTAG.
3GPP TSG-RAN WG2 Meeting #77 Tdoc R2-120166 Feb. 6-10, 2012, Dresden, Germany Source: ITRI Title: Deactivation of DL Timing Reference in sTAG.
3GPP TSG RAN WG2 #77 R2-120168 Dresden, Germany, Feb. 6-10, 2012 Source: ITRI Title: Consideration on FFS of pathloss reference configuration.
3GPP TSG-RAN2 #77 meeting Tdoc R2-120221 Dresden, Germany, Feb. 6-10, 2012 Source: MediaTek Title: Discussion on timing reference in sTAG.
3GPP TSG RAN WG2 Meeting #77 R2-120252 Dresden, Germany, Feb. 6-10, 2012 Source: CATT Title: Timing Reference Change.
3GPP TSG-RAN WG2 #77 R2-120264 Feb. 6-10, 2012, Dresden, Germany Source: Intel Corporation Title: Remaining open issues on timing and pathloss reference for sTAG.
TSG-RAN WG2#77 R2-120604 Dresden, Germany, Feb. 6-10, 2012 Title: Pathloss reference for SCell TA group and need of RLM Source: Alcatel-Lucent, Alcatel-Lucent Shanghai Bell.
TSG-RAN WG2#77 R2-120605 Feb. 6-10, 2012, Dresden, Germany Title: Timing reference for SCell TA group Source: Alcatel-Lucent, Alcatel-Lucent Shanghai Bell.
3GPP TSG RAN WG2 Meeting #77 R2-120799 Dresden, Germany, Feb. 6-10, 2012 Source: CATT Title: Timing Reference Change.
3GPP TSG-RAN WG2 #77 R2-120821 Feb. 6-10, 2012, Dresden, Germany Source: Intel Corporation Title: Remaining open issues on timing and pathloss reference for sTAG.
3GPP TSG-RAN WG2 meeting #77bis R2-121178 Jeju, South Korea, Mar. 26-30, 2012 Source: Qualcomm Incorporated Title: Timing reference cell for secondary TA group.

(56) References Cited

OTHER PUBLICATIONS

3GPP TSG-RAN WG2 Meeting #77bis R2-121182 Jeju, South Korea, Mar. 26-30, 2012 (Resubmission of R2-120088) Source: Nokia Siemens Networks, Nokia Corporation Title: Pathloss Reference for sTAG.
3GPP TSG RAN WG2 Meeting #77bis R2-121192 Jeju, Korea, Mar. 26-30, 2012 Source: New Postcom Title: Pathloss reference and RLM on SCell.
3GPP TSG-RAN WG2 Meeting #77bis R2-121230 Mar. 26-30, 2012, Jeju, Korea (update of R2-120247) Source: Panasonic Title: Handling loss of Timing/ Pathloss Reference Cell.
3GPP TSG-RAN WG2 Meeting #77Bis R2-121241 Jeju Island, Korea, Mar. 26-30, 2012 Source: ZTE Corporation Title: Pathloss and RLM for MTA.
3GPP TSG RAN WG2 Meeting #77bis R2-121307 Jeju, South Korea, Mar. 26-30, 2012 Source: Pantech Title: Deactivation of Timing Reference Cell.
3GPP TSG-RAN2 #77bis Meeting R2-121338 Jeju, Korea, Mar. 26-30, 2012 Source: MediaTek Inc. Title: Error case for timing reference.
3GPP TSG-RAN WG2 Meeting #77bis R2-121366 Jeju, South Korea, Mar. 26-30, 2012 Source: LG Electronics Inc. Title: Handling of the Timing Reference SCell Deactivation.
3GPP TSG RAN WG2#77bis R2-121398 Jeju Island, Korea, Mar. 26-30, 2012 Source: Samsung Title: Whether to allow configurable pathloss reference in sTAG ?.
3GPP TSG-RAN WG2 Meeting #77bis R2-121403 Jeju, Korea, Mar. 26-30, 2012 Source: Renesas Mobile Europe Title: Discussion on error case handling of the timing reference of sTAG.
3GPP TSG-RAN WG2 Meeting #77bis R2-121428 Jeju, Korea, Mar. 26-30, 2012 Source: Huawei, HiSilicon Title: Pathloss reference for sTAG.
3GPP TSG RAN WG2 Meeting #77bis R2-121493 Jeju, South Korea, Mar. 26-30, 2012 Source: New Postcom Title: Considerations on Downlink Timing reference in sTAG.
3GPP TSG RAN WG2 #77 bis R2-121528 Jeju, Korea, Mar. 26-30, 2012 revised from R2-120168 Source: ITRI Title: Pathloss reference configuration.
3GPP TSG-RAN WG2 Meeting #77bis Tdoc R2-121530 Mar. 26-30, 2012, Jeju, Korea Source: ITRI Title: Deactivation of Timing Reference SCell in sTAG.
3GPP TSG-RAN WG2 #77bis Tdoc R2-121557 Jeju, Korea, Mar. 26-30, 2012 Source: Ericsson Title: Summary of e-mail discussion [77#26] LTE: CA: Timing reference for SCell-only TA groups.
3GPP TSG-RAN WG2 #77bis Tdoc R2-121559 Jeju, South Korea, Mar. 26-30, 2012 Source: Ericsson, ST Ericsson Title: Timing reference for SCells.
TSG-RAN WG2#77bis R2-121690 Mar. 26-30, 2012 Jeju, Korea Title: Timing reference for SCell TA group Source: Alcatel-Lucent, Alcatel-Lucent Shanghai Bell.
3GPP TSG-RAN WG2 Meeting #77bis R2-121713 Jeju, Korea, Mar. 26-30, 2012 Source: Potevio Title: Considerations on timing reference change for sTAG.
3GPP TSG RAN WG2 #77bis R2-121724 Jeju, Korea, Mar. 26-30, 2012 Source: Intel Corporation Title: Remaining issues on timing reference for sTAG.
3GPP TSG RAN WG2 Meeting #78 R2-122267 Prague, Czech Republic, May 21-25, 2012 Source: New Postcom Title: Considerations on remaining issues of TAG change.
3GPP TSG-RAN WG2 Meeting #78 R2-122313 Prague, Czech Republic, May 21-25, 2012 Source: Huawei, HiSilicon Title: TAG change procedure for the SCell.
3GPP TSG-RAN WG2 Meeting #78 R2-122385 Prague, Czech Republic, May 21-25, 2012 Source: LG Electronics Inc. Title: TAG Re-association Procedure in CA.
3GPP TSG-RAN2#78 R2-122386 Prague, Czech Republic, May 21-25, 2012 Source: NTT Docomo, Inc. Title: SCell status at TAG change.

3GPP TSG-RAN WG2#78 R2-122454 Prague, Czech Republic, May 21-25, 2012 Source: Sharp Title: Remaining issues of TA group handling.
TSG-RAN WG2#78 R2-1212738 Prague, Czech Republic, May 21-25, 2012 Title: TAG related signalling Source: Alcatel-Lucent, Alcatel-Lucent Shanghai Bell.
3GPP TSG RAN WG2 Meeting #78 R2-122852 Prague, Czech Republic, May 21-25, 2012 Source: Fujitsu Title: On the TAG change procedure.
3GPP TSG RAN WG2 Meeting #78 R2-122908 Prague, Czech, May 21-25, 2012 Source: Pantech Title: Considerations on Multiple TA capability.
3GPP TSG-RAN2 Meeting #78 R2-123022 Prague, Czech Republic, May 21-25, 2012 Change Request: 36300 CR 438 rev 1 Current version: 11.1.0 Title: Introduction of Carrier aggregation enhancements Source to WG: Rapporteur (Nokia Corporation). cited byapplicant.
3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).
3GPP TSG RAN WG1 Meeting #66bis R1-113187 Zhuhai, China, Oct. 10-14, 2011 Source: LG Electronics Title: Discussion on Simultaneous Uplink Channel Transmission in Rel-11.
3GPP TSG RAN WG1 Meeting #66bis R1-113314 Zhuhai, China, Oct. 10-14, 2011 Source: Alcatel-Lucent, Alcatel-Lucent Shanghai Bell Title: Multiple Timing Advances for Carrier Aggregation.
3GPP TSG RAN WG1 Meeting #67 R1-113910 San Francisco, USA, Nov. 14-18, 2011 Source: LG Electronics Title: Aspect on Simultaneous Transmission of PRACH and UL Channels considering Multiple Timing Advance.
3GPP TSG-RAN WG1 Meeting #67 R1-114093 San Francisco, USA, Nov. 14-18, 2011 Source: Huawei, HiSilicon Title: RACH based multiple timing advances.
3GPP TSG-RAN WG1 Meeting #68bis R1-120974 Jeju, Korea, Mar. 26-30, 2012 Source: Huawei, HiSilicon Title: Consideration on simultaneous transmission for UL channels in case of MTA.
3GPP TSG-RAN WG1 #68bis R1-121020 Jeju Island, Korea, Mar. 26-30, 2012 Source: Ericsson, ST-Ericsson Title: Channel Prioritization due to Multiple TA.
3GPP TSG RAN WG1 Meeting #68 bis R1-121064 Jeju, Korea, Mar. 26-30, 2012 Source: ZTE Title: Consideration on remaining issues related to multiple TA.
3GPP TSG RAN WG1 Meeting #68bis R1-121084 Jeju, Korea, Mar. 26-30, 2012 Source: CATT Title: UL transmission method with multiple timing advances in Rel-11.
3GPP TSG-RAN WG1 Meeting #68bis R1-121141 Jeju, Korea, Mar. 26-30, 2012 Source: Panasonic Title: UE behavior for power limitation in multiple TA.
3GPP TSG RAN WG1 #68bis R1-121426 Jeju, Korea, Mar. 26-30, 2012 Source: LG Electronics Title: Power limitation in multiple TA.
3GPP TSG-RAN WG1 Meeting #68bis R1-121467 Jeju, Korea, Mar. 26-30, 2012 Source: NTT DOCOMO Title: UL Transmissions in Case of Power Limitation for Multiple TA.
3GPP TSG-RAN WG1 #68bis R1-121551 Jeju, Korea, Mar. 24-30, 2012 Source: Qualcomm Incorporated Title: Power control aspects of multiple TA operation.
3GPP TSG RAN WG1 #68bis R1-121896 Jeju, Korea, Mar. 26-30, 2012 Joint proposal on SRS transmission with multiple TA—full overlap case LG Electronics. CATT, Pantech, Panasonic, Ericsson, ST-Ericsson.
3GPP TSG-RAN WG2 Meeting #76 R2-115755 San Francisco, U.S., Nov. 14-18, 2011 Source: ZTE Title: Discussion on RACH collide with other UL transmission.
3GPP TSG-RAN WG2 Meeting #76 R2-115882 Nov. 14-18, 2011, San Francisco, USA Source: Panasonic Title: Parallel PRACH and PUSCH/PUCCH transmission.
3GPP TSG-RAN WG2 #76 Tdoc R2-115932 San Francisco, United States, Nov. 14-18, 2011 Source: Ericsson, ST Ericsson Title: Parallel Transmission of Preamble and UL Data.
TSG-RAN WG2#76 R2-116184 Nov. 14-18, 2011, San Francisco, USA Title: Simultaneous transmissions of RACH and PUCCH/PUSCH/SRS Source: Alcatel-Lucent, Alcatel-Lucent Shanghai Bell.

(56) References Cited

OTHER PUBLICATIONS

3GPP TSG-RAN WG2 Meeting #76 R2-116311 San Francisco, USA, Nov. 14-18, 2011 Source: Fujitsu Title: Collision between PUCCH and SCell PRACH.
3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TSG-RAN WG2 Meeting #74 R2-112806 May 9-13, 2011, Barcelona, Spain Source: Panasonic Title: RACH on SCell for supporting Multiple Timing Advance.
3GPP TSG-RAN WG2 Meeting #74 R2-112815 Barcelona, Spain, May 9-13, 2011 Source: CATT Title: RA Procedure for Multi-TA.
3GPP TSG-RAN WG2 Meeting #74 R2-112876 Barcelona, Spain, May 9-13, 2011 Source: ZTE Title: Group Model in Multiple TA.
3GPP TSG RAN WG2 #74 R2-112878 Barcelona, Spain, May 9-13, 2011 Source: ZTE Title: Potential PHY Impact of RACH on SCell for MTA.
3GPP TSG RAN WG2 Meeting #74 R2-112925 Barcelona, Spain, May 9-13, 2011 Source: New Postcom Title: Analysis of PCell change on single and multiple TA scenarios.
3GPP TSG-RAN WG2#74 R2-113050 Barcelona, Spain, May 9-13, 2011 Source: Sharp Title: Considerations for RACH initiation on SCell.
3GPP TSG-RAN WG2 meeting #74 R2-113063 Barcelona, Spain, May 9-13, 2011 Source: Qualcomm Incorporated Title: Consideration on multiple TA.
3GPP TSG-RAN WG2 Meeting #74 R2-113067 Barcelona, Spain, May 9-13, 2011 Source: Potevio Title: Random Access on SCell for Supporting Multi-TA.
3GPP TSG-RAN2 #73bis meeting Tdoc R2-113101 Barcelona, Spain, May 9-13, 2011 Source: MediaTek Title: Grouping of multi-TA.
3GPP TSG-RAN2#74 meeting R2-113124 Barcelona, Spain, May 9-13, 2011 Source: Samsung Title: Further discussions of Issues with Multiple-TA.
3GPP TSG RAN WG2 #74 R2-113192 Barcelona, Spain, May 9-13, 2011 Source: ITRI Title: Considerations on Random Access on SCell.
3GPP TSG RAN2#74 meeting R2-113215 Barcelona, Spain, May 9-13, 2011 Source: Intel Corporation Title: Configuration of multiple TA in Rel-11 CA.
TSG-RAN WG2#74 R2-113235 May 9-13, 2011, Barcelona, Spain Title: Initiating timing alignment for SCell in multiple TA Source: Alcatel-Lucent, Alcatel-Lucent Shanghai Bell.
3GPP TSG-RAN WG2#74 R2-113241 May 9-13, 2011, Barcelona, Spain Source: Motorola Mobility Title: Considerations for Supporting Multiple Timing Advances.
3GPP TSG-RAN WG1 #68 R1-120075 Dresden, Germany, Feb. 6-10, 2012 Source: Ericsson, ST-Ericsson Title: Power scaling due to multiple TA values. cited byapplicant.
3GPP TSG RAN WG1 Meeting #68 R1-120093 Dresden, Germany, Feb. 6-10, 2012 Source: CATT Title: UL power control with multiple timing advances in Rel-11.
3GPP TSG RAN WG1 Meeting #68 R1-120123 Dresden, Germany, Feb. 6-10, 2012 Source: Huawei, HiSilicon Title: Discussion on UL control signalling transmission with multiple TAs.
3GPP TSG-RAN WG1 Meeting #68 R1-120130 Dresden, Germany, Feb. 6-10, 2012 Source: InterDigital Communications, LLC Title: Simultaneous UL transmissions in presence of R11 Multiple TA.
3GPP TSG-RAN WG1 Meeting #68 R1-120221 Dresden, Germany, Feb. 6-10, 2012 Source: Panasonic Title: Simultaneous transmissions in multiple TA.
3GPP TSG RAN WG1 Meeting #68 R1-120286 Dresden, Germany, Feb. 6-10, 2012 Source: ZTE Title: Consideration on issues related to multiple TA.
3GPP TSG RAN WG1 Meeting #68 R1-120317 Dresden, Germany, Feb. 6-10, 2012 Source: Pantech Title: Issues on parallel transmission in multiple TA environments.

\* cited by examiner

CARRIER GROUPING IN MULTICARRIER COMMUNICATIONS

CROSS-REFERENCE TO RELATED APPLICATIONS

This application is a continuation of and claims priority to U.S. patent application Ser. No. 17/468,176, filed Sep. 7, 2021 (now U.S. Pat. No. 11,743,853), which is a continuation of U.S. patent application Ser. No. 16/695,476, filed Nov. 26, 2019 (now U.S. Pat. No. 11,147,034), which is a continuation of U.S. patent application Ser. No. 15/201,544, filed Jul. 4, 2016 (now U.S. Pat. No. 10,524,222), which is a continuation of U.S. patent application Ser. No. 14/202,102, filed Mar. 10, 2014 (now U.S. Pat. No. 9,397,875), which is a continuation of U.S. patent application Ser. No. 14/016,946, filed Sep. 3, 2013 (now U.S. Pat. No. 8,717,866), which is a continuation of U.S. patent application Ser. No. 13/887,347, filed May 5, 2013 (now U.S. Pat. No. 8,625,404), which is a continuation of U.S. patent application Ser. No. 13/759,766, filed Feb. 5, 2013 (now U.S. Pat. No. 8,462,610), which is a continuation of U.S. patent application Ser. No. 13/556,165 filed Jul. 23, 2012 (now U.S. Pat. No. 8,395,985), which claims the benefit of U.S. Provisional Application Ser. No. 61/556,045, filed Nov. 4, 2011, U.S. Provisional Application Ser. No. 61/528,226, filed Aug. 27, 2011, and U.S. Provisional Application Ser. No. 61/511,544, filed Jul. 25, 2011, each of which is hereby incorporated by reference in its entirety.

This application is related to U.S. patent application Ser. No. 13/556,317, filed Jul. 24, 2012 (now U.S. Pat. No. 8,391,129). This application is related to U.S. patent application Ser. No. 13/759,805, filed Feb. 5, 2013 (now U.S. Pat. No. 8,520,497). This application is related to U.S. patent application Ser. No. 13/889,825, filed May 8, 2013 (now U.S. Pat. No. 8,644,129).

BACKGROUND

Example embodiments of the present invention enhance time alignment in a multicarrier orthogonal frequency division multiplexing (OFDM) communication system. Embodiments of the technology disclosed herein may be employed in the technical field of multicarrier communication systems. More particularly, the embodiments of the technology disclosed herein may relate to enhancing time alignment in a multicarrier OFDM communication system employing multiple timing advances.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

Some example embodiments of the technology disclosed enhances time alignment in a multicarrier OFDM communication system employing multiple timing advances.

BRIEF DESCRIPTION OF THE SEVERAL VIEWS OF THE DRAWINGS

Examples of several of the various embodiments of the present invention are described herein with reference to the drawings, in which.

SUMMARY

Figure 1:
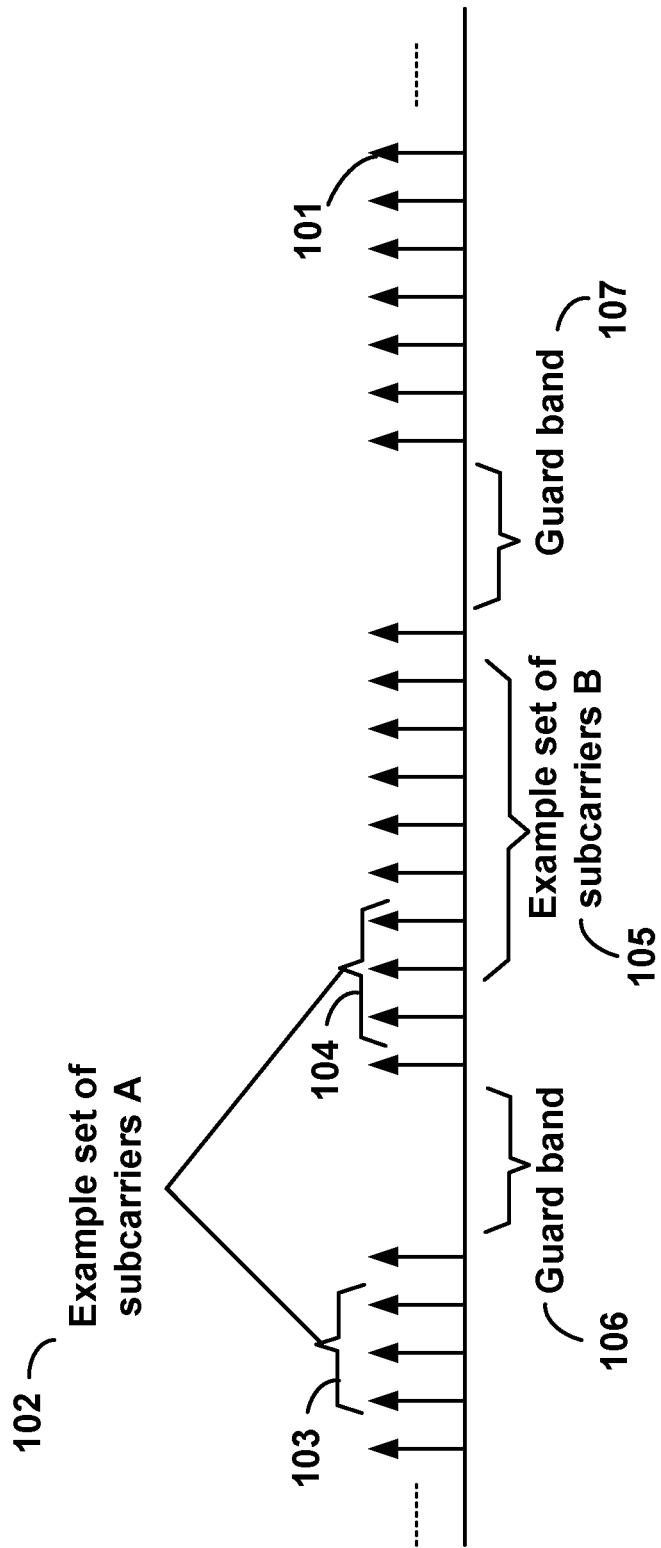
FIG. 1 is a diagram depicting example sets of OFDM subcarriers as per an aspect of an embodiment of the present invention.

According to some of the various aspects of embodiments, a wireless device may receive at least one radio resource control message from a base station. The at least one radio resource control message may cause configuration of a plurality of carriers comprising a first carrier and at least one second carrier. The at least one radio resource control message may comprise a carrier group index for a second carrier in the at least one second carrier. The carrier group index may identify a second carrier group. The second carrier group may be one of a plurality of carrier groups. The second carrier group may comprise a second subset of the at least one second carrier. The wireless device may receive from the base station, a control command. The control command may cause the wireless device to transmit a random access preamble on the second uplink carrier. The control command may comprise a preamble index corresponding to the random access preamble. The wireless device may transmit the random access preamble. Transmission timing of the random access preamble may be determined, at least in part, by employing a synchronization signal transmitted on one of at least one downlink carrier in the second carrier group.

According to some of the various aspects of embodiments, a base station may transmit at least one radio resource control message to a wireless device. The at least one radio resource control message may be configured to cause configuration of a plurality of carriers comprising a first carrier and at least one second carrier. The at least one radio resource control message may comprise a carrier group index for a second carrier in the at least one second carrier. The carrier group index may identify a second carrier group. The second carrier group may be one of a plurality of carrier groups. The second carrier group may comprise a second subset of the at least one second carrier. The base station may transmit to the wireless device a control command. The control command may be configured to cause the wireless device to transmit a random access preamble on the second uplink carrier. The control command may comprise a preamble index corresponding to the random access preamble. The base station may receive the random access preamble. Transmission timing of the random access preamble may be determined, at least in part, by employing a synchronization signal transmitted on one of at least one downlink carrier in the second carrier group.

According to some of the various aspects of embodiments, a wireless device may receive RRC message(s) configuring transmissions of sounding reference signals on a second carrier in a second carrier group. The wireless device may receive a random access response comprising a timing advance command. The wireless device may transmit the sounding reference signals on the second carrier after applying the timing advance command to the second carrier group. The wireless device may be configured to not transmit any of the sounding reference signals on the second carrier during a period between receiving the RRC message and applying the timing advance command to the second carrier group.

DETAILED DESCRIPTION

Example embodiments of the present invention enhance time alignment in a multicarrier OFDM communication system. Embodiments of the technology disclosed herein may be employed in the technical field of multicarrier communication systems. More particularly, the embodiments of the technology disclosed herein may relate to enhancing time alignment in a multicarrier OFDM communication system employing multiple timing advances.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
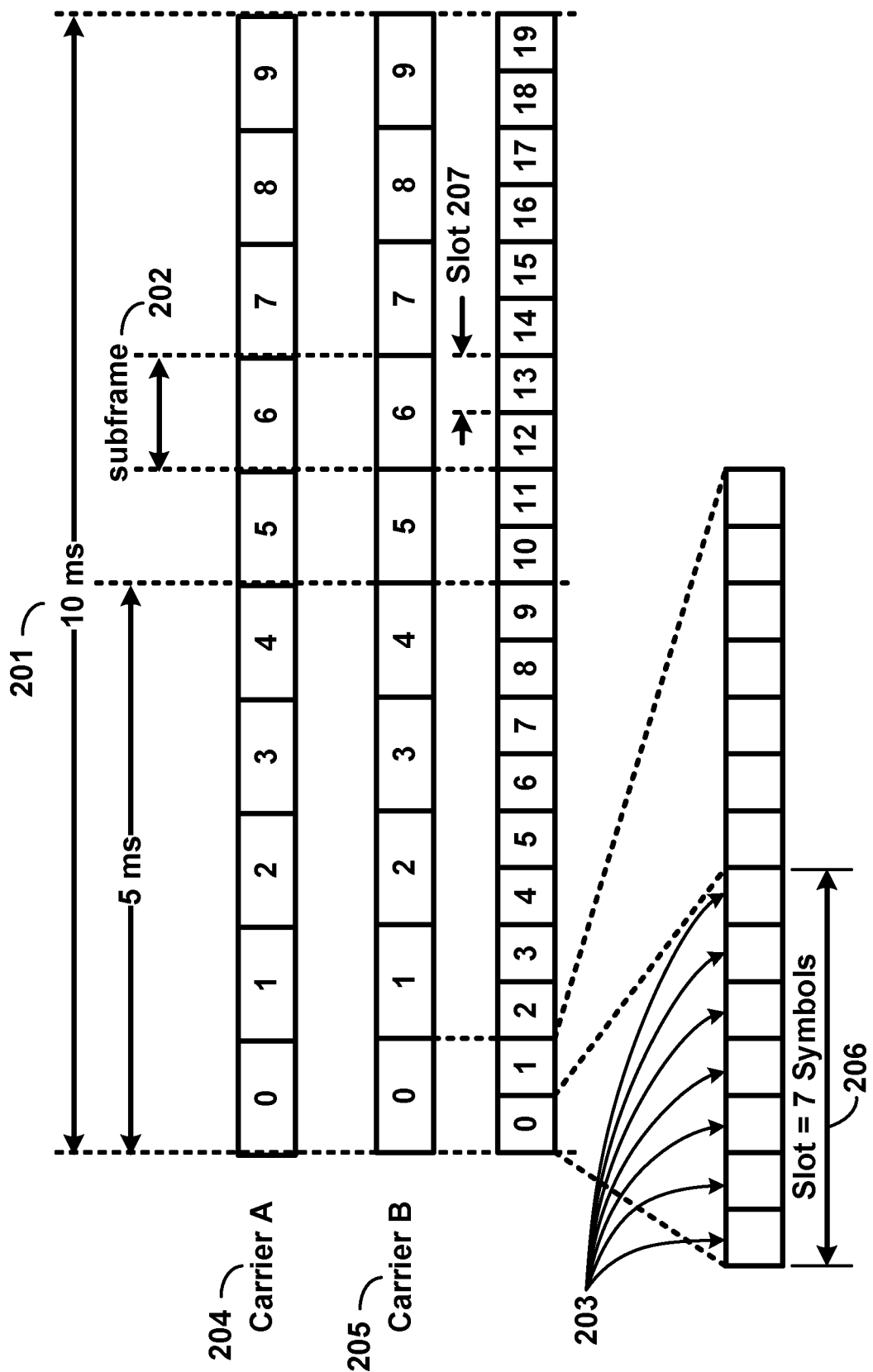
FIG. 2 is a diagram depicting an example transmission time and reception time for two carriers as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 msec radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 msec interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

In an example case of TDD, uplink and downlink transmissions may be separated in the time domain. According to some of the various aspects of embodiments, each 10 msec radio frame may include two half-frames of 5 msec each. Half-frame(s) may include eight slots of length 0.5 msec and three special fields: DwPTS (Downlink Pilot Time Slot), GP (Guard Period) and UpPTS (Uplink Pilot Time Slot). The length of DwPTS and UpPTS may be configurable subject to the total length of DwPTS, GP and UpPTS being equal to 1 msec. Both 5 msec and 10 msec switch-point periodicity may be supported. In an example, subframe 1 in all configurations and subframe 6 in configurations with 5 msec switch-point periodicity may include DwPTS, GP and UpPTS. Subframe 6 in configurations with 10 msec switch-point periodicity may include DwPTS. Other subframes may include two equally sized slots. For this TDD example, GP may be employed for downlink to uplink transition. Other subframes/fields may be assigned for either downlink or uplink transmission. Other frame structures in addition to the above two frame structures may also be supported, for example in one example embodiment the frame duration may be selected dynamically based on the packet sizes.

Figure 3:
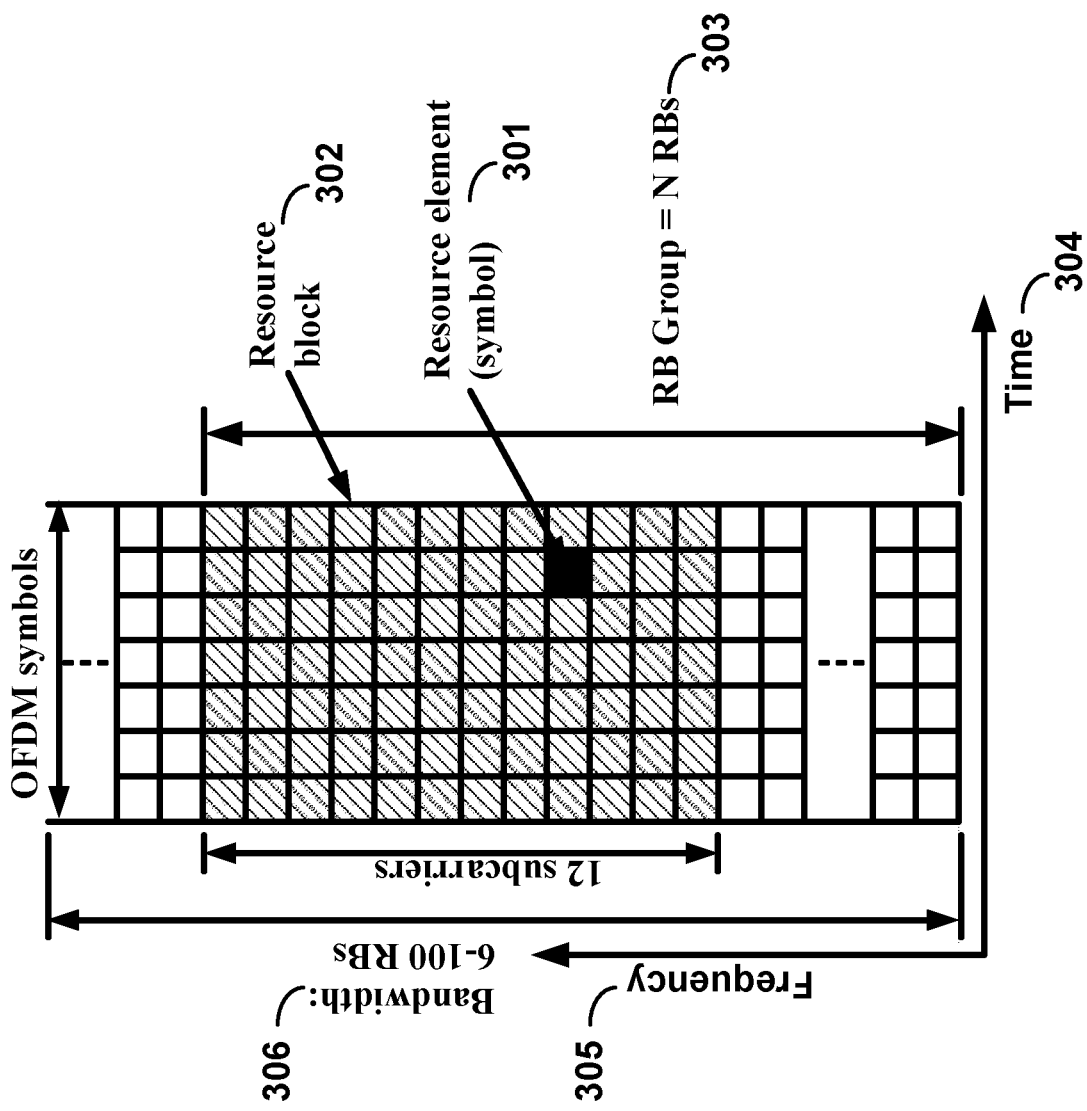
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec.

Physical and virtual resource blocks may be defined. A physical resource block may be defined as N consecutive OFDM symbols in the time domain and M consecutive subcarriers in the frequency domain, wherein M and N are integers. A physical resource block may include M×N resource elements. In an illustrative example, a resource block may correspond to one slot in the time domain and 180 kHz in the frequency domain (for 15 kHz subcarrier bandwidth and 12 subcarriers). A virtual resource block may be of the same size as a physical resource block. Various types of virtual resource blocks may be defined (e.g. virtual resource blocks of localized type and virtual resource blocks of distributed type). For various types of virtual resource blocks, a pair of virtual resource blocks over two slots in a subframe may be assigned together by a single virtual resource block number. Virtual resource blocks of localized type may be mapped directly to physical resource blocks such that sequential virtual resource block k corresponds to physical resource block k. Alternatively, virtual resource blocks of distributed type may be mapped to physical resource blocks according to a predefined table or a predefined formula. Various configurations for radio resources may be supported under an OFDM framework, for example, a resource block may be defined as including the subcarriers in the entire band for an allocated time duration.

According to some of the various aspects of embodiments, an antenna port may be defined such that the channel over which a symbol on the antenna port is conveyed may be inferred from the channel over which another symbol on the same antenna port is conveyed. In some embodiments, there may be one resource grid per antenna port. The set of antenna port(s) supported may depend on the reference signal configuration in the cell. Cell-specific reference signals may support a configuration of one, two, or four antenna port(s) and may be transmitted on antenna port(s) {0}, {0, 1}, and {0, 1, 2, 3}, respectively. Multicast-broadcast reference signals may be transmitted on antenna port 4. Wireless device-specific reference signals may be transmitted on antenna port(s) 5, 7, 8, or one or several of ports {7, 8, 9, 10, 11, 12, 13, 14}. Positioning reference signals may be transmitted on antenna port 6. Channel state information (CSI) reference signals may support a configuration of one, two, four or eight antenna port(s) and may be transmitted on antenna port(s) 15, {15, 16}, {15, . . . , 18} and {15, . . . , 22}, respectively. Various configurations for antenna configuration may be supported depending on the number of antennas and the capability of the wireless devices and wireless base stations.

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
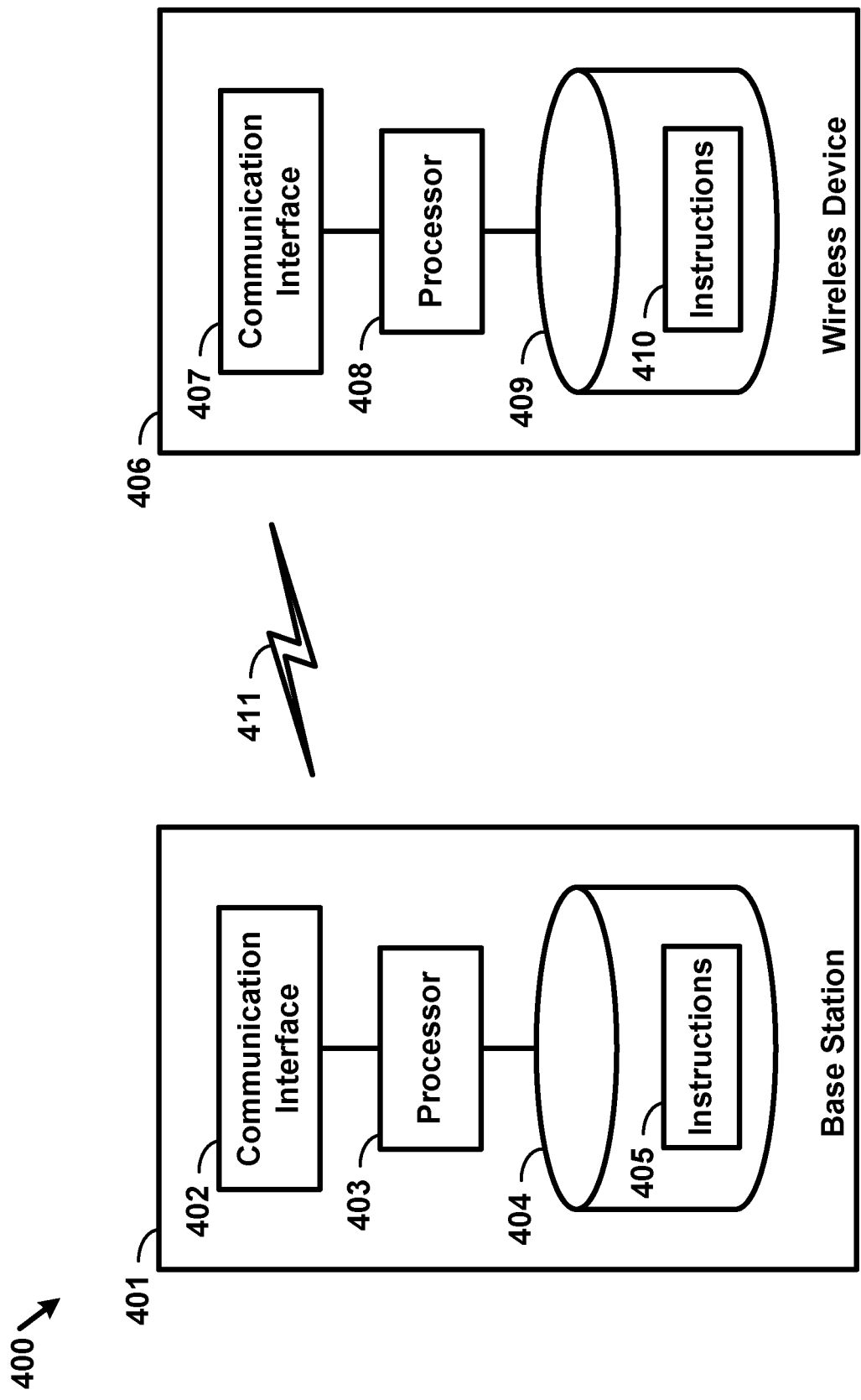
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated in FIG. 1, FIG. 2, and FIG. 3, and associated text.

Figure 5:
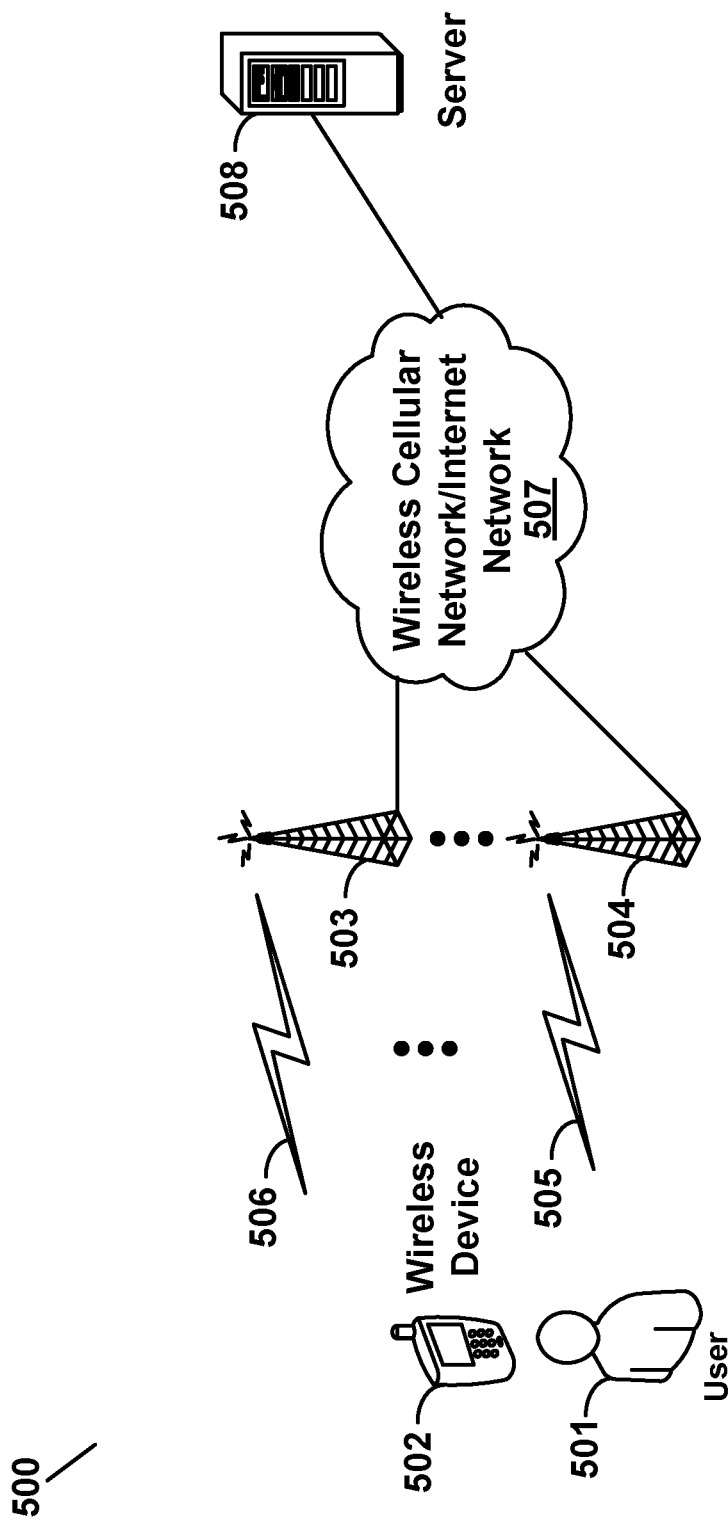
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/ Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/ Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface.

The S1 interface may support a many-to-many relation between MMEs I Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enhance time alignment in a multicarrier OFDM communication system. Other example embodiments may comprise a non-transitory tangible computer readable media comprising instructions executable by one or more processors to cause time alignment in a multicarrier OFDM communication system. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enhance time alignment in a multicarrier OFDM communication system. The device may include processors, memory, interfaces, and/or the like. Other example embodiments may comprise communication networks comprising devices such as base stations, wireless devices (or user equipment: UE), servers, switches, antennas, and/or the like.

A base station may transmit configuration messages to a wireless device causing configuration of a first (primary) carrier and one or more second (secondary) carriers in the wireless device. Serving carriers having uplink to which the same time alignment applies may be grouped in a carrier group. Serving carriers in one carrier group may use the same timing reference. For a given carrier group, a wireless device may use one active downlink carrier as the timing reference at a given time. For a given carrier group, a wireless device may employ the same timing reference for uplink subframes and frames transmission timing of the uplink carriers belonging to the same carrier group. According to some of the various aspects of embodiments, serving carriers having uplink to which the same time alignment applies may correspond to the serving carriers hosted by the same receiver. A carrier group comprises at least one serving carrier with configured uplink. A wireless device supporting multiple carrier groups may support two or more carrier groups. One carrier group contains the first carrier and may be called a first carrier group. In a multiple carrier group configuration, at least one carrier group, called a second carrier group, may contain one or more second carriers and may not contain the first carrier. Carriers within the same carrier group may use the same time alignment value and the same timing reference.

To obtain initial uplink time alignment for a second carrier group, base station may initiate random access procedure. In a second carrier group, wireless device may use one of any activated second carriers from the second carrier group as a timing reference carrier. There may be one timing reference and one time alignment timer (time alignment timer) per carrier group. Time alignment timer for carrier groups may be configured with different values. When the time alignment timer associated with the first carrier group expires, all time alignment timers may be considered as expired and the wireless device may flush all HARQ buffers of all serving carriers, may clear any configured downlink assignment/uplink grants, and RRC may release PUCCH/SRS for all configured serving carriers. When the first carrier group time alignment timer is not running, a second carrier group time alignment timer may not be running. When the time alignment timer associated with second carrier group expires: a) SRS transmissions may be stopped on the corresponding second carriers, b) the type-0 SRS configuration may be released, the type-1 SRS configuration may be maintained, c) CSI reporting configuration for the corresponding second carriers may be maintained, and/or d) MAC may flush the uplink HARQ buffers of the corresponding second carriers.

Upon deactivation of the last active second carrier in a second carrier group, the wireless device may not stop time alignment timer of the second carrier group. Upon removal of the last second carrier in a second carrier group, time alignment timer of the carrier group may not be running. Random access procedures in parallel may not be supported for a wireless device. If a new random access procedure is requested (either by wireless device or network) while another random access procedure is already ongoing, it may be up to the wireless device implementation whether to continue with the ongoing procedure or start with the new procedure. The base station may initiate the random access procedure via a PDCCH order for an activated second carrier. This PDCCH order may be sent on the scheduling carrier of this second carrier. When cross carrier scheduling is configured for a carrier, the scheduling carrier may be different than the carrier that is employed for preamble transmission. Non-contention based random access procedure may be supported for second carriers of a second carrier group. Upon new uplink data arrival the wireless device may not trigger a random access procedure on a second carrier. PDCCH order for preamble transmission may be sent on a different serving carrier than the second carrier in which the preamble is sent. Carrier grouping may be performed without requiring any additional wireless device assisted information.

A wireless device may transmit a scheduling request and/or a buffer status report due to uplink data arrival in the wireless device. A wireless device may transmit a scheduling request when wireless device has data for uplink transmission and wireless device does not receive uplink grants for transmission of buffer status report. Wireless device may transmit a medium access control buffer status report in the uplink to inform the base station about the size of the uplink transmission buffer. A wireless device buffer status report may be transmitted in an uplink resource identified in a received uplink grant. In response to receiving buffer status report, the base station may, selectively and depending on a plurality of criteria, transmit a PDCCH order to the wireless device and may cause the wireless device to start random access procedure on a second carrier (in case of carrier aggregation). A PDCCH order may be triggered by the buffer status report reception due to the uplink data arrival in the wireless device. Preamble transmission may be triggered in the case of uplink data arrival, meaning that preamble transmission may be triggered by the buffer status report reception in the base station. Upon new uplink data arrival the wireless device may not trigger a random access procedure on a second carrier. The base station may trigger the random access procedure based on the buffer status report reception due to uplink data arrival in the wireless device. Base station may consider many parameters in triggering random access on a second carrier, for example, current base station load, wireless device buffer size(s) in buffer status report report(s), wireless device category, wireless device capability, QoS requirements, and/or the like.

Initial timing alignment may be achieved through random access procedure. This involves the wireless device transmitting a random access preamble and the base station responding an initial time alignment command with a time alignment value within the random access response window. The start of the random access preamble may be aligned with the start of the corresponding uplink subframe at the wireless device assuming time alignment value of zero. The base station may estimate the uplink timing from the random access preamble transmitted by the wireless device. Then the time alignment command may be derived by the base station based on the estimation of the difference between the desired uplink timing and the actual uplink timing. The wireless device may determine the initial uplink transmission timing relative to the corresponding downlink of the second carrier group on which the preamble is transmitted. PDCCH order may be used to trigger random access process for an activated second carrier. For a newly configured second carrier or a configured but deactivated second carrier, base station may need to firstly activate the corresponding second carrier and then trigger random access process on it.

According to some of the various aspects of embodiments, a base station may communicate with a mix of wireless devices. Wireless devices may support multiple technologies, or multiple releases of the same technology depending on wireless device category and/or capability. A base station may comprise multiple sectors. When specification refers to a base station communicating with a plurality of wireless devices, specification may refer to a subset of the total wireless devices in the coverage area. Specification may refer to for example a plurality of wireless devices of a given LTE release with a given capability and in a given sector of the base station. The plurality of wireless devices in the specification may refer to a selected plurality of wireless devices, or a subset of total wireless devices in the coverage area, which perform according to the disclosed methods. There may be many wireless devices in the coverage area that may not comply with the disclosed methods, for example because those wireless devices perform based on older releases of LTE technology. The number of time alignment commands transmitted by the base station to a wireless device in a given period may depend, at least in part, on many parameters including at least one of: a) speed that the wireless device moves in the coverage area, b) direction that the wireless device moves in the coverage area, c) coverage radius, d) number of active wireless devices in the coverage area, and/or the like.

According to some of the various aspects of embodiments, the mapping of a serving carrier to a carrier group may be configured by the serving base station with RRC signaling. When needed, the mapping between a second carrier and a carrier group may be reconfigured with RRC signaling. The mapping between a second carrier and a carrier group may not be reconfigured with RRC while the second carrier is configured. The first carrier may not change carrier group and may always be a member of the first carrier group. When a base station performs second carrier addition configuration, the related carrier group configuration may be configured for the second carrier. Base station may modify carrier group configuration of a second carrier by removing (releasing) the second carrier and adding a new second carrier (with same physical carrier ID and frequency) with an updated carrier group index. The new second carrier with the updated carrier group index may be initially inactive subsequent to joining the updated carrier group index. Base station may activate the updated new second carrier and then start scheduling packets on the activated second carrier. It may not be possible to change the carrier group associated with a second carrier but rather the second carrier needs to be removed and a new second carrier needs to be added with another carrier group.

A base station may perform initial configuration based on an initial configuration parameters received from a network node (for example a management platform), an initial base station configuration, wireless device location, wireless device type, wireless device CSI feedback, wireless device uplink transmissions (for example, data, SRS, and/or the like), a combination of the above, and/or the like. For example, initial configuration may be based on wireless device channel state measurements. For example, depending on the signal quality received from a wireless device on various second carriers downlink carrier or by determination of wireless device being in repeater coverage area, or a combination of both, a base station may determine the initial configuration of first and second carrier groups and membership of second carriers to carrier groups.

In an example implementation, the time alignment value of a serving carrier may change, for example due to wireless device's mobility from a macro to a repeater or an RRH (remote radio head) coverage area. The signal delay for that second carrier may become different from the original value and different from other serving carriers in the same carrier group. In this scenario, base station may relocate this time alignment-changed serving carrier to another existing carrier group. Or alternatively, the base station may create a new carrier group for the second carrier, based on the updated time alignment value. Time alignment value may be derived for example through base station measurement of signal reception timing, random access procedure, and/or other standard or proprietary algorithms. A base station may realize that the time alignment value of a serving carrier is no longer consistent with its current carrier group. There may be many other scenarios which require base station to reconfigure carrier groups. During reconfiguration, the base station may need to move the reference second carrier belonging to a second carrier group to another carrier group. In this scenario, the second carrier group would require a new reference second carrier. In an example embodiment, the wireless device may select an active second carrier in the second carrier group as the reference timing second carrier.

Base station may consider wireless device's capability in configuring multiple carrier groups for a wireless device. Wireless device may be configured with a configuration that is compatible with wireless device capability. Multiple carrier group capability may be an optional feature in LTE release 11 and per band combination of multiple carrier group capability may be introduced. Wireless device may transmit its multiple carrier group capability to base station via an RRC message and base station may consider wireless device capability in configuring carrier group configuration of the wireless device.

The time alignment maintenance for the first carrier and first carrier group may follow Rel-10 principles. If a second carrier applying the time alignment of the first carrier is added to the first carrier group, the Rel-10 procedures may be reused. In one example embodiment, there is no need to assign a carrier group index for the first carrier group. Second carriers grouped with the first carrier may be grouped implicitly and a carrier group index for the first carrier group may not be needed or a carrier group index may be assigned implicitly by default (for example, carrier group index 0). Carrier group index may be regarded as zero if the carrier group index field is absent upon second carrier addition. If a second carrier is not configured with a carrier group index, it may apply that the second carrier belongs to first carrier group.

According to some of the various aspects of embodiments, a wireless device may select one second carrier downlink in a secondary carrier group as the downlink timing reference carrier for the secondary carrier group. This may reduce signaling overhead or complexity of implementation and/or increase efficiency. For a wireless device, a second carrier group may have one timing reference carrier. In an example embodiment, the active second carrier with the highest signal quality may be selected as the timing reference second carrier by the wireless device. In another example embodiment, downlink timing reference carrier for a second carrier group may be the second downlink carrier associated with the second uplink carrier where random access process was performed. For preamble transmission, the corresponding downlink of the carrier which the preamble is sent may be used as downlink timing reference. In an example embodiment, wireless device may autonomously select a downlink carrier of an active carrier in the second carrier group as the reference second carrier. When time alignment command is received in random access response or timing alignment command for a carrier group, the wireless device may apply the time alignment value to current uplink timing of the corresponding carrier group.

In an example embodiment, the second carrier served as the timing reference carrier in second carrier group may be deactivated in some cases. In a wireless device, when a second carrier is inactive, the wireless device may switch off some parts of the receiver and/or transmitter corresponding to the second carrier. This act may reduce battery power consumption in the wireless device. In another example embodiment, the reference second carrier in a second carrier group may be released by the serving base station. The timing reference carrier may be changed to another active second carrier in the second carrier group for maintaining uplink timing alignment for second carriers in the same second carrier group. Change of timing reference carrier in a second carrier group may be supported. The reference carrier may also be changed for other reasons such as coverage quality, random access process failure, reference second carrier release, subscriber mobility, a combination of the above, and/or the like. In an example embodiment, when the reference timing second carrier is released or is deactivated, the wireless device may autonomously change the timing reference carrier to another active second carrier in the second carrier group. For example, initially downlink second carrier in which random access is transmitted may be used as a timing reference and then the wireless device may use another second carrier in the carrier group as the timing reference, when the reference second carrier needs to be changed.

A preamble may be sent by a wireless device in response to the PDCCH order on a second carrier belonging to a second carrier group. Preamble transmission for second carriers may be controlled by the network using PDCCH order. Random access response message in response to the preamble transmission on second carrier may be addressed to RA-CRNTI in the first carrier common search space. Once the random access preamble is transmitted, the wireless device (that transmitted the preamble) may monitor the PDCCH of the first carrier for random access response(s). Wireless device may monitor the PDCCH in the random access response window. The wireless device may stop monitoring for random access response(s) after successful reception of a random access response containing a random access preamble identifier that matches the transmitted random access preamble.

If the random access response contains a random access preamble identifier corresponding to the transmitted random access preamble, the wireless device may consider this random access response reception successful and apply the random access response for the serving carrier where the random access preamble was transmitted. The wireless device may process the received timing advance command. The wireless device may process the received uplink grant value and indicate it to the lower layers. In an example implementation, the second carrier index in the uplink grant may not be transmitted in the uplink grant in random access response and the uplink grant contained in the random access response may be applicable to the carrier where the preamble was sent. According to some of the various aspects of embodiments, preamble identifier may be included in a random access response to address possible preamble misdetection by the base station. Wireless device may compare the preamble identifier in random access response with the transmitted preamble identifier to verify the validity of the random access response and to verify possible preamble misdetection by base station. The base station may transmit at least one RRC message to a wireless device causing configuration of random access resources in a wireless device. In the first carrier group, random access resources may be configured on the first carrier, and no second carrier in the first carrier group may be configured with random access resources. One or more second carriers in a second carrier group may be configured with random access resources. This may allow the base station to trigger random access process on any one of the second carriers (in the second carrier group) that is configured with random access resources. For the first carrier group, random access process may be performed only on the first carrier. This feature may provide flexibility to the base station in selecting a second carrier for random access process in a second carrier group. It may be noted that carrier configuration may be wireless device specific, and two wireless devices may be configured with different first carrier and different carrier group configurations.

If a wireless device receives an RRC message that causes the wireless device to be configured to transmit sounding reference signal on a second carrier, the wireless device may transmit sounding reference signal if the second carrier is in-sync. The second carrier is in-sync, if time alignment timer for the corresponding second carrier group is running. In an example embodiment, if a second carrier is configured and is associated with a second carrier group that is out-of-sync (time alignment timer is not running), the base station may initiate random access process on a second carrier in the second carrier group. In response to successful completion of random access process in the second carrier group, the wireless device may start sounding reference signal transmission on uplink carriers of second carriers (in the second carrier group) with configured sounding reference signal transmission. Wireless device may not transmit sounding reference signal in the uplink of a second carrier belonging to an out-of-sync second carrier group. When sounding reference signal is configured for a second carrier belonging to an out-of-sync second carrier group, a wireless device may not send sounding reference signal until wireless device receives a random access response including a time alignment value, and an uplink grant, because otherwise sounding reference signal may be sent with incorrect transmission power and/or timing. Uplink grant may include power control information. The wireless device may receive time alignment value, uplink resources and a power control command to adjust the uplink transmission timing and power before the wireless device starts to send sounding reference signal (if configured for the second carrier).

If no random access response is received within the random access response window, or if none of all received random access responses contains a random access preamble identifier corresponding to the transmitted random access preamble, the random access response reception may be considered not successful and the wireless device may increment a preamble transmission counter by one. If the counter reaches a predefined value and if the random access preamble is transmitted on the first carrier, wireless device may indicate a random access problem to RRC layer. The first carrier group may be considered out of sync, and uplink transmissions (except transmission of an uplink preamble) may stop. RRC layer may indicate a radio link failure. If the counter reaches a predefined value and if the random access preamble is transmitted on a second carrier, wireless device may consider the random access procedure unsuccessfully completed. The wireless device may not indicate a random access problem to RRC layer in this case, and no radio link failure may be indicated. The wireless device may continue uplink transmissions on that carrier group. The time alignment state of the carrier group may remain in-sync if the time alignment timer is running.

LTE Rel-8, 9 & 10 timing advance (alignment) command MAC control element (CE) has a fixed size of one octet and contains 2 reserved bits (R bits). LTE Rel-8, 9 & 10 supports only one carrier group and there is no need to indicate to which carrier group the time alignment command may apply. The time alignment command is applied to uplink carriers including first carrier and second carrier(s) of a wireless device. There is a need for enhancing the time alignment procedure in LTE Rel-8, 9 & 10 to efficiently support multiple carrier groups. In release 11 or above, when multiple carrier groups are configured, a MAC CE identifying the carrier group to which the time alignment value applies may be used. The R bits may be employed to signal the carrier group to which the time alignment value applies. The R bits of the timing advance command MAC control elements may be employed to signal the time alignment group. In this embodiment, one time alignment is included in a MAC CE. If multiple time alignment, each for a different carrier group, need to be transmitted, then multiple CEs may be transmitted.

According to some of the various aspects of embodiments, when the R bits are set to 0, MAC CE indicates the carrier group of the first carrier (first carrier group) and other values are addressed to other carrier groups (second carrier groups). This would allow for a maximum of four time alignment groups. Zero may be used for the R bits correspond to first carrier group, and other values may be used for second carrier groups. This solution may reduce the changes to the release 8, 9, 10 MAC layer, and enhance the MAC CE time alignment command to multiple carrier groups. RRC layer may configure carrier groups for a second carrier (implicitly or explicitly) and may assign a carrier group index to a carrier group. The index that is introduced for a carrier group in RRC may be employed for the setting of the R bits. Carrier group index configured by RRC may be used to indicate carrier group where the time alignment command applies. This may imply that the RRC signaling may configure up to 4 carrier group indices.

One carrier group in one time alignment command may be supported. R.11 or above wireless devices may check R bits in MAC CE, but R.10 or below wireless devices may not need to check the R bits. According to some of the various aspects of embodiments, an R.11 or above wireless device with one configured carrier group (first carrier group) may not need to check the R bits. A 6-bit time alignment value may be associated with a carrier group using 2-bit carrier group index. This enhancement may support transmitting time alignment value for a specific carrier group without adding the size of MAC CE command compared to release 8, 9, 10. Two bits of carrier group index bits are introduced before the 6 bits of time alignment value. This may require a new definition for MAC CE command that would be applicable to release 11 or above wireless devices. A method to introduce this new MAC CE command is to introduce a new MAC LCID for this new format. This is a viable implementation option. This may increase the number of used MAC LCIDs. An embodiment is introduced here that would allow to use the same MAC LCID as in Rel-8, 9 & 10 for Rel-11 multiple carrier group configuration. The same LCID as in Rel-8, 9 & 10 may be used in this embodiment applicable to multiple carrier group configuration in release 11 or beyond. Base station transmits time alignment MAC CEs to wireless devices in unicast messages. Base station has the information about the current LTE release supported by the wireless device. This information may be available to the base station via network signaling or via air interface signaling (wireless device capability message received from the wireless device). Base station may use the same LCID for the legacy time alignment MAC CE and the newly introduced time alignment MAC CE. If the MAC CE is transmitted to the release 8, 9, 10 LTE wireless devices, then the R bits may not include a carrier group index. If the MAC CE is transmitted to the release 11 or above wireless devices, then the R bits may include the carrier group index if multiple carrier groups are configured. If multiple carrier groups are not configured, then time alignment value is applied all the configured and active carriers.

This enhancement may not require introducing a new LCID, although a new MAC CE format is introduced for transmitting time alignment commands. Both legacy time alignment MAC CEs and new time alignment MAC CEs may use the same LCID and that reduces the number of LCIDs used in the MAC layer (compared with the scenario where a new LCID is introduced) and may further simplify wireless device implementation. Base station may consider wireless device LTE release or may consider the number of configured carrier groups (1 for first carrier group only configuration, more than 1 for first carrier group and second carrier group configuration) to decide if legacy MAC CE format should be used or new MAC CE format should be used. If a wireless device is a release 8, 9, 10, then legacy MAC CE is used. For release 11 or above wireless devices with one carrier group configuration (only first carrier group), base station may use legacy MAC CE, or use new MAC CEs with RR bits set to first carrier group index (for example 0 for first carrier group). For release 11 or above wireless devices (or for release 11 or above wireless devices with multiple carrier group configuration), base station may use the new MAC CE format, wherein RR bits set to the carrier group index, which was configured in wireless device employing RRC configuration messages.

In an example, wireless devices (for example: wireless device1, wireless device2) communicating with a base station may support different releases of LTE technology. For example, wireless device2 may support releases 8, 9, 10, and 11 of LTE, and wireless device1 may support releases 8, 9 and 10 (or for example may support release 8, or may support 8 & 9). In another example, wireless devices (for example: wireless device1, wireless device2) communicating with a base station may support different capabilities of LTE technology. For example, wireless device2 may support multiple carrier groups, and wireless device1 may not support multiple carrier groups. Base station may send MAC time alignment CEs to the wireless devices (wireless device1, wireless device2) in unicast messages. MAC time alignment CEs may have the same LCID for wireless device1 and wireless device2. The wireless devices (wireless device1, wireless device2) may interpret MAC time alignment CE messages for adjusting uplink timing differently dependent on the LTE release they support and are operating. The same exact message may be processed differently by wireless device1 and wireless device2. For example, in a scenario, where MAC LCID indicate MAC time alignment CE, and RR field is 00, wireless device1 may not consider the value of the two bits before time alignment value (RR). Wireless device1 may change the uplink transmission timing for all configured and active uplink carriers according to the time alignment value in the MAC command. Wireless device2 may however, decode the value of two bits before time alignment value (RR=carrier group index), and when the two bits are for example 00, wireless device1 may only update the transmission timing for active carriers belonging to first carrier group according to the time alignment value. The first two bits may indicate the carrier group index to which the time alignment may apply. Therefore, the same MAC CE message content may be processed differently by different wireless devices operating in different LTE releases. In another example embodiment, multiple carrier groups feature may be an optional feature in release 11. Wireless device1 may be a release 11 wireless device without multiple carrier group capability. Wireless device2 may be a release 11 (or above) wireless device with multiple carrier group capability. A wireless device with multiple carrier group capability may also operate in a single time alignment mode depending on base station release and/or network configuration (one carrier group configuration). For example, when a multiple carrier group release 11 wireless device communicate to a release 10 base station, it may interpret all base station commands as release 10 commands.

According to some of the various aspects of embodiments, a base station may transmit a plurality of unicast timing advance commands to a plurality of wireless devices for adjusting uplink transmission timing by the plurality of wireless devices. Each of the plurality of wireless devices may operate in a mode. The mode may comprise: a) a first mode employable by all of the plurality of wireless devices, or b) a second mode employable only by a subset of the plurality of wireless devices. Each of the plurality of wireless devices being addressed by at least one of the plurality of unicast timing advance commands may interpret differently the at least one of the plurality of unicast timing advance commands depending on the mode in which each of the plurality of wireless devices is operating. The plurality of unicast timing advance commands may have the same format for the plurality of wireless devices operating in the first mode and the plurality of wireless devices operating in the second mode. The format may comprise: a) a subheader being the same for the plurality of unicast timing advance commands, and b) a control element comprising a timing advance value. The first mode may be configured to be compatible with release 10 of LTE-Advance technology. The second mode may be configured to be compatible with release 11 of LTE-Advance technology.

During the connection establishment process, a base station may transmit a first control message to a wireless device (wireless device) on a first downlink carrier of a first carrier to establish a first signaling bearer with the wireless device on the first carrier. The wireless device may transmit radio capability parameters to the base station on the first signaling bearer on a first uplink carrier of the first carrier.

According to some of the various aspects of embodiments, radio capability parameters may include a parameter indicating support for multiple carrier groups. Support for multiple carrier groups may be considered an optional feature in release 11, and a base station may not know if a wireless device supports multiple carrier groups capabilities until it receives a wireless device capability message from the wireless device indicating that the wireless device supports multiple carrier groups feature. Before base station configures first carrier group and second carrier group(s), base station may receive and process wireless device capability regarding wireless device multiple carrier groups capabilities. Supporting multiple carrier group capability may require that wireless device includes new hardware and/or software features that provide such a capability. Multiple time alignment capability may be an optional capability for Rel-11 wireless device and its support may depend on wireless device's hardware, DSP, software designs, and/or the like. A wireless device may send at least one time alignment capability parameter to the base station. Base station may configure wireless device's second carrier group(s) and first carrier group within the wireless device capability. For example, a wireless device may indicate how many second carrier groups it may support. Base station may configure wireless device second carrier group(s) based, at least in part, on the number of supported second carrier groups in a wireless device. In another example, wireless device may explicitly or implicitly indicate if it supports inter-band or intra-band multiple carrier groups, or both. In an example embodiment, support for multiple carrier groups may be mandatory in release 11. A base station may find out about multiple carrier group capability employing information exchanged between the wireless device and the base station.

According to some of the various aspects of embodiments, multiple carrier group capability may be explicitly or implicitly communicated to base station. In an example embodiment, inter-band and/or intra-band carrier aggregation may be configured with multiple carrier groups. Wireless device may send multiple carrier group capability based on each supported band combinations. Wireless devices that could be configured with inter-band carrier aggregation may need multiple carrier groups (multiple time alignment) configuration. Carriers in a band may experience a different delay compared with a different band and a band may need its own carrier group configuration. A carrier group configuration for carriers for a band may be required. In a multiple band wireless device, multiple carrier groups may be configured, for example one carrier group per band. Wireless device may comprise a plurality of RF chains to support inter-band carrier aggregation. A wireless device may support multiple carrier groups if the wireless device support inter-band carrier aggregation. In an example embodiment, when a wireless device transmits wireless device band combination information for inter-band carrier aggregation, it may imply that that wireless device supports multiple carrier groups for those bands, and transmission of a separate information element for multiple carrier group capability may not be required.

A wireless device transceiver architecture may support non-contiguous and/or contiguous carrier aggregation in intra-band. Wireless device may support multiple carrier groups in partial or all supportable intra-band carrier aggregation. Support for multiple carrier groups may depend on wireless device structure, and some wireless devices may not support intra-band multiple carrier group configurations depending on wireless devices transceiver structure. In an example embodiment, a wireless device may communicate its multiple carrier group capability to the base station for intra-band communication. A wireless device may transmit the multiple carrier group capability information for contiguous intra-band carrier aggregation and/or non-contiguous intra-band carrier aggregation. In another example embodiment, a wireless device may also communicate wireless device inter-band carrier group capability to the base station.

According to some of the various aspects of embodiments, a wireless device may indicate its multiple carrier group capability in different information elements for inter-band and intra-band multiple carrier group capability. Each information element may have its own format. In an example embodiment, multiple carrier group capability for intra-band and/or inter-band may be communicated employing at least one parameter and may comprise an index, for example, a band combination index, a configuration index, a band-type index, a combination of the above, and/or the like. The base station may employ an internally stored look-up table to interpret the index. Wireless device may transmit at least one parameter including the index to the base station. The base station may use a set of pre-stored configuration options (for example in a look-up table, information list, a stored file, and/or the like format). The base station may receive the index and determine some of the multiple carrier groups capabilities according to the index. For example, an index three may indicate a multiple carrier group capability supporting band A and band B. In another example, an index four may indicate a multiple carrier group capability of a pre-define intra-band configuration. These configurations are for example only and other examples employing configuration index may be possible. The indexing may reduce the number bits employed for transmitting multiple carrier group capability to the base station.

In an example embodiment, a wireless device may indicate its multiple carrier group capability in an information elements for inter-band and intra-band multiple carrier group capability. All the possible inter-band and intra-band combinations may be transmitted in the same information element field and a base station may detect wireless device inter-band and intra-band capability employing the received information element, for example, in a wireless device capability message. In an implementation option, an index may be employed to indicate both inter-band and intra-band configuration options.

According to some of the various aspects of embodiments, abase station may receive (explicitly or implicitly) information about whether a wireless device supports multiple carrier group capability using network signaling on an interface to the core network (for example the interface to mobility management entity). This information may be received from a mobility management entity during the RRC connection signaling. Some of the multiple carrier groups options may be considered supported by default or may be considered supported based on some other capability parameters. For example, any wireless device supporting inter-band carriers and supporting multiple carrier groups feature may be assumed that is supporting inter-band multiple time alignments. Or for example, intra-band time alignment may be considered a default feature of the wireless device supporting multiple carrier groups feature. In another example, support for intra-band time alignment may need to be explicitly reported to base station by the wireless device.

In an example embodiment, both inter-band and intra-band carrier aggregation may support multiple carrier groups configurations. For example, carriers in the same carrier group may be in the same or different bands. In another example, carriers in the same band may belong to same or different carrier groups. In an example embodiment, carrier group configuration may not be band-specific and may work with the current wireless device working band combination. In another example, a wireless device may report its multiple carrier group capability based on supported band combinations. Support for multiple carrier group configurations may imply that one or more of the following features are supported by the wireless device: i) Parallel transmission of a preamble on a second carrier uplink carrier (second carrier PRACH) and PUSCH on at least one other carrier; ii) Parallel transmission of a preamble on second carrier uplink carrier (second carrier PRACH) and PUCCH on at least one other carrier, for example the first carrier; iii) Parallel transmission of preamble on second carrier uplink carrier, PUCCH (for example on first carrier), and PUSCH on at least one other carrier. This feature may be supported if parallel transmission of PUCCH and PUSCH is supported by the wireless device; iv) Processing MAC time alignment CE commands including carrier group index. The wireless device may apply the time alignment value to the proper carrier group according to carrier group index in the MAC time alignment CE; v) Running random access process on a second carrier belong to a second carrier group. This feature may require transmission of random access preamble on an uplink carrier belonging to a second carrier of a second carrier group; vi) Maintaining more than one time alignment timer in the wireless device; vii) Grouping carriers into multiple carrier groups, wherein a carrier group timing is managed based, at least in part, on a different timing reference second carrier and time alignments associated with a carrier group. A wireless device may need to synchronize and track synchronization signals of multiple downlink carriers, one reference carrier synchronization signal for a carrier group. A carrier group may have its own timing reference second carrier, which is different than the timing reference carrier of another carrier group.

In an example embodiment, a wireless device supporting multiple carrier groups feature may support one or more of the above features. For example, the supported feature may be based, at least in part, on the parameters of the wireless device capability message and other predetermined parameters (explicitly or implicitly determined by signaling messages or technology specifications) and/or other signaling messages. In an example embodiment, a wireless device supporting multiple carrier groups feature may support all the features itemized above. A wireless device that does not support multiple carrier groups feature may support none of the above features. In another example embodiment, a wireless device supporting multiple carrier groups feature may support all the above features. A wireless device that does not support multiple carrier groups feature may not support all-of-the-above features.

Figure 7:
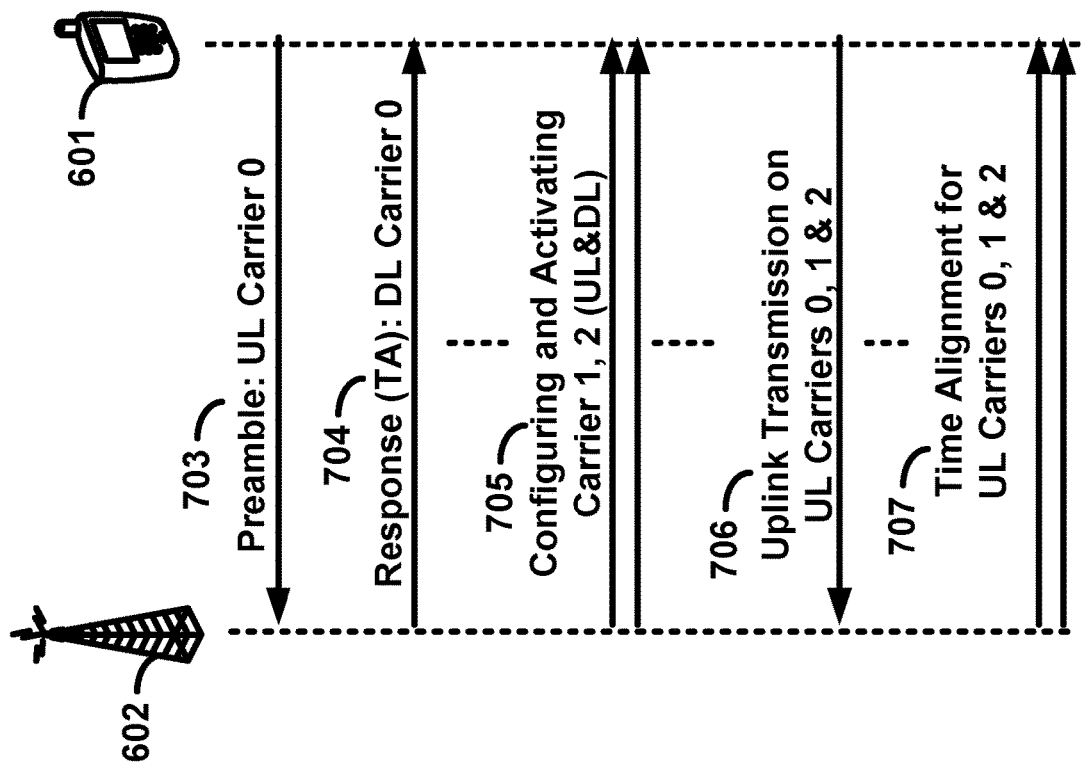
FIG. 7 depicts message flows between a base station and a wireless device as per an aspect of an embodiment of the present invention.

According to some of the various aspects of embodiments, the base station may transmit a synchronization signal on a first downlink carrier via the communication interface. The synchronization signal may indicate a physical cell ID for the first carrier. The synchronization signal may provide timing information for the first downlink carrier. In an example embodiment, the synchronization signal may be a signal with a pre-defined structure that is transmitted at a predefined time and subcarriers. FIG. 7 depicts message flows between a base station 602 and a wireless device 601 as per an aspect of an embodiment of the present invention. The base station 602 may receive a random access preamble 703 on a second plurality of subcarriers from the wireless device 601 on a first uplink carrier in the plurality of uplink carriers. The first uplink carrier corresponds to the first downlink carrier. The timing of the random access preamble is determined based, at least in part, on the synchronization signal timing and many other parameters including parameters received from the base station by the wireless device. The base station 602 may transmit a long time alignment command 704 in a random access response to the wireless device 601 on a third plurality of subcarriers on the first downlink carrier. The long time alignment command may indicate an amount of required time adjustment for signal transmission on the first uplink carrier.

The base station may transmit at least one configuration message 705 to the wireless device. The at least one configuration message is configured to configure at least one additional carrier (also called secondary carrier or second carrier) in the wireless device. An additional carrier in the at least one additional carrier may comprise an additional downlink carrier and zero or one additional uplink carrier.

The base station may also configure carrier groups comprising a first carrier group and a second carrier group. The first carrier group includes the first carrier and zero or more additional carrier. The second carrier group includes at least one of the at least one additional carrier. The base station may also transmit an activation command 705 to the wireless device. The activation command may be configured to activate in the wireless device at least one of at least one additional carrier.

The base station 602 may transmit a control command to the wireless device 601 for transmission of a random access preamble on one of the additional uplink carriers of the second carrier group. The base station may transmit a random access response containing a long time alignment command in response to reception of said random access preamble. The base station may transmit signals to the wireless device on the first downlink carrier and at least one additional downlink carrier. The signals may carry control packets or data packets, or may be physical layer signals. Frame and subframe transmission timing of the first downlink carrier and the at least one additional downlink carrier may be substantially synchronized. Base station 602 may receive signals 706 from the wireless device 601 on the first uplink carrier and the at least one additional uplink carrier. The received signals 706 may carry control or data packets, or may be physical layer signals. The base station 602 may transmit at least one short time alignment command 707 to the wireless device 601. The short time alignment command comprises at least one short time alignment entity. Each short time alignment entity may comprise: a) an amount of time adjustment, and b) an index identifying a carrier group. Long time alignment commands are contained in random access responses. Short time alignment commands are contained in MAC time alignment command control elements.

Figure 6:
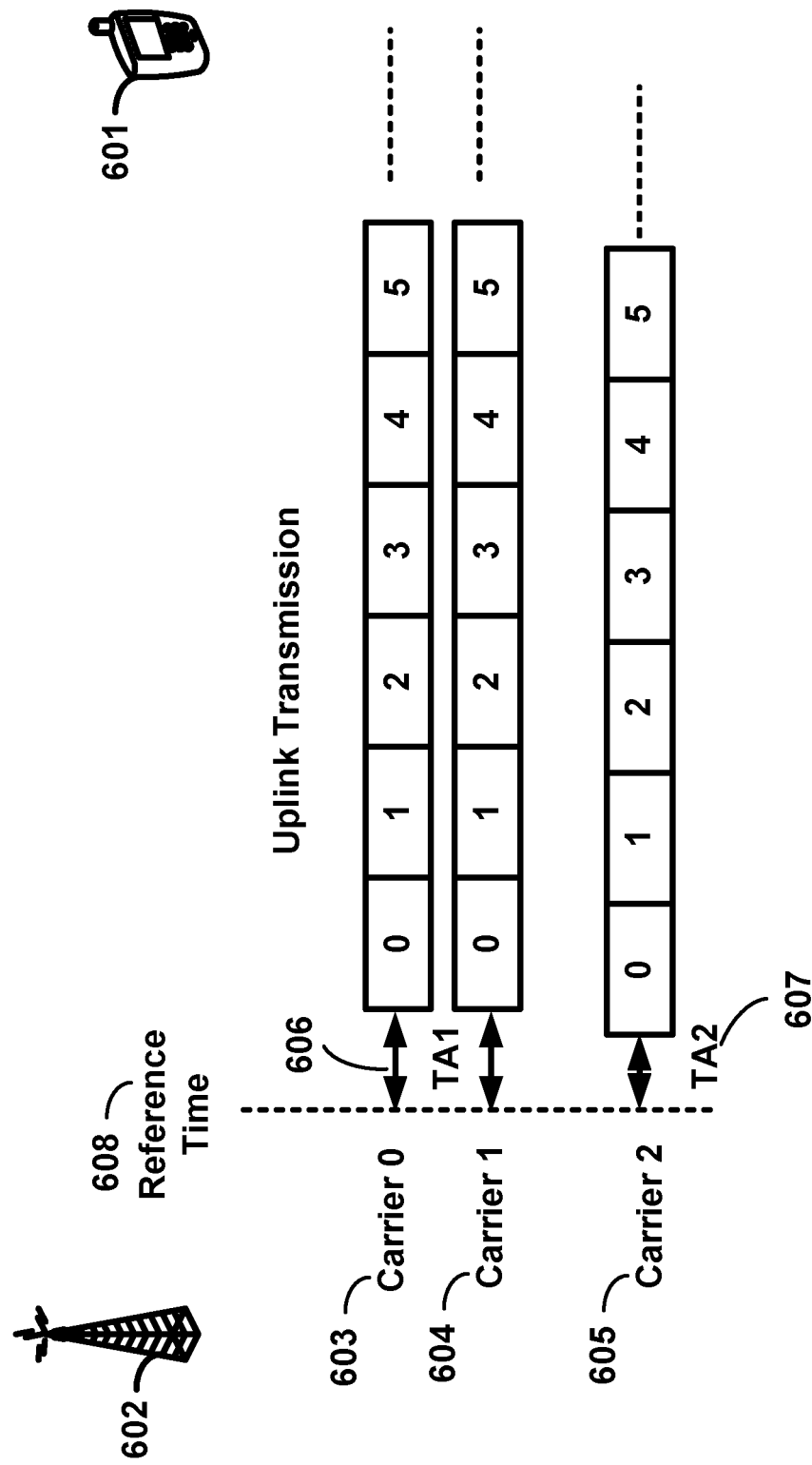
FIG. 6 illustrates the subframe timing as per an aspect of an embodiment of the present invention.

FIG. 6 illustrates the subframe timing as per an aspect of an embodiment of the present invention. The subframe signals of carrier zero 603, carrier one 604 and carrier two 605 are transmitted by the wireless device 601. Carriers are divided into two groups. The first group includes carrier 0 and carrier 1, and the second group includes carrier 2. The signals of a carrier may experience a different transmission delay compared to another carrier. In an example, the signals received from carrier zero 603 and carrier one 604 require TA1 606, and the signals received from carrier two 605 requires TA2 607 in order to be aligned with the reference time 608 at the base station 602. Base station 602 transmits time alignment commands to the wireless device. The time alignment commands are configured to cause adjustment of carrier(s) transmission time. The time alignment value for different carrier groups may be different. Upon reception of the commands by the wireless device 601, the wireless device 601 may adjust uplink carrier signal timings of the corresponding carrier group accordingly. Then the received signals at the base station 602 may become substantially synchronized with the signals received from other wireless devices (not shown in the FIG. 6). In this example, signal reception time of carrier zero 603, carrier one 604 and carrier two 605 are to be substantially synchronized at the base station 602.

According to some of the various aspects of embodiments, the primary synchronization signal may be generated employing a frequency-domain Zadoff-Chu sequence. The primary synchronization signal may be mapped to the last OFDM symbol in slots 0 and 10 for FDD frame structure. The primary synchronization signal may be mapped to the third OFDM symbol in subframes 1 and 6 for TDD frame structure. The secondary synchronization signal may be generated employing an interleaved concatenation of two length-31 binary sequences. The concatenated sequence may be scrambled with a scrambling sequence given by the primary synchronization signal. The secondary synchronization signal may differ between subframe 0 and subframe 5. The timing information provided by synchronization signal may comprise subframe timing and frame timing.

The base station may transmit a control command, for example in the form of a PDCCH order, to the wireless device initiating transmission of the random access preamble by the wireless device. In the first carrier group, the transmission of the random access preamble on the first carrier may be initiated by the MAC sub-layer in the wireless device. The base station may transmit random access parameters to the wireless device. The parameters may be employed for generating a random access preamble by the wireless device. The parameters may also be employed for determining a transmission time for the random access preamble by the wireless device. The long time alignment command transmitted by the base station may be included in a random access response message. The configuring task of the at least one additional carrier may comprise configuring at least one of a physical layer parameter, a MAC layer parameter and an RLC layer parameter. The activating task of a carrier in the at least one additional carrier in the wireless device may comprise processing the received signal of the carrier by the wireless device. The activating task may also comprise the wireless device potentially transmitting packets/signals employing the carrier. There may be at least a guard band between two carriers.

According to some of the various aspects of embodiments, the random access procedure may be initiated by a physical downlink control channel (PDCCH) order or by the MAC sublayer in the wireless device. If a wireless device receives a PDCCH message consistent with a PDCCH order masked with its radio identifier, it may initiate a random access procedure. Preamble transmission on physical random access channel (PRACH) may be supported on the uplink carrier and reception of a PDCCH order may be supported on the downlink carrier. Before the wireless device initiates transmission of a random access preamble, it may access one or many of the following information: a) the available set of PRACH resources for the transmission of the random access preamble, b) the groups of random access preambles and the set of available random access preambles in each group, c) the random access response window size, d) the power-ramping factor, e) the maximum number of preamble transmissions, f) the initial preamble power, g) the preamble format based offset, h) the contention resolution timer, and/or the like. These parameters may be updated from upper layers or may be received from the base station before a random access procedure is initiated.

The wireless device may select a random access preamble using the available information. The preamble may be signaled by the base station or it may be randomly selected by the wireless device. The wireless device may determine the next available subframe containing PRACH permitted by the restrictions given by the base station and physical layer timing requirements for TDD or FDD. Subframe timing and the timing of transmitting the random access preamble may be determined based on the synchronization signals received from the base station and the information received from the base station. The wireless device may proceed to the transmission of the random access preamble when it has determined the timing. The random access preamble is transmitted on a second plurality of subcarriers on the first uplink carrier.

Once the random access preamble is transmitted, the wireless device may monitor the PDCCH of the first downlink carrier for random access response(s) identified by the RA-RNTI during the random access response window. RA-RNTI is the identifier in PDCCH that identifies a random access response. The wireless device may stop monitoring for random access response(s) after successful reception of a random access response containing a random access preamble identifier that matches the transmitted random access preamble. Base station random access response may include a long time alignment command. The wireless device may process the received long time alignment command and adjust its uplink transmission timing according the time alignment value in the command. For example, in a random access response, long time alignment command may be coded using 11 bits, where an amount of the time alignment is based on the value in command. When an uplink transmission is required, the base station may provide the wireless device a grant for uplink transmission.

If no random access response is received within the random access response window, or if none of all received random access responses contains a random access preamble identifier corresponding to the transmitted random access preamble, the random access response reception may be considered not successful and the wireless device may, based on the backoff parameter in the wireless device, select a random backoff time. The wireless device may delay the subsequent random access transmission by the backoff time, and may retransmit another random access preamble. The wireless device may transmit packets on the first uplink carrier and the at least one additional uplink carrier. Uplink packet transmission timing for a carrier group may be obtained in the wireless device employing, at least in part, timing of a synchronization signals received in a downlink carrier of the carrier group. Upon reception of a timing alignment command by the wireless device, the wireless device may adjust the uplink transmission timing of the corresponding carrier group. The timing alignment command may indicate the change of the uplink timing relative to the current uplink timing of the carrier group. Adjustment of the uplink timing by a positive or a negative amount indicates advancing or delaying the uplink transmission timing by a given amount respectively.

Figure 8:
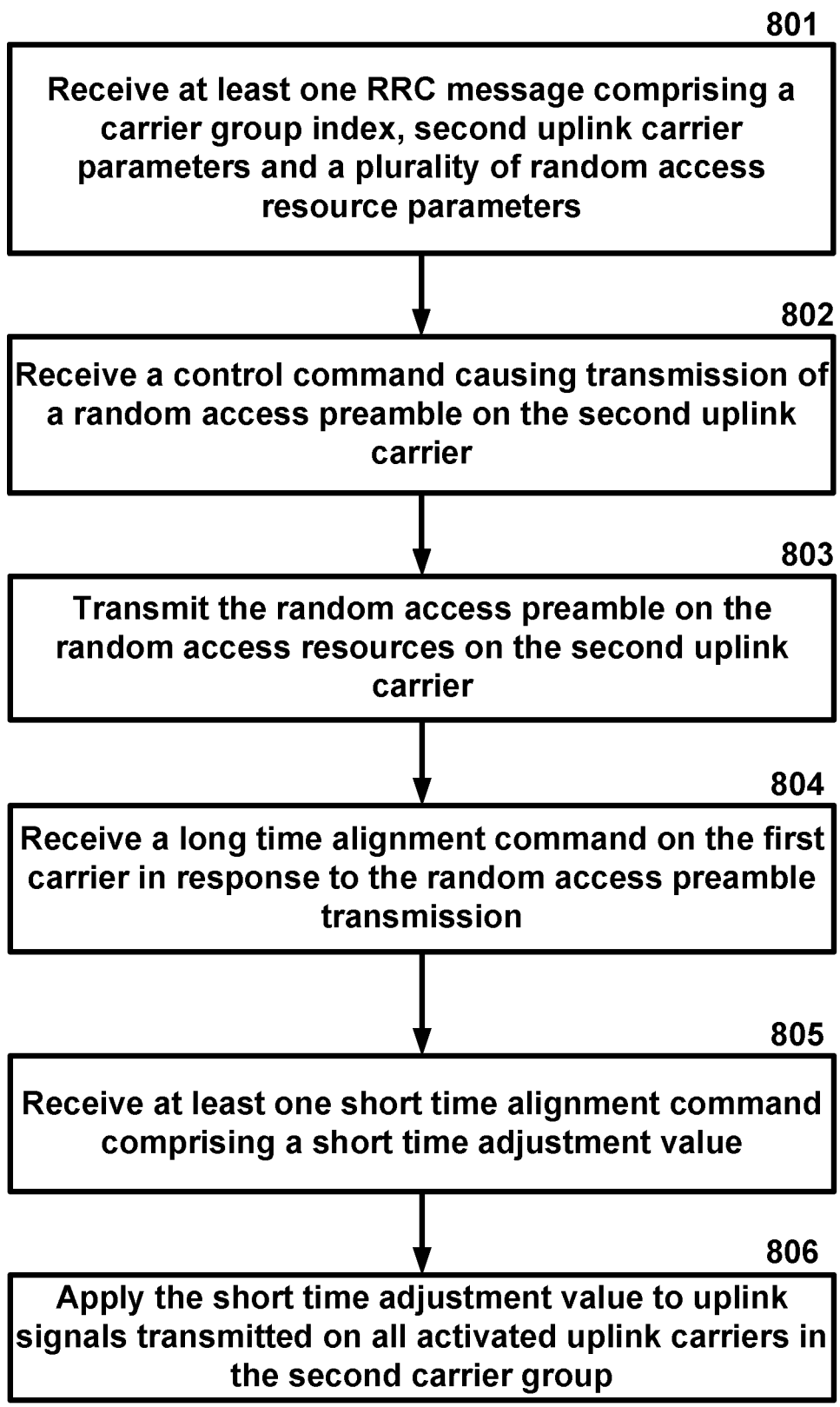
FIG. 8 depicts an example flow chart for a time alignment process in a wireless device as per an aspect of an embodiment of the present invention.
Figure 10:
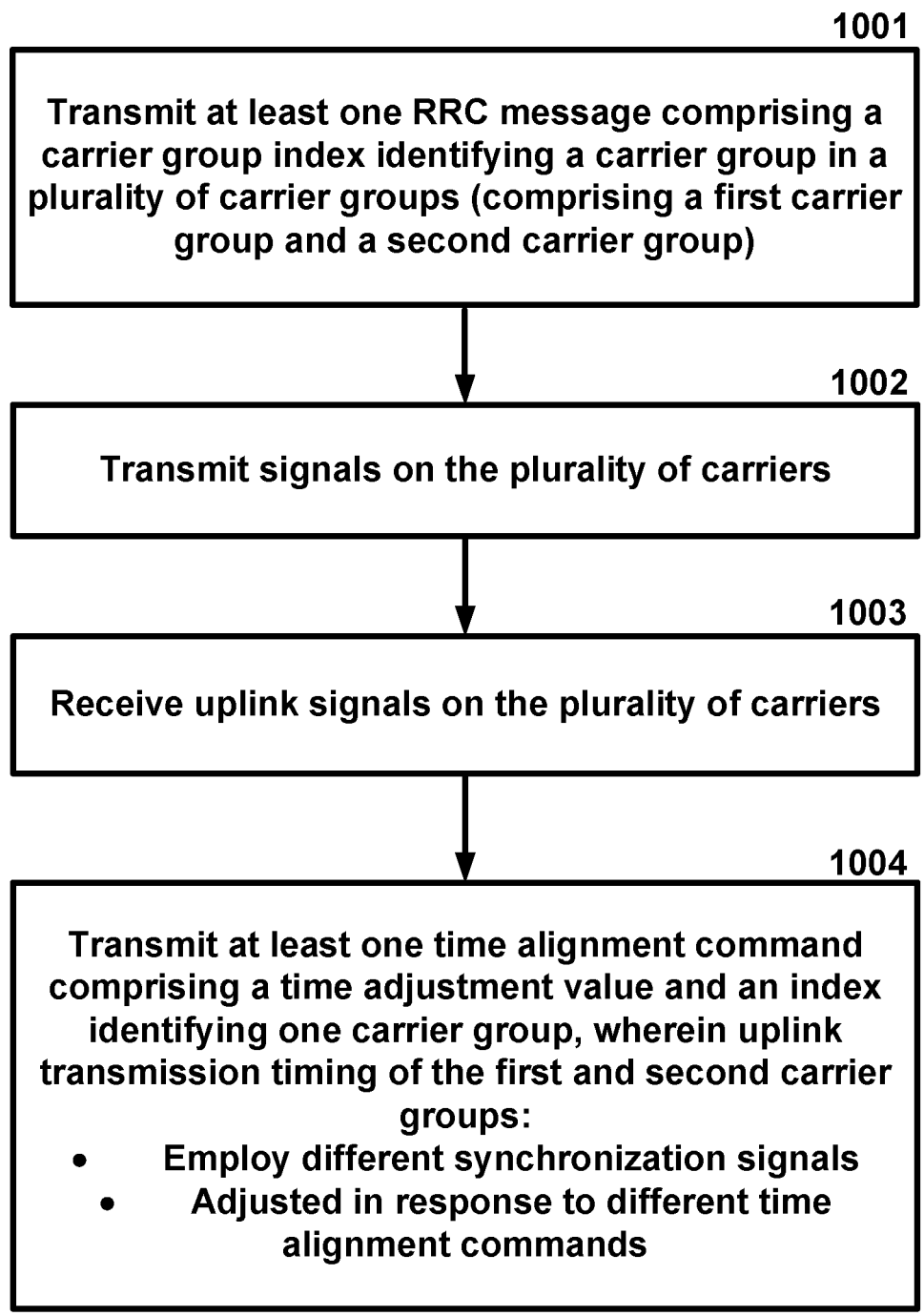
FIG. 10 depicts an example flow chart for a time alignment process in a base station as per an aspect of an embodiment of the present invention.
Figure 11:
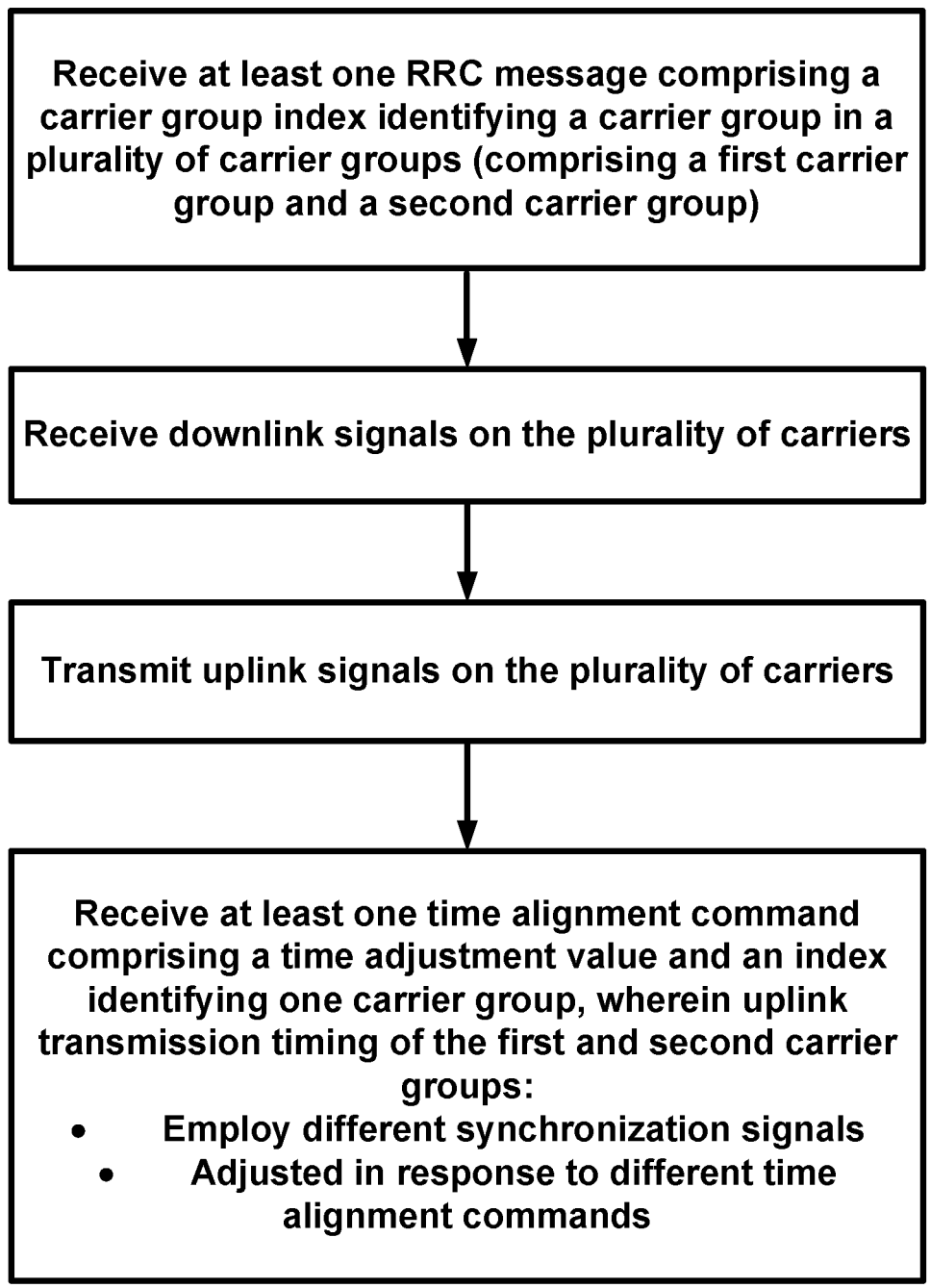
FIG. 11 depicts an example flow chart for a time alignment process in a wireless device as per an aspect of an embodiment of the present invention.

FIG. 8 and FIG. 10 depict example flow charts for a time alignment process as per an aspect of an embodiment of the present invention. According to some of the various aspects of embodiments, the wireless device may receive at least one control message from a base station. The at least one control message may configure a plurality of carriers and a plurality of carrier groups. Each carrier group may comprise at least one downlink carrier and at least one uplink carrier. The uplink carriers in a carrier group may employ the same timing reference. The wireless device may receive an activation command from the base station. The activation command may activate at least one carrier of a carrier group in the plurality of carrier groups. The wireless device may receive a control command from the base station. The control command may direct the wireless device to initiate random access procedure on an uplink carrier of a carrier group. The wireless device may obtain initial uplink timing alignment for the carrier group, through the initiated random access procedure.

The wireless device may transmit data on a subset of subframes in the plurality of subframes on a subset of at least one uplink carrier in the carrier group. The random access procedure may be a non-contention based random access procedure. The at least one control message may be at least one unicast RRC control message and may comprise at least one of: a) a plurality of carrier group identifiers, and b) a carrier index associated to configured carriers. Each carrier may be associated with a carrier group identifier in the plurality of carrier group identifiers. The activation command may be a MAC activation command received from a serving base station. The activation command may activate at least one carrier of a carrier group in the plurality of carrier groups. The MAC activation command may comprise the carrier index of the carriers to be activated. The control command may be a PDCCH control message from the base station. The PDCCH control message may direct the wireless device to initiate random access procedure on an uplink carrier of the carrier group. The PDCCH message may comprise a preamble index.

The wireless device may initiate a random access procedure by transmitting a random access preamble corresponding to the preamble index. The random access preamble may be transmitted in a plurality of random access resources configured by the base station. The wireless device may obtain initial uplink timing alignment for the carrier group, through the initiated random access procedure. The wireless device may transmit data on a subset of subframes in the plurality of subframes on a subset of at least one uplink carrier in the carrier group. The random access procedure may be a non-contention based random access procedure. The wireless device may maintain a separate timing alignment timer for each carrier group in the plurality of carrier groups.

The PDCCH control message may be received on the scheduling downlink carrier of the uplink carrier. Multiple random access preambles may be transmitted in a plurality of random access resources in the same subframe by various wireless devices. The at least one unicast RRC control message may further comprise the configuration of the random access resources. Uplink timing reference for the carrier group may be maintained, at least in part, using MAC time alignment messages. The PDCCH message may further include a carrier index. The PDCCH message may further include a power control command. PDCCH message may be scrambled using an identifier of the wireless device.

Serving carriers having uplink to which the same time alignment applies may be grouped in a time alignment group or a carrier group. Each carrier group may include at least one downlink carrier with at least one configured uplink carrier. The mapping of each downlink carrier to a carrier group may be configured by the serving base station employing RRC message(s). Time alignment maintenance for the carrier group containing the primary carrier may follow the release 8, 9 or 10 of LTE standard for time alignment maintenance. To obtain initial uplink time alignment for a secondary downlink carrier not grouped together with the primary downlink carrier, base station may initiate a random access procedure. The number of time alignment timer to be maintained may be one per carrier group. Time alignment timers may be configured by the base station. The random access procedure on secondary carriers may be initiated by the base station. The base station may initiate the random access procedure via a control message (for example a PDCCH order) for an activated secondary carrier. Non-contention based random access procedure may be supported. Cross-carrier scheduling may take place in the random access procedure for transmission of PDCCH order.

According to some of the various aspects of embodiments, a wireless device may receive at least one RRC control message from a base station at block 801. The at least one RRC control message may cause configuration of a plurality of carriers comprising a first carrier and at least one second carrier. The configuration may associate with a second carrier in the at least one second carrier: a carrier group index, a second uplink carrier, a plurality of random access resource parameters, and/or the like. The carrier group index may identify a second carrier group. The second carrier group may be one of a plurality of carrier groups. The second carrier group may comprise a second subset of the at least one second carrier. The plurality of random access resource parameters may identify random access resources.

The wireless device may receive from the base station, a control command at block 802. The control command may cause the wireless device to transmit a random access preamble on the second uplink carrier. The control command may comprise a preamble index corresponding to the random access preamble. The wireless device may transmit the random access preamble on the random access resources on the second uplink carrier at block 803. Transmission timing of the random access preamble may be determined, at least in part, by employing a synchronization signal transmitted on one of at least one downlink carrier in the second carrier group. Uplink transmissions in the second carrier group may employ the synchronization signal as timing reference.

The wireless device may receive a long time alignment command on the first carrier in response to the random access preamble transmission at block 804. The long time alignment command may comprise the preamble index and a long time adjustment value. The wireless device may receive at least one short time alignment command from the base station at block 805. The short time alignment command may comprise a short time adjustment value and an index. The short time adjustment value range may be substantially smaller than the long time adjustment value range. The index may identify the second carrier group. The wireless device may apply the time adjustment value to uplink signals transmitted on all activated uplink carriers in the second carrier group at block 806. The wireless device may apply the time adjustment value such that the base station receives substantially aligned uplink signals in frames and subframes of the second carrier group.

According to some of the various aspects of embodiments, the long time alignment command may not comprise an index identifying the second carrier group. The long time alignment command may comprise a preamble index. The short time alignment command may not comprise a preamble index. The short time alignment command may comprise an index identifying the second carrier group. The plurality of carrier groups may further comprise a first carrier group comprising a first subset of the plurality of carriers. The first subset may comprise the first carrier with a first downlink carrier and a first uplink carrier. Uplink transmissions by the wireless device in the first carrier group may employ a first synchronization signal transmitted on the first downlink carrier as timing reference.

Transmission of the control command may be initiated by a MAC sub-layer in the base station. The wireless device may receive random access parameters from the base station. The parameters may be configured to be employed in the generation of the random access preamble by the wireless device. The random access parameters may be configured to be employed in the determination of the random access preamble transmission time.

The long time alignment command may be received in a random access response message. In an example embodiment, the long time adjustment value may be encoded employing 11 bits. The short time alignment value may be encoded employing 6 bits.

Figure 9:
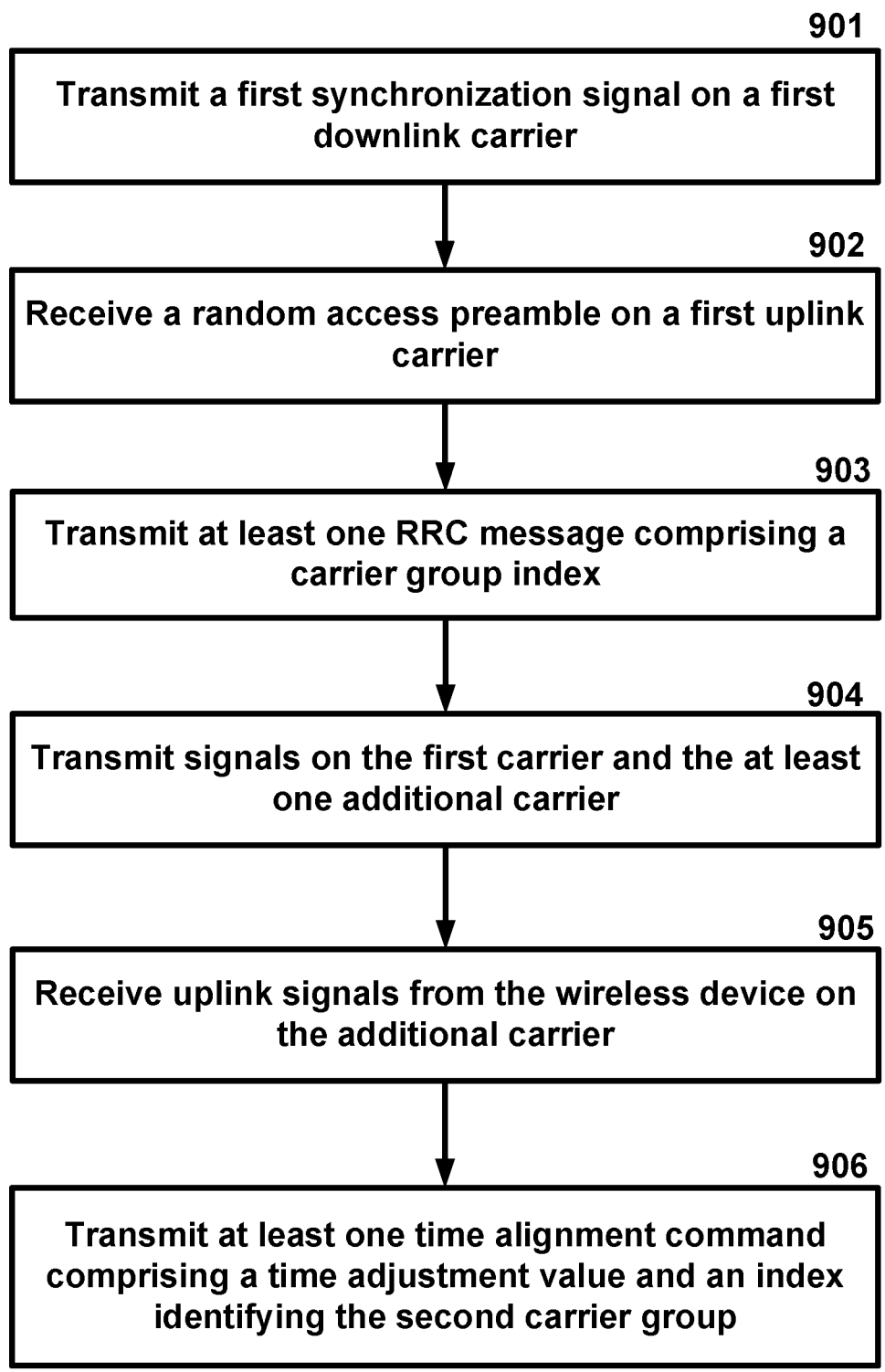
FIG. 9 depicts an example flow chart for a time alignment process in a base station as per an aspect of an embodiment of the present invention.

FIG. 9 depicts an example flow chart for a time alignment process in a base station as per an aspect of an embodiment of the present invention. The wireless device may receive an activation command from the base station prior to receiving the control command. The activation command causing activation of the second carrier in the wireless device, the activation causing the wireless device to process downlink received signals on the second carrier.

According to some of the various aspects of embodiments, a base station may transmit a first synchronization signal on a first downlink carrier of a first carrier in a plurality of carriers at block 901. The base station may receive a random access preamble on a first uplink carrier of the first carrier at block 902. The timing of the random access preamble transmission may be determined based, at least in part, on the first synchronization signal timing. The base station may transmit at least one RRC control message at block 903. The at least one RRC control message may cause configuration of at least one additional carrier in the wireless device. The configuration may associate with an additional carrier in the at least one additional carrier a carrier group index identifying a second carrier group. The second carrier group may be one of a plurality of carrier groups. The second carrier group may comprise a subset of the at least one additional carrier.

The base station may transmit, to the wireless device, signals on the first carrier and the at least one additional carrier at block 904. Downlink frames and subframes transmission timing for the first carrier and the at least one additional carrier may be substantially time aligned with each other. The base station may receive uplink signals from the wireless device on the additional carrier at block 905. The base station may transmit, to the wireless device, at least one time alignment command computed based, at least in part, on timing of the received uplink signals at block 906. The time alignment command may comprise a time adjustment value and an index identifying the second carrier group. The at least one time alignment command causes substantial alignment of reception timing of uplink signals in frames and subframes of the second carrier group. Uplink transmission timing of frames and subframes of the first carrier and the additional carrier employ different synchronization signals as timing reference and are adjusted in response to different time alignment commands.

According to some of the various aspects of embodiments, the first synchronization signal comprises a primary synchronization signal and a secondary synchronization signal. The synchronization signal may be configured to: indicate a physical carrier ID for the first carrier; provide transmission timing information for the first downlink carrier; be transmitted employing a first plurality of subcarriers, and/or the like. Transmission time may be divided into a plurality of frames. Each frame in the plurality of frames may further be divided into a plurality of subframes. The first plurality of subcarriers may be substantially in the center of the frequency band of the first downlink carrier on the first and sixth subframe of each frame in the plurality of frames.

The base station may generate the primary synchronization signal employing a frequency-domain Zadoff-Chu sequence. The base station may generate the secondary synchronization signal employing an interleaved concatenation of two 31 bit length binary sequences. The base station may scramble the concatenated sequence with a scrambling sequence given by the primary synchronization signal. The secondary synchronization signal may differ between subframe 0 and subframe 5. The timing information may comprises subframe timing and frame timing. The configuration of the at least one additional carrier may comprise configuring at least one of a physical layer parameter, a MAC layer parameter and an RLC layer parameter.

According to some of the various aspects of embodiments, a base station may transmit at least one RRC control message. The at least one RRC control message may cause configuration of a plurality of carriers comprising a first carrier and at least one additional carrier in the wireless device. The configuration may associate with a carrier in the plurality of carriers a carrier group index identifying a carrier group. The carrier group may be one of a plurality of carrier groups. The plurality of carrier groups may comprise a first carrier group and a second carrier group. The first carrier group may comprise a first subset of the plurality of carriers. The first subset may comprise the first carrier. The second carrier group may comprise a subset of the at least one additional carrier.

The base station may transmit, to the wireless device, signals on the plurality of carriers. Downlink frames and subframes transmission timing for the first carrier and the at least one additional carrier may be substantially time aligned with each other. The base station may receive uplink signals from the wireless device on the plurality of carriers. The base station may transmit, to the wireless device, at least one time alignment command. The time alignment command may comprise a time adjustment value and an index identifying one carrier group. Uplink transmission timing of frames and subframes in the first carrier group and the second carrier group may employ different synchronization signals on different carriers as timing reference and are adjusted in response to different time alignment commands.

According to some of the various aspects of embodiments, a base station may receive a plurality of radio capability parameters from the wireless device on the first carrier. The plurality of radio capability parameters may comprise at least one parameter indicating whether the wireless device supports configuration of a plurality of carrier groups. If the plurality of radio capability parameters may indicate that the wireless device supports configuration of a plurality of carrier groups, the base station may, selectively based on at least one criterion, transmit the at least one RRC control message to cause configuration of the plurality of carrier groups in the wireless device. Uplink transmissions by the wireless device in the first carrier group may employs a first synchronization signal transmitted on a first downlink carrier of the first carrier as a timing reference. Uplink transmissions by the wireless device in the second carrier group may employ a second synchronization signal transmitted on one of at least one downlink carrier in the second carrier group.

According to some of the various aspects of embodiments, a wireless device may receive at least one RRC control message from a base station. The at least one RRC control message may cause configuration of a plurality of carriers comprising a first carrier and at least one second carrier. The configuration may associate with a second carrier in the at least one second carrier: a carrier group index, a second uplink carrier, a plurality of random access resource parameters, and/or the like. The carrier group index may identify a second carrier group. The second carrier group may be one of a plurality of carrier groups. The second carrier group may comprise a second subset of the at least one second carrier. The plurality of random access resource parameters may identify random access resources.

The wireless device may receive from the base station, a control command. The control command may cause the wireless device to transmit a random access preamble on the second uplink carrier. The control command may comprise a preamble index corresponding to the random access preamble. The wireless device may transmit the random access preamble on the random access resources on the second uplink carrier. Transmission timing of the random access preamble may be determined, at least in part, by employing a synchronization signal transmitted on one of at least one downlink carrier in the second carrier group. Uplink transmissions in the second carrier group may employ the synchronization signal as timing reference.

The wireless device may receive a long time alignment command on the first carrier in response to the random access preamble transmission. The long time alignment command may comprise the preamble index and a long time adjustment value. The wireless device may receive at least one short time alignment command from the base station. The short time alignment command may comprise a short time adjustment value and an index. The short time adjustment value range may be substantially smaller than the long time adjustment value range. The index may identify the second carrier group. The wireless device may apply the time adjustment value to uplink signals transmitted on all activated uplink carriers in the second carrier group. The wireless device may apply the time adjustment value such that the base station receives substantially aligned uplink signals in frames and subframes of the second carrier group.

According to some of the various aspects of embodiments, the long time alignment command may not comprise an index identifying the second carrier group. The long time alignment command may comprise a preamble index. The short time alignment command may not comprise a preamble index. The short time alignment command may comprise an index identifying the second carrier group. The plurality of carrier groups may further comprise a first carrier group comprising a first subset of the plurality of carriers. The first subset may comprise the first carrier with a first downlink carrier and a first uplink carrier. Uplink transmissions by the wireless device in the first carrier group may employ a first synchronization signal transmitted on the first downlink carrier as timing reference.

Transmission of the control command may be initiated by a MAC sub-layer in the base station. The wireless device may receive random access parameters from the base station. The parameters may be configured to be employed in the generation of the random access preamble by the wireless device. The random access parameters may be configured to be employed in the determination of the random access preamble transmission time.

The long time alignment command may be received in a random access response message. In an example embodiment, the long time adjustment value may be encoded employing 11 bits. The short time alignment value may be encoded employing 6 bits.

The wireless device may receive an activation command from the base station prior to receiving the control command. The activation command causing activation of the second carrier in the wireless device, the activation causing the wireless device to process downlink received signals on the second carrier.

According to some of the various aspects of embodiments, a base station may transmit a first synchronization signal on a first downlink carrier of a first carrier in a plurality of carriers. The base station may receive a random access preamble on a first uplink carrier of the first carrier. The timing of the random access preamble transmission may be determined based, at least in part, on the first synchronization signal timing. The base station may transmit at least one RRC control message at block 1001. The at least one RRC control message may cause configuration of at least one additional carrier in the wireless device. The configuration may associate with an additional carrier in the at least one additional carrier a carrier group index identifying a second carrier group. The second carrier group may be one of a plurality of carrier groups. The second carrier group may comprise a subset of the at least one additional carrier.

The base station may transmit, to the wireless device, signals on the first carrier and the at least one additional carrier at block 1002. Downlink frames and subframes transmission timing for the first carrier and the at least one additional carrier may be substantially time aligned with each other. The base station may receive uplink signals from the wireless device on the additional carrier at block 1003. The base station may transmit, to the wireless device, at least one time alignment command computed based, at least in part, on timing of the received uplink signals at block 1004. The time alignment command may comprise a time adjustment value and an index identifying the second carrier group. The at least one time alignment command causes substantial alignment of reception timing of uplink signals in frames and subframes of the second carrier group. Uplink transmission timing of frames and subframes of the first carrier and the additional carrier employ different synchronization signals as timing reference and are adjusted in response to different time alignment commands.

According to some of the various aspects of embodiments, the first synchronization signal comprises a primary synchronization signal and a secondary synchronization signal. The synchronization signal may be configured to: indicate a physical carrier ID for the first carrier; provide transmission timing information for the first downlink carrier; be transmitted employing a first plurality of subcarriers, and/or the like. Transmission time may be divided into a plurality of frames. Each frame in the plurality of frames may further be divided into a plurality of subframes. The first plurality of subcarriers may be substantially in the center of the frequency band of the first downlink carrier on the first and sixth subframe of each frame in the plurality of frames.

The base station may generate the primary synchronization signal employing a frequency-domain Zadoff-Chu sequence. The base station may generate the secondary synchronization signal employing an interleaved concatenation of two 31 bit length binary sequences. The base station may scramble the concatenated sequence with a scrambling sequence given by the primary synchronization signal. The secondary synchronization signal may differ between subframe 0 and subframe 5. The timing information may comprises subframe timing and frame timing. The configuration of the at least one additional carrier may comprise configuring at least one of a physical layer parameter, a MAC layer parameter and an RLC layer parameter.

According to some of the various aspects of embodiments, a base station may transmit at least one RRC control message. The at least one RRC control message may cause configuration of a plurality of carriers comprising a first carrier and at least one additional carrier in the wireless device. The configuration may associate with a carrier in the plurality of carriers a carrier group index identifying a carrier group. The carrier group may be one of a plurality of carrier groups. The plurality of carrier groups may comprise a first carrier group and a second carrier group. The first carrier group may comprise a first subset of the plurality of carriers. The first subset may comprise the first carrier. The second carrier group may comprise a subset of the at least one additional carrier.

The base station may transmit, to the wireless device, signals on the plurality of carriers. Downlink frames and subframes transmission timing for the first carrier and the at least one additional carrier may be substantially time aligned with each other. The base station may receive uplink signals from the wireless device on the plurality of carriers. The base station may transmit, to the wireless device, at least one time alignment command. The time alignment command may comprise a time adjustment value and an index identifying one carrier group. Uplink transmission timing of frames and subframes in the first carrier group and the second carrier group may employ different synchronization signals on different carriers as timing reference and are adjusted in response to different time alignment commands.

According to some of the various aspects of embodiments, a base station may receive a plurality of radio capability parameters from the wireless device on the first carrier. The plurality of radio capability parameters may comprise at least one parameter indicating whether the wireless device supports configuration of a plurality of carrier groups. If the plurality of radio capability parameters may indicate that the wireless device supports configuration of a plurality of carrier groups, the base station may, selectively based on at least one criterion, transmit the at least one RRC control message to cause configuration of the plurality of carrier groups in the wireless device. Uplink transmissions by the wireless device in the first carrier group may employs a first synchronization signal transmitted on a first downlink carrier of the first carrier as a timing reference. Uplink transmissions by the wireless device in the second carrier group may employ a second synchronization signal transmitted on one of at least one downlink carrier in the second carrier group.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols.

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various aspects of embodiments, the sequence used for a primary synchronization signal may be generated from a frequency-domain Zadoff-Chu sequence according to a pre-defined formula. A Zadoff-Chu root sequence index may also be predefined in a specification. The mapping of the sequence to resource elements may depend on a frame structure. The wireless device may not assume that the primary synchronization signal is transmitted on the same antenna port as any of the downlink reference signals. The wireless device may not assume that any transmission instance of the primary synchronization signal is transmitted on the same antenna port, or ports, used for any other transmission instance of the primary synchronization signal. The sequence may be mapped to the resource elements according to a predefined formula.

For FDD frame structure, a primary synchronization signal may be mapped to the last OFDM symbol in slots 0 and 10. For TDD frame structure, the primary synchronization signal may be mapped to the third OFDM symbol in subframes 1 and 6. Some of the resource elements allocated to primary or secondary synchronization signals may be reserved and not used for transmission of the primary synchronization signal.

According to some of the various aspects of embodiments, the sequence used for a secondary synchronization signal may be an interleaved concatenation of two length-31 binary sequences. The concatenated sequence may be scrambled with a scrambling sequence given by a primary synchronization signal. The combination of two length-31 sequences defining the secondary synchronization signal may differ between subframe 0 and subframe 5 according to predefined formula(s). The mapping of the sequence to resource elements may depend on the frame structure. In a subframe for FDD frame structure and in a half-frame for TDD frame structure, the same antenna port as for the primary synchronization signal may be used for the secondary synchronization signal. The sequence may be mapped to resource elements according to a predefined formula.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing.

The random access preamble may be transmitted on a second plurality of subcarriers on the first uplink carrier.

According to some of the various aspects of embodiments, once a random access preamble is transmitted, a wireless device may monitor the PDCCH of a first downlink carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, a wireless device may include a configurable timer (timeAlignmentTimer) that may be used to control how long the wireless device is considered uplink time aligned. When a timing alignment command MAC control element is received, the wireless device may apply the timing alignment command and start or restart timeAlignmentTimer. The wireless device may not perform any uplink transmission except the random access preamble transmission when timeAlignmentTimer is not running or when it exceeds its limit. The time alignment command may substantially align frame and subframe reception timing of a first uplink carrier and at least one additional uplink carrier. According to some of the various aspects of embodiments, the time alignment command value range employed during a random access process may be substantially larger than the time alignment command value range during active data transmission. In an example embodiment, uplink transmission timing may be maintained on a per time alignment group (carrier group) basis. Carrier(s) may be grouped in carrier groups, and carrier groups may have their own downlink timing reference, time alignment timer, and/or time alignment commands. Group(s) may have their own random access process. Time alignment commands may be directed to a time alignment group. The carrier group including the primary cell may be called a primary carrier group and the carrier group not including the primary cell may be called a secondary carrier group.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s) as well as data traffic may be scheduled for transmission in PDSCH. Data packet(s) may be encrypted packets.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method comprising:
    transmitting, by a base station, at least one radio resource control message associated with configuration of a plurality of carrier groups, wherein the plurality of carrier groups comprises:
        a primary carrier group; and
        a secondary carrier group, and
    wherein uplink signals of the plurality of carrier groups are time aligned based on different timing references for different carrier groups of the plurality of carrier groups;
    transmitting, to a wireless device, a time alignment command comprising:
        an identity of a carrier group of the plurality of carrier groups; and
        a time adjustment value; and
    receiving, via at least one carrier of the carrier group and based on the time alignment command, an uplink signal.

2. The method of claim 1, further comprising:
    after the transmitting the at least one radio resource control message, transmitting a control command, wherein the control command:
        is configured to cause the wireless device to transmit, via at least one carrier of the carrier group, a random access preamble;
        is scrambled using an identifier of the wireless device; and
        comprises:
            a preamble index, corresponding to the random access preamble;
            a power control command; and
            a mask index configured to be used to determine, for the random access preamble, at least one of transmission timing or transmission resources.

3. The method of claim 1, further comprising receiving, via at least one carrier of the carrier group and after transmitting a control command, a random access preamble.

4. The method of claim 1, further comprising transmitting, via the primary carrier group and after receiving a random access preamble, a long time alignment command comprising:
    a preamble index; and
    a long time adjustment value.

5. The method of claim 1, wherein the different timing references comprise a primary synchronization signal and a secondary synchronization signal.

6. The method of claim 1, wherein the at least one radio resource control message comprises a physical layer parameter, a media access control layer parameter, and a radio link control layer parameter.

7. The method of claim 1, further comprising applying the time adjustment value to the uplink signal received via the at least one carrier of the carrier group.

8. The method of claim 1, further comprising receiving, from the wireless device, a buffer status report, wherein the buffer status report comprises a buffer size indicating an amount of data, in at least one buffer of the wireless device, available for transmission.

9. The method of claim 1, further comprising transmitting, via carriers associated with the plurality of carrier groups, downlink signals that are time aligned.

10. A base station comprising:
    one or more processors; and
    memory storing instructions that, when executed by the one or more processors, configure the base station to:
        transmit at least one radio resource control message associated with configuration of a plurality of carrier groups, wherein the plurality of carrier groups comprises:
            a primary carrier group; and
            a secondary carrier group, and wherein uplink signals of the plurality of carrier groups are time aligned based on different timing references for different carrier groups of the plurality of carrier groups;

transmit, to a wireless device, a time alignment command comprising:
an identity of a carrier group of the plurality of carrier groups; and
a time adjustment value; and receive, via at least one carrier of the carrier group and based on the time alignment command, an uplink signal.

11. The base station of claim 10, wherein the instructions, when executed by the one or more processors, further configure the base station to:
after transmitting the at least one radio resource control message, transmit a control command, wherein the control command:
is configured to cause the wireless device to transmit, via at least one carrier of the carrier group, a random access preamble;
is scrambled using an identifier of the wireless device; and
comprises:
a preamble index, corresponding to the random access preamble;
a power control command; and
a mask index configured to be used to determine, for the random access preamble, at least one of transmission timing or transmission resources.

12. The base station of claim 10, wherein the instructions, when executed by the one or more processors, further configure the base station to receive, via at least one carrier of the carrier group and after transmitting a control command, a random access preamble.

13. The base station of claim 10, wherein the instructions, when executed by the one or more processors, further configure the base station to transmit, via the primary carrier group and after receiving a random access preamble, a long time alignment command comprising:
a preamble index; and
a long time adjustment value.

14. The base station of claim 10, wherein the different timing references comprise a primary synchronization signal and a secondary synchronization signal.

15. The base station of claim 10, wherein the at least one radio resource control message comprises a physical layer parameter, a media access control layer parameter, and a radio link control layer parameter.

16. The base station of claim 10, wherein the instructions, when executed by the one or more processors, further configure the base station to apply the time adjustment value to the uplink signal received via the at least one carrier of the carrier group.

17. The base station of claim 10, wherein the instructions, when executed by the one or more processors, further configure the base station to receive, from the wireless device, a buffer status report, wherein the buffer status report comprises a buffer size indicating an amount of data, in at least one buffer of the wireless device, available for transmission.

18. The base station of claim 10, wherein the instructions, when executed by the one or more processors, further configure the base station to transmit, via carriers associated with the plurality of carrier groups, downlink signals that are time aligned.

19. A method comprising:
receiving, by a wireless device, at least one radio resource control message associated with configuration of a plurality of carrier groups, wherein the plurality of carrier groups comprises:
a primary carrier group; and
a secondary carrier group, and
wherein uplink signals of the plurality of carrier groups are time aligned based on different timing references for different carrier groups of the plurality of carrier groups;
receiving, from a base station, a time alignment command comprising:
an identity of a carrier group of the plurality of carrier groups; and
a time adjustment value; and
transmitting, via at least one carrier of the carrier group and based on the time alignment command, an uplink signal.

20. The method of claim 19, further comprising:
after the receiving the at least one radio resource control message, receiving a control command, wherein the control command:
is scrambled using an identifier of the wireless device; and
comprises:
a preamble index, corresponding to a random access preamble;
a power control command; and
a mask index configured to be used to determine, for the random access preamble, at least one of transmission timing or transmission resources; and
transmitting, via at least one carrier of the carrier group, the random access preamble.

21. The method of claim 19, further comprising transmitting, via at least one carrier of the carrier group and after receiving a control command, a random access preamble.

22. The method of claim 19, further comprising receiving, via the primary carrier group and after transmitting a random access preamble, a long time alignment command comprising:
a preamble index; and
a long time adjustment value.

23. The method of claim 19, wherein the different timing references comprise a primary synchronization signal and a secondary synchronization signal.

24. The method of claim 19, wherein the at least one radio resource control message comprises a physical layer parameter, a media access control layer parameter, and a radio link control layer parameter.

25. The method of claim 19, further comprising applying the time adjustment value to the uplink signal transmitted via the at least one carrier of the carrier group.

26. The method of claim 19, further comprising transmitting a buffer status report, wherein the buffer status report comprises a buffer size indicating an amount of data, in at least one buffer of the wireless device, available for transmission.

27. The method of claim 19, further comprising receiving, via carriers associated with the plurality of carrier groups, downlink signals that are time aligned.

28. A wireless device comprising:
one or more processors; and
memory storing instructions that, when executed by the one or more processors, configure the wireless device to:

receive at least one radio resource control message associated with configuration of a plurality of carrier groups, wherein the plurality of carrier groups comprises:
- a primary carrier group; and
- a secondary carrier group, and wherein uplink signals of the plurality of carrier groups are time aligned based on different timing references for different carrier groups of the plurality of carrier groups;

receive, from a base station, a time alignment command comprising:
- an identity of a carrier group of the plurality of carrier groups; and
- a time adjustment value; and transmit, via at least one carrier of the carrier group and based on the time alignment command, an uplink signal.

29. The wireless device of claim 28, wherein the instructions, when executed by the one or more processors, further configure the wireless device to:

after receiving the at least one radio resource control message, receive a control command, wherein the control command:
- is scrambled using an identifier of the wireless device; and
- comprises:
  - a preamble index, corresponding to a random access preamble;
  - a power control command; and
  - a mask index configured to be used to determine, for the random access preamble, at least one of transmission timing or transmission resources; and transmit, via at least one carrier of the carrier group, the random access preamble.

30. The wireless device of claim 28, wherein the instructions, when executed by the one or more processors, further configure the wireless device to transmit, via at least one carrier of the carrier group and after receiving a control command, a random access preamble.

31. The wireless device of claim 28, wherein the instructions, when executed by the one or more processors, further configure the wireless device to receive, via the primary carrier group and after transmitting a random access preamble, a long time alignment command comprising:
- a preamble index; and
- a long time adjustment value.

32. The wireless device of claim 28, wherein the different timing references comprise a primary synchronization signal and a secondary synchronization signal.

33. The wireless device of claim 28, wherein the at least one radio resource control message comprises a physical layer parameter, a media access control layer parameter, and a radio link control layer parameter.

34. The wireless device of claim 28, wherein the instructions, when executed by the one or more processors, further configure the wireless device to apply the time adjustment value to the uplink signal transmitted via the at least one carrier of the carrier group.

35. The wireless device of claim 28, wherein the instructions, when executed by the one or more processors, further configure the wireless device to transmit a buffer status report, wherein the buffer status report comprises a buffer size indicating an amount of data, in at least one buffer of the wireless device, available for transmission.

36. The wireless device of claim 28, wherein the instructions, when executed by the one or more processors, further configure the wireless device to receive, via carriers associated with the plurality of carrier groups, downlink signals that are time aligned.

37. A non-transitory computer-readable medium storing instructions that, when executed, configure a base station to:

transmit at least one radio resource control message associated with configuration of a plurality of carrier groups, wherein the plurality of carrier groups comprises:
- a primary carrier group; and
- a secondary carrier group, and wherein uplink signals of the plurality of carrier groups are time aligned based on different timing references for different carrier groups of the plurality of carrier groups;

transmit, to a wireless device, a time alignment command comprising:
- an identity of a carrier group of the plurality of carrier groups; and
- a time adjustment value; and receive, via at least one carrier of the carrier group and based on the time alignment command, an uplink signal.

38. The non-transitory computer-readable medium of claim 37, wherein the instructions, when executed, further configure the base station to receive, via at least one carrier of the carrier group and after transmitting a control command, a random access preamble.

39. The non-transitory computer-readable medium of claim 37, wherein the instructions, when executed, further configure the base station to transmit, via the primary carrier group and after receiving a random access preamble, a long time alignment command comprising:
- a preamble index; and
- a long time adjustment value.

40. The non-transitory computer-readable medium of claim 37, wherein the different timing references comprise a primary synchronization signal and a secondary synchronization signal.

41. The non-transitory computer-readable medium of claim 37, wherein the instructions, when executed, further configure the base station to apply the time adjustment value to the uplink signal received via the at least one carrier of the carrier group.

42. The non-transitory computer-readable medium of claim 37, wherein the instructions, when executed, further configure the base station to transmit, via carriers associated with the plurality of carrier groups, downlink signals that are time aligned.

43. A non-transitory computer-readable medium storing instructions that, when executed, configure a wireless device to:

receive at least one radio resource control message associated with configuration of a plurality of carrier groups, wherein the plurality of carrier groups comprises:
- a primary carrier group; and
- a secondary carrier group, and wherein uplink signals of the plurality of carrier groups are time aligned based on different timing references for different carrier groups of the plurality of carrier groups;

receive, from a base station, a time alignment command comprising:
- an identity of a carrier group of the plurality of carrier groups; and
- a time adjustment value; and transmit, via at least one carrier of the carrier group and based on the time alignment command, an uplink signal.

44. The non-transitory computer-readable medium of claim 43, wherein the instructions, when executed, further configure the wireless device to:
  receive, after receiving the at least one radio resource control message, a control command, wherein the control command:
    is scrambled using an identifier of the wireless device; and
    comprises:
      a preamble index, corresponding to a random access preamble;
      a power control command; and
      a mask index configured to be used to determine, for the random access preamble, at least one of transmission timing or transmission resources; and
  transmit, via at least one carrier of the carrier group, the random access preamble.

45. The non-transitory computer-readable medium of claim 43, wherein the different timing references comprise a primary synchronization signal and a secondary synchronization signal.

46. The non-transitory computer-readable medium of claim 43, wherein the instructions, when executed, further configure the wireless device to apply the time adjustment value to the uplink signal transmitted via the at least one carrier of the carrier group.

47. A system comprising:
  a base station comprising:
    one or more processors; and
    memory storing instructions; and
  a wireless device comprising:
    one or more processors; and
    memory storing instructions; and
  wherein the instructions stored in the memory of the base station, when executed by the one or more processors of the base station, configure the base station to:
    transmit at least one radio resource control message associated with configuration of a plurality of carrier groups, wherein the plurality of carrier groups comprises:
      a primary carrier group; and
      a secondary carrier group, and
    wherein uplink signals of the plurality of carrier groups are time aligned based on different timing references for different carrier groups of the plurality of carrier groups; and
    transmit a time alignment command comprising:
      an identity of a carrier group of the plurality of carrier groups; and
      a time adjustment value, and
  wherein the instructions stored in the memory of the wireless device, when executed by the one or more processors of the wireless device, configure the wireless device to:
    receive the at least one radio resource control message;
    receive the time alignment command; and
    transmit, via at least one carrier of the carrier group and based on the time alignment command, an uplink signal.

48. The system of claim 47, wherein the instructions stored in the memory of the wireless device, when executed by the one or more processors of the wireless device, further configure the wireless device to transmit, via at least one carrier of the carrier group and after transmitting a control command, a random access preamble.

49. The system of claim 47, wherein the instructions stored in the memory of the base station, when executed by the one or more processors of the base station, further configure the base station to transmit, via the primary carrier group and after receiving a random access preamble, a long time alignment command comprising:
  a preamble index; and
  a long time adjustment value.

50. The system of claim 47, wherein the different timing references comprise a primary synchronization signal and a secondary synchronization signal.

51. The system of claim 47, wherein the instructions stored in the memory of the base station, when executed by the one or more processors of the base station, further configure the base station to apply the time adjustment value to the uplink signal received via the at least one carrier of the carrier group.

52. The system of claim 47, wherein the instructions stored in the memory of the base station, when executed by the one or more processors of the base station, further configure the base station to transmit, via carriers associated with the plurality of carrier groups, downlink signals that are time aligned.

53. The system of claim 47, wherein:
  the instructions stored in the memory of the base station, when executed by the one or more processors of the base station, further configure the base station to:
    transmit, after transmitting the at least one radio resource control message, a control command, wherein the control command:
      is scrambled using an identifier of the wireless device; and
      comprises:
        a preamble index, corresponding to a random access preamble;
        a power control command; and
        a mask index configured to be used to determine, for the random access preamble, at least one of transmission timing or transmission resources, and
  the instructions stored in the memory of the wireless device, when executed by the one or more processors of the wireless device, further configure the wireless device to:
    transmit, via at least one carrier of the carrier group, the random access preamble.

54. The system of claim 47, wherein the instructions stored in the memory of the wireless device, when executed by the one or more processors of the wireless device, further configure the wireless device to apply the time adjustment value to the uplink signal transmitted via the at least one carrier of the carrier group.

* * * * *